(12) United States Patent
Bricaud et al.

(10) Patent No.: US 6,908,322 B1
(45) Date of Patent: Jun. 21, 2005

(54) SMART CARD CONNECTOR CARRIAGE

(75) Inventors: Hervé Guy Bricaud, Dole (FR); Yves Pizard, Dole (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/688,402

(22) Filed: Oct. 17, 2003

(30) Foreign Application Priority Data

Apr. 27, 2001 (FR) .............................................. 01 05676
Apr. 25, 2002 (FR) ................................. PCT/FR02/01418

(51) Int. Cl.[7] .............................................. H01R 13/62
(52) U.S. Cl. ..................................... 439/152; 439/159
(58) Field of Search ......................... 439/630, 152–159

(56) References Cited

U.S. PATENT DOCUMENTS

| 5,558,527 | A | * | 9/1996 | Lin ............................. 439/155 |
| 5,695,351 | A | * | 12/1997 | Kimura et al. .............. 439/159 |
| 6,017,230 | A | * | 1/2000 | Yao ............................. 439/159 |
| 6,059,587 | A | * | 5/2000 | Ho et al. ..................... 439/159 |
| 6,097,605 | A | | 8/2000 | Klatt et al. ................. 361/737 |
| 6,729,892 | B2 | * | 5/2004 | Takada et al. .............. 439/159 |
| 2001/0008815 | A1 | * | 7/2001 | Zuin .......................... 439/327 |
| 2004/0067668 | A1 | * | 4/2004 | Hirata et al. ............... 439/159 |

FOREIGN PATENT DOCUMENTS

| EP | 0293888 A2 | 12/1988 |
| EP | 0940765 A2 | 9/1999 |
| WO | WO 96/34427 | 10/1996 |

* cited by examiner

*Primary Examiner*—Michael C. Zarroli
(74) *Attorney, Agent, or Firm*—Roger C. Turner

(57) ABSTRACT

A smart card connector has a carriage (252) that prevents inadvertent card pullout and that pushes the card rearward when a user intends to do so. The connector housing includes an insulative support (52) that is molded with at least one upstanding rib (275, 277) lying beside the card path. The carriage is formed from a piece of sheet metal that is bent to form a pair of flanges (310, 314) that lie on opposite sides of the rib and to form a base (312) that connects the flanges and that lies on top of the rib. One of the flanges forms a blade (184) with a free end, the free end forming a spur (186) for movement into and out of the card path. The housing forms a blade—engaging wall (298, 300) that controls the deflection of the blade so the spur moves into the card path only when the carriage moves forward.

14 Claims, 64 Drawing Sheets

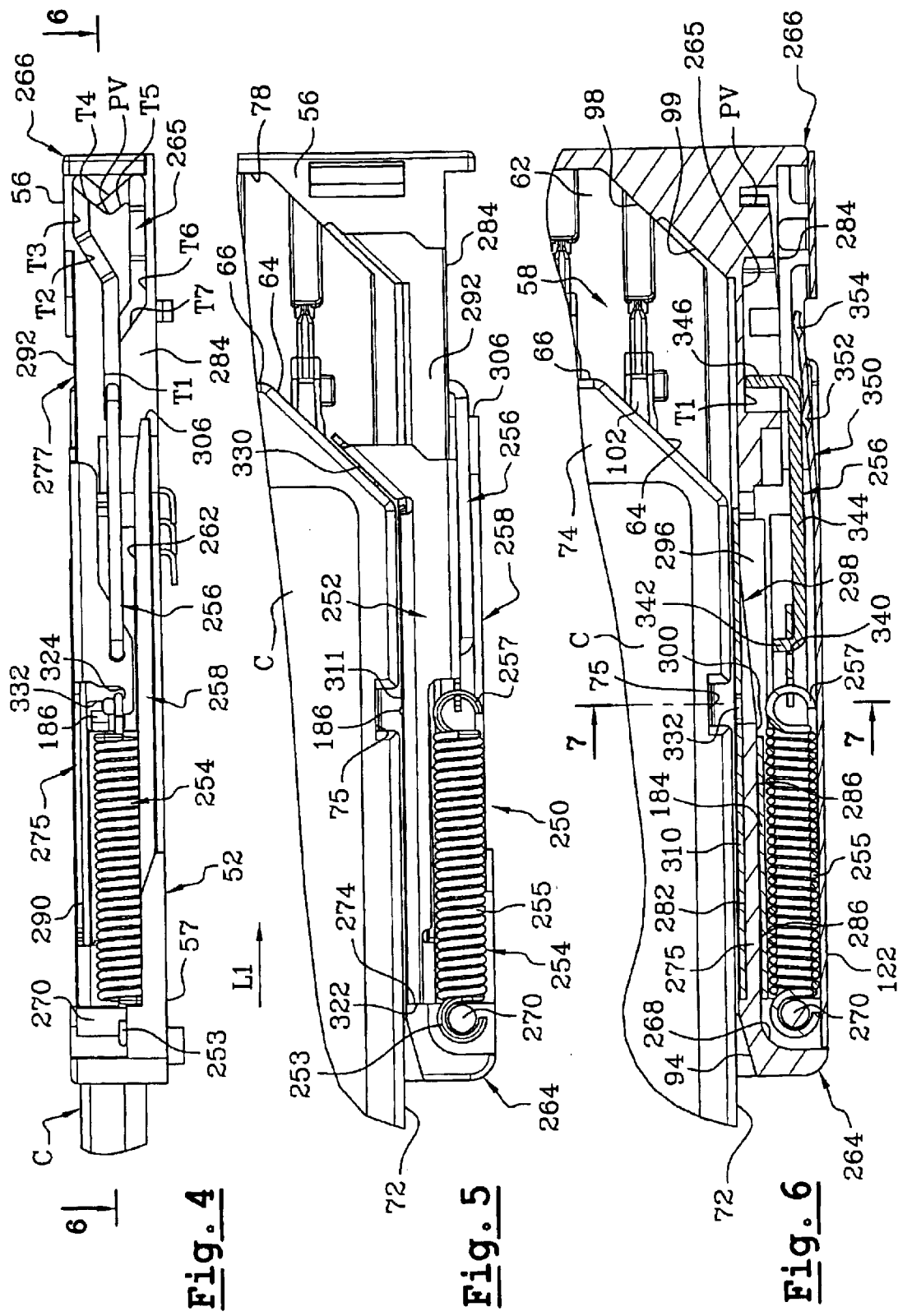

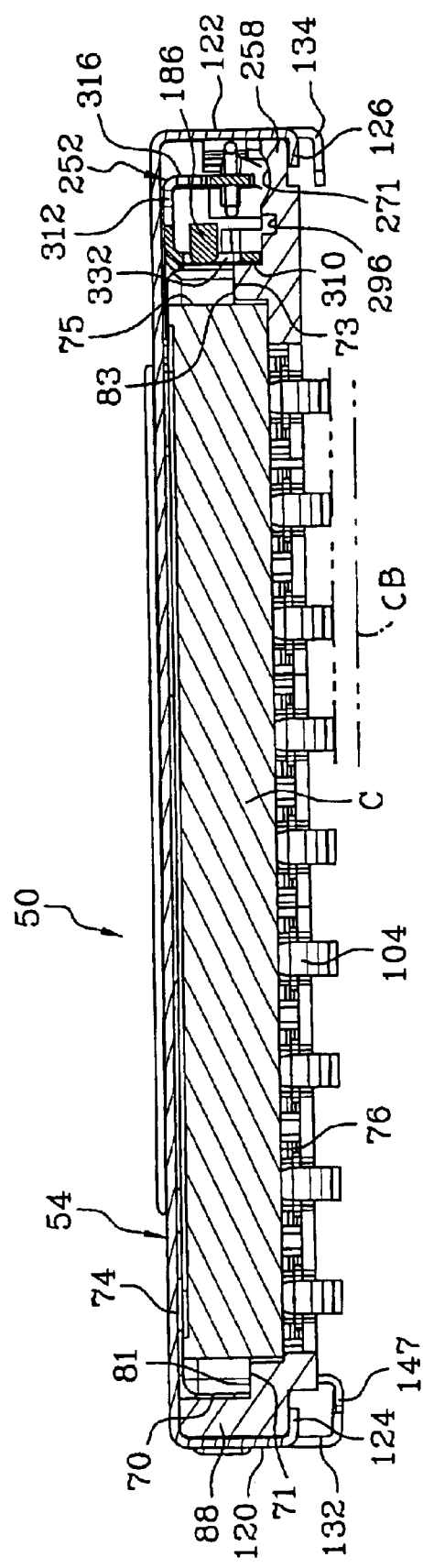

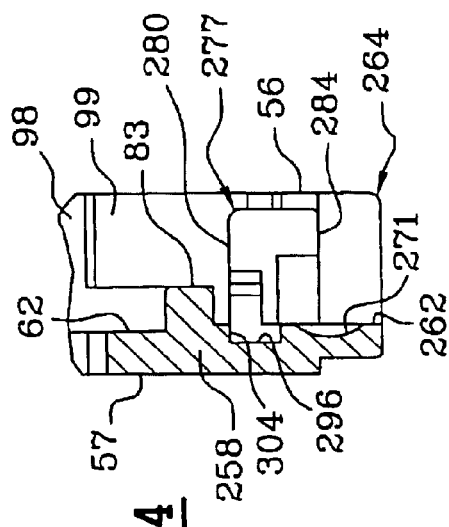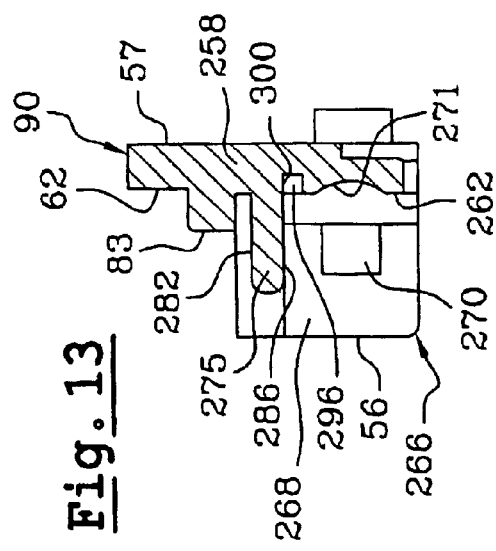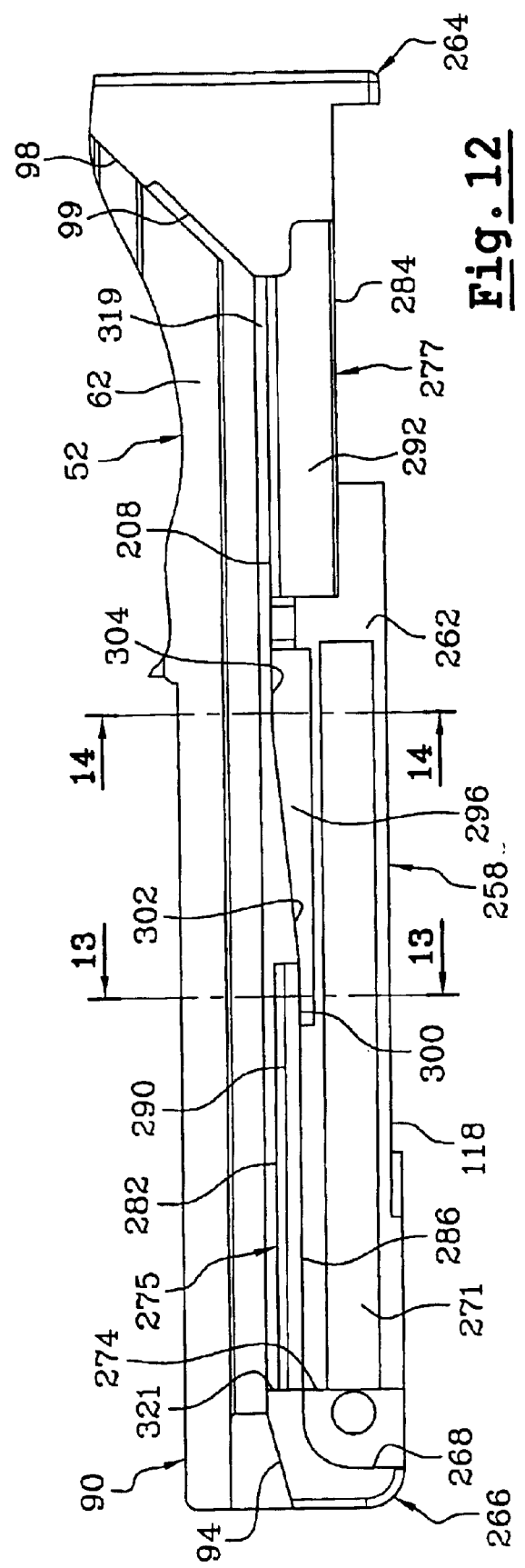

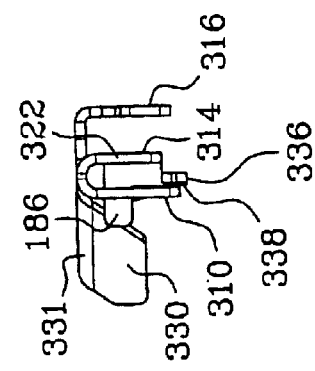
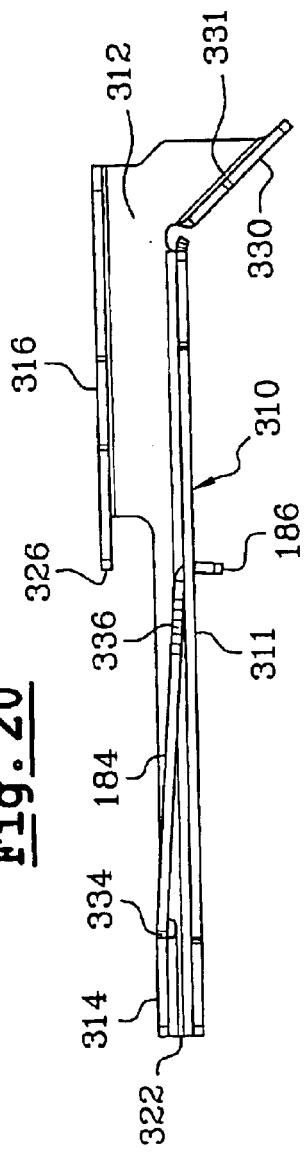
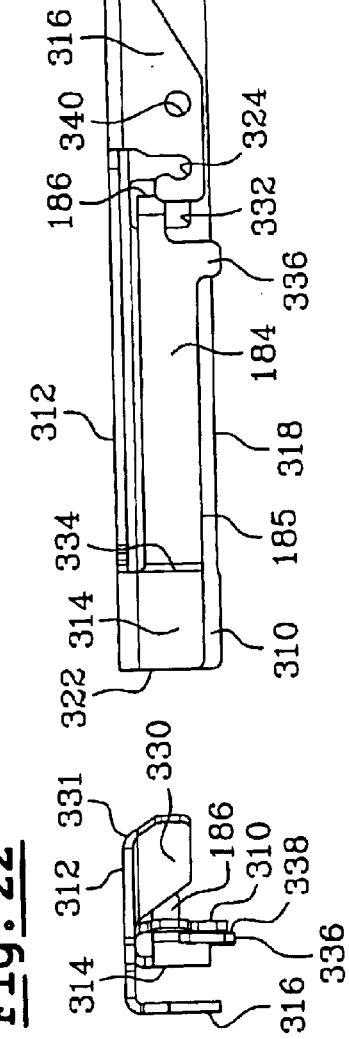
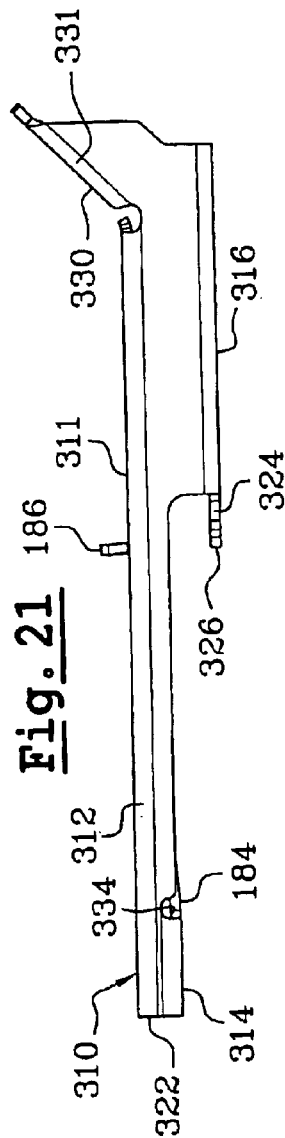

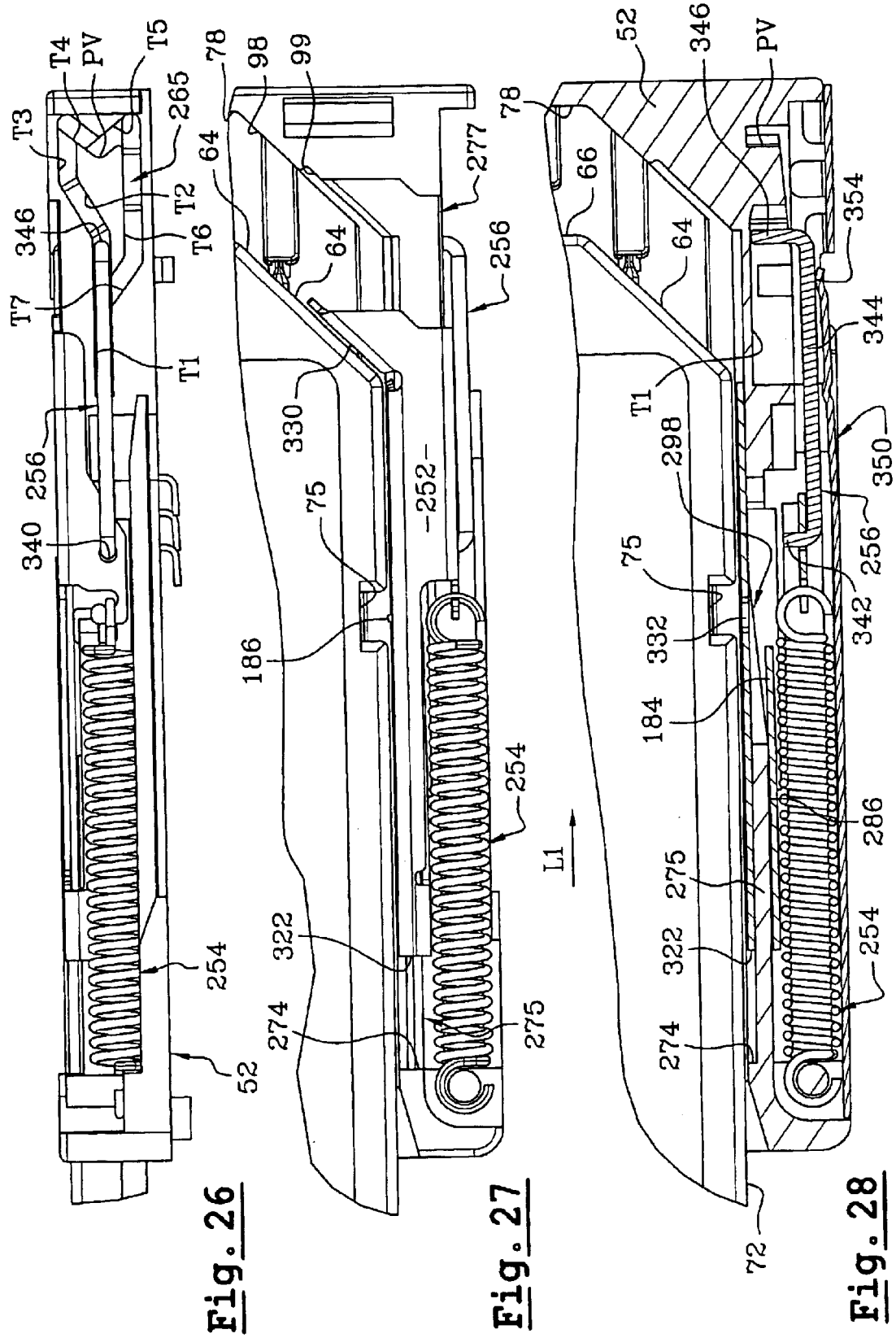

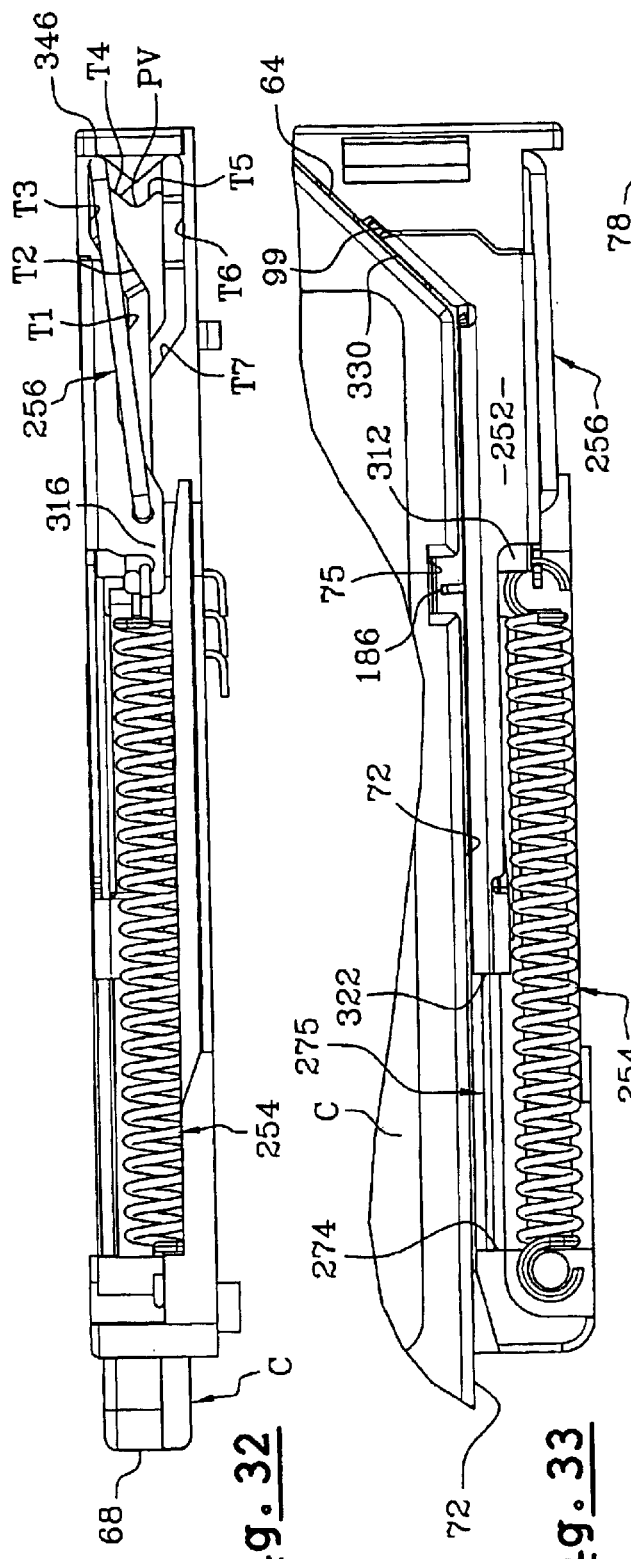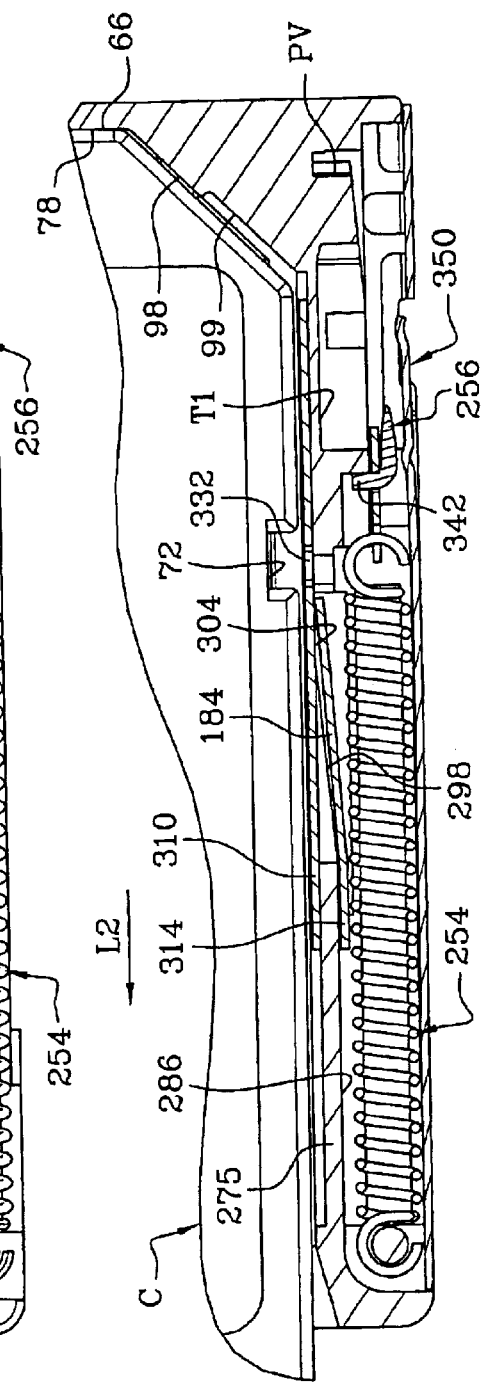

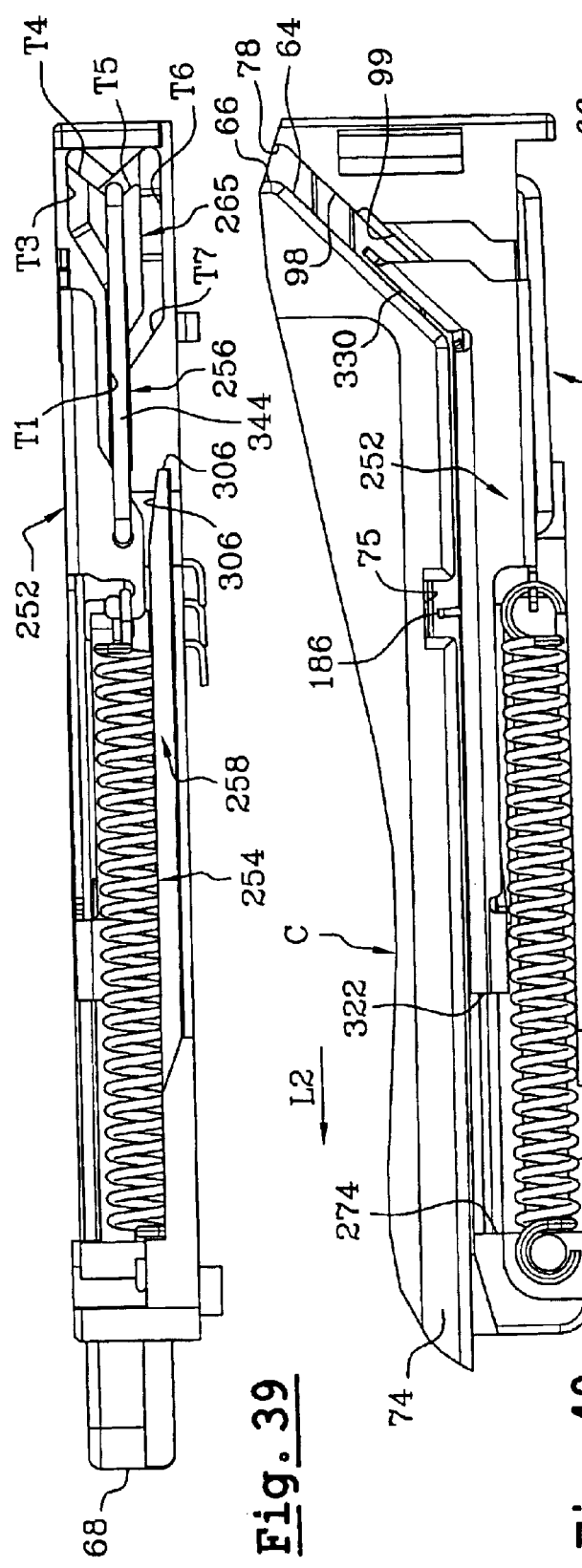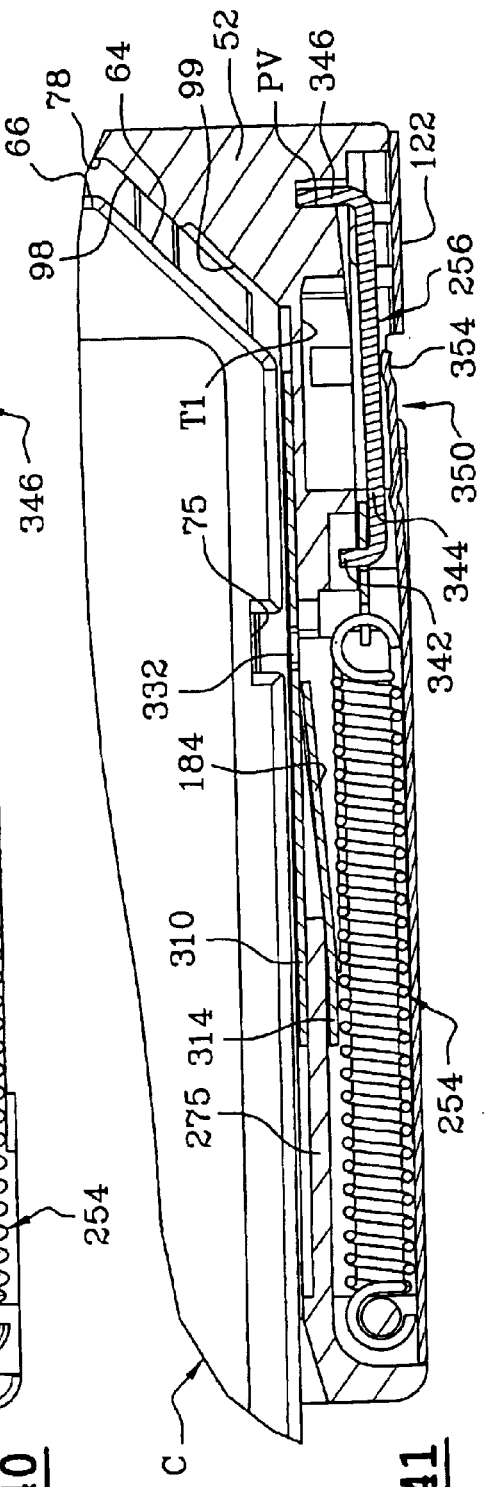
Fig. 39
Fig. 40
Fig. 41

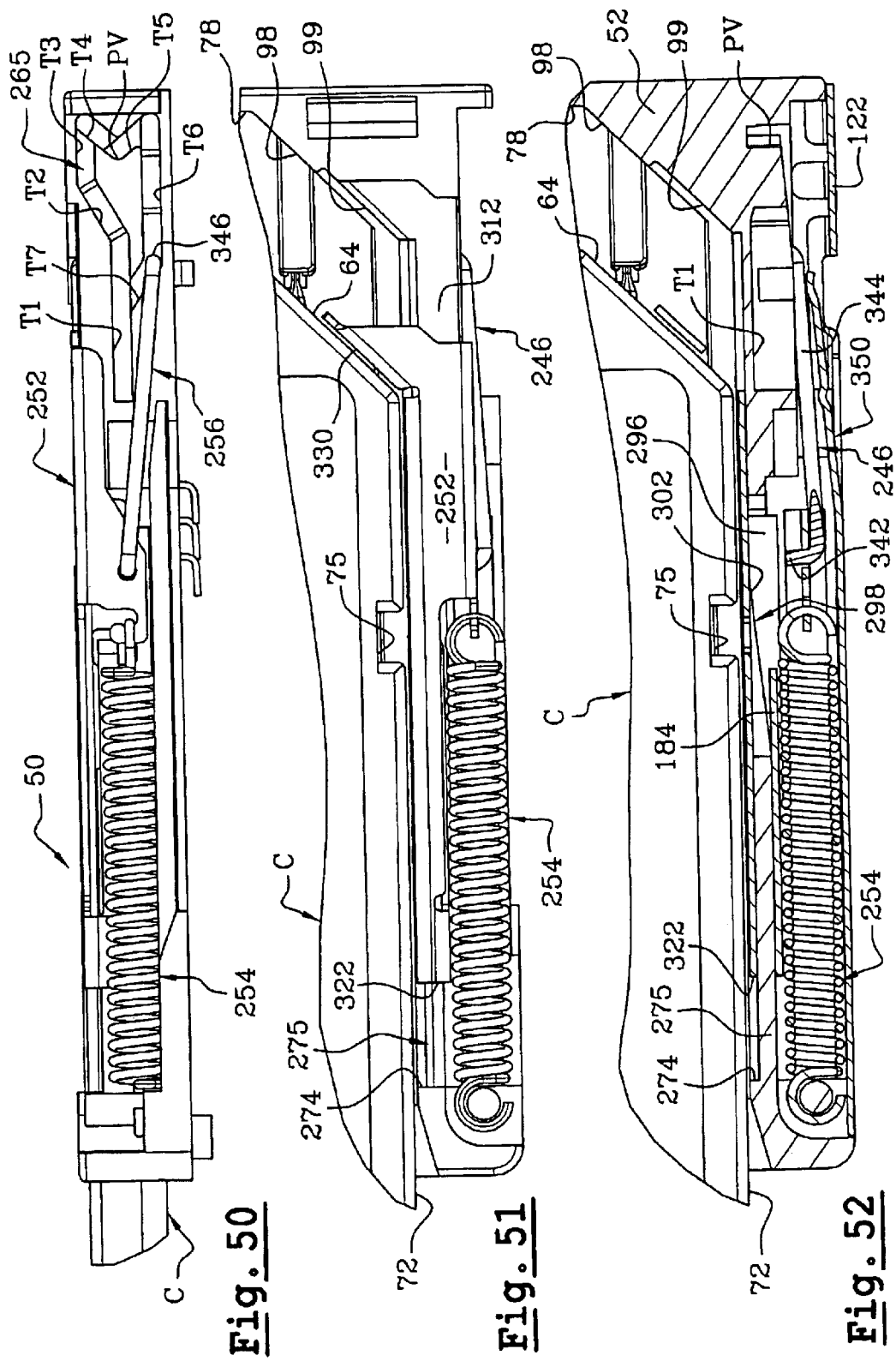

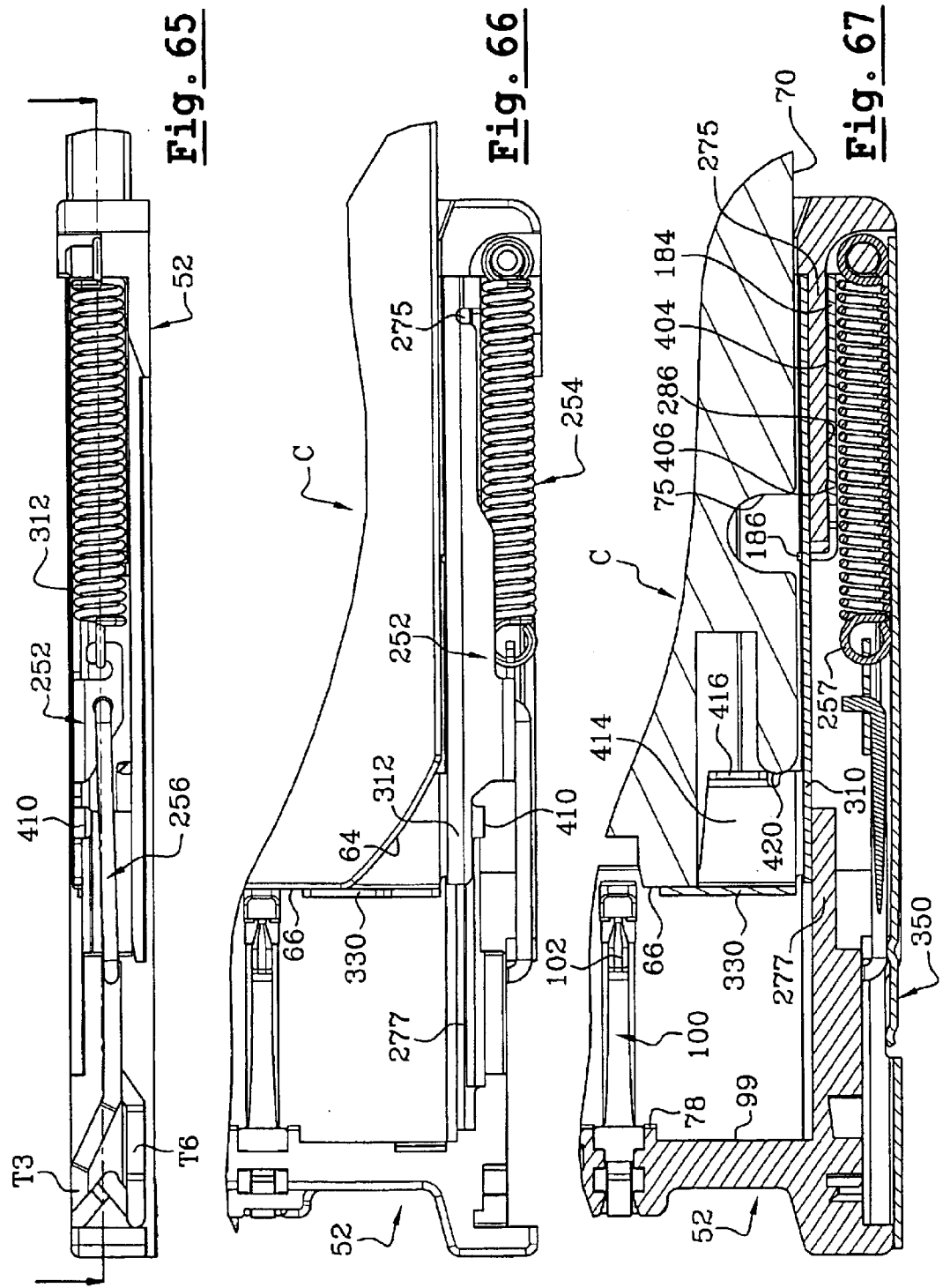

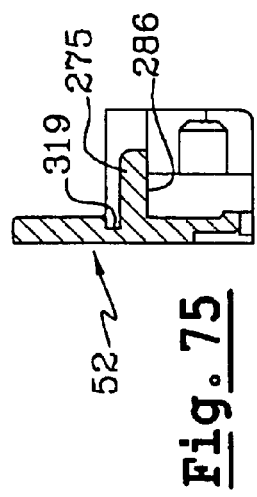
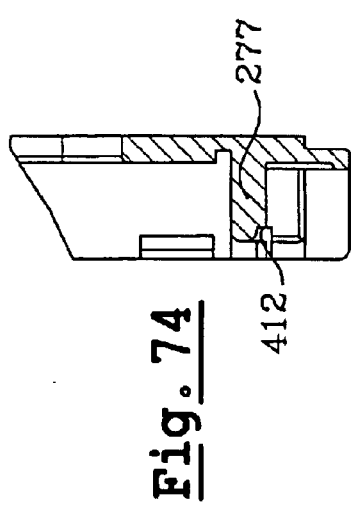
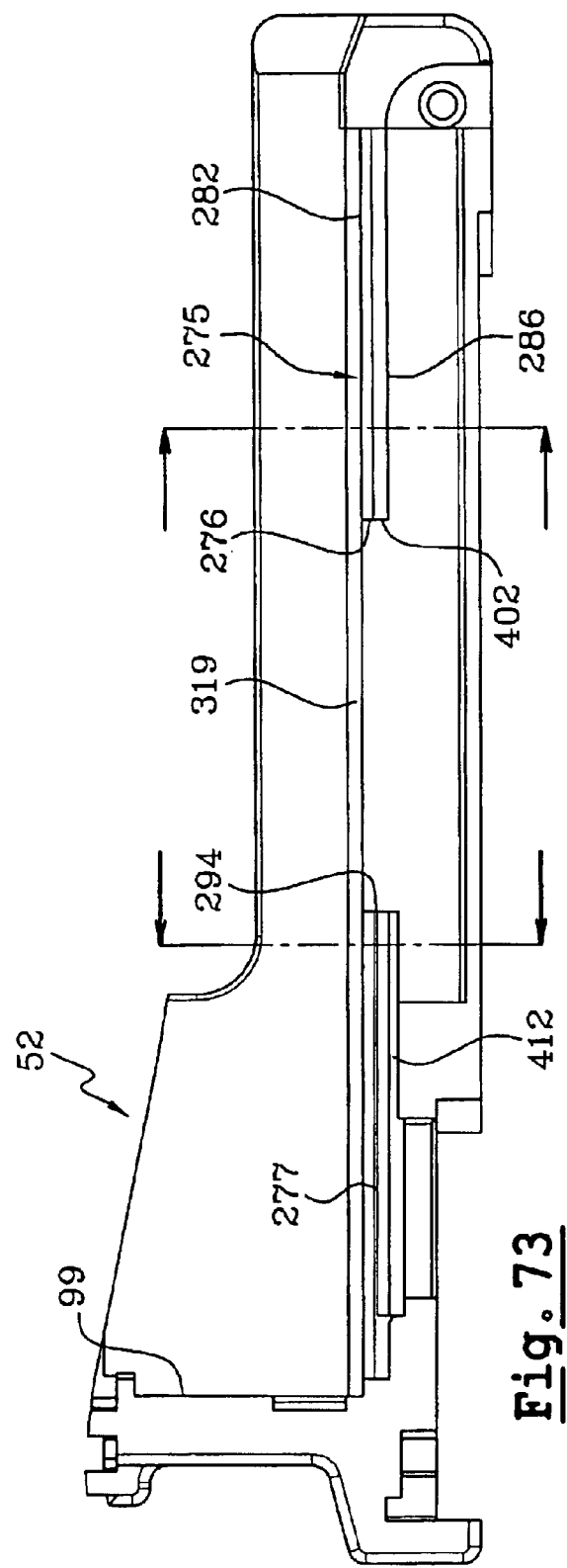

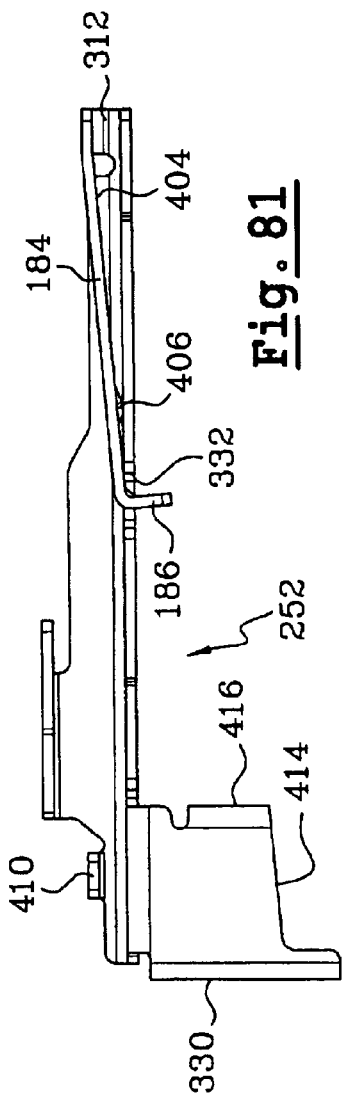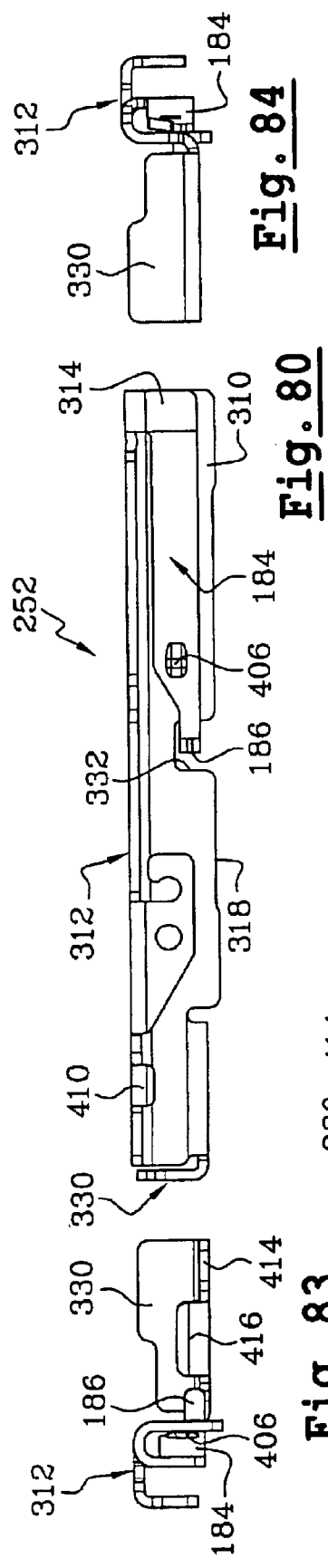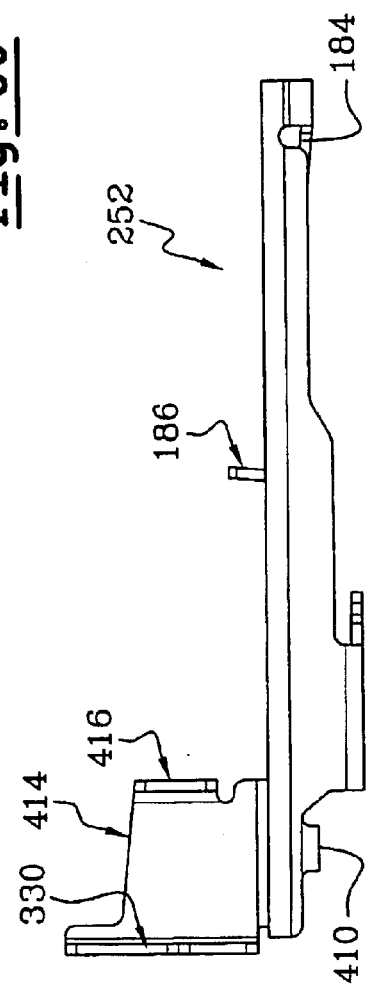

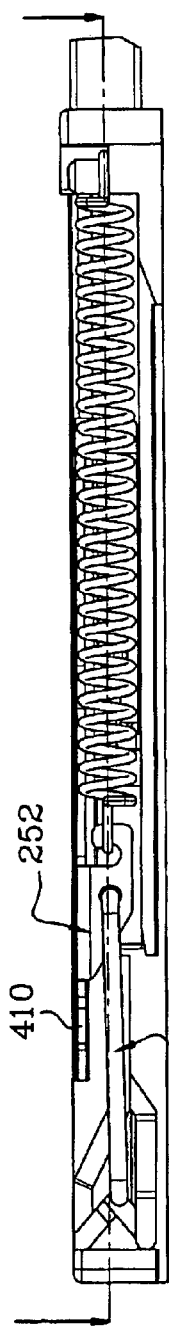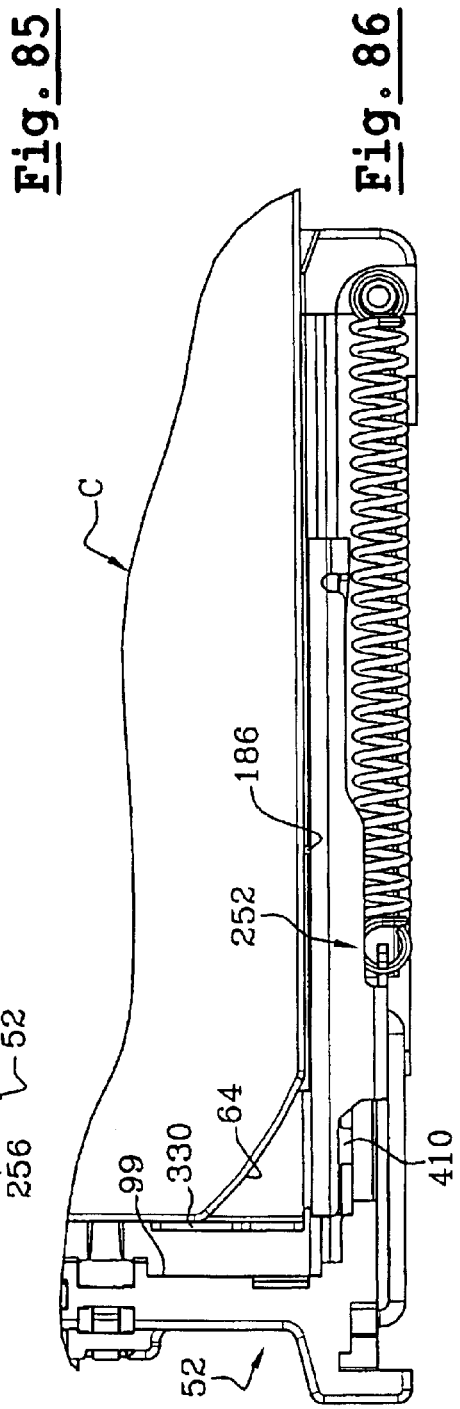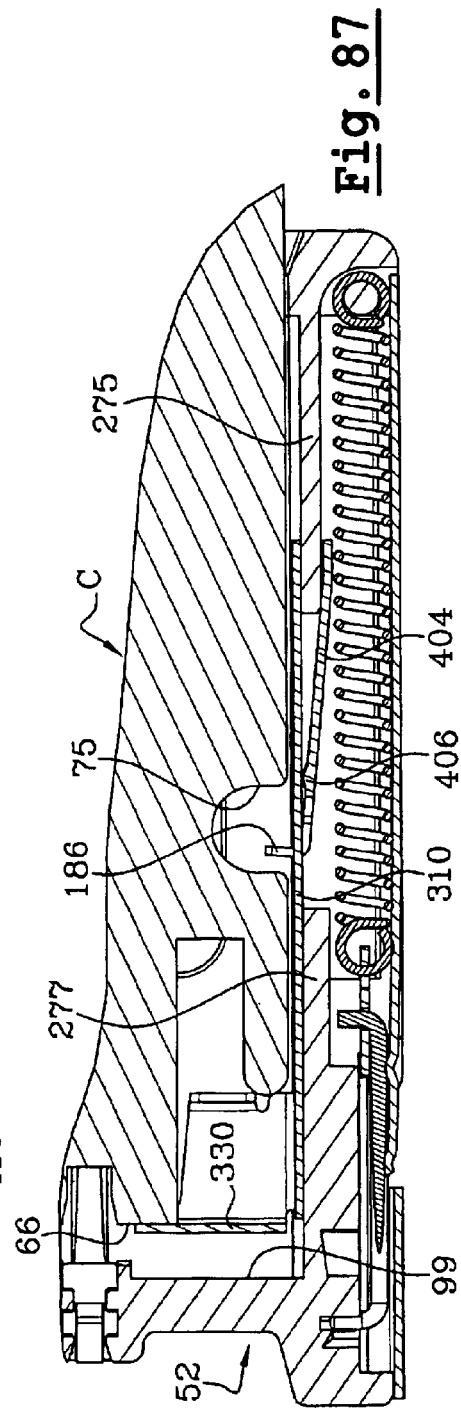

SMART CARD CONNECTOR CARRIAGE

CROSS REFERENCE

Applicant claims priority from PCT/FR02/01418 filed Apr. 25,2002, which claimed priority from French patent application 0105676 filed Apr. 27, 2001.

BACKGROUND OF THE INVENTION

In one type of smart card connector, a smart card is inserted forwardly into a slot to a fully installed position, at which contacts on the connector engage contact pads of the smart card. One popular type of smart card is an SD (Secure Digital) card whose features are specified by SDCA (SD Card Association of San Juan Bautista, Calif.). This card and the popular MSD card, which are of the same width, have a notch in one side that enables the card to be blocked. Another type of popular card is the MMC card which has the same width as the SD card, but which has a smaller thickness and does not have a notch corresponding to that of the SD card.

After a smart card has been fully inserted, it is desirable to prevent accidental pullout of the card, but to enable easy intentional removal of the card. Any mechanism for accomplishing this should operate easily, preferably without the need for an electrically powered device, and occupy minimal additional space. A common type of mechanism for card extraction includes a carriage, and such a carriage should be of simple and compact design.

SUMMARY OF THE INVENTION

In accordance with one embodiment of the present invention, a smart card connector is provided with a carriage of compact design and simple operation, for intentionally ejecting a card and for retaining a fully inserted card until it is intentionally ejected. The connector includes a housing with a molded plastic support that forms at least one upstanding rib lying beside a side of the card path. The carriage is formed of a piece of sheet metal that has been bent to form inner and outer flanges that straddle the rib, the flanges connected by a base that lies on top of the rib.

One of the flanges of the carriage forms a blade with a free end that has a spur for movement into and out of the card path. The support forms a blade—engaging wall that abuts a finger on the blade to deflect the blade free end and move the spur into the card path as the carriage moves forward. Alternatively, the blade tends to move the spur into the path, but is restrained in the rearward position of the carriage. A front end of one of the flanges forms a driving branch that extends into the card path to be engaged by the front edge of the card. The driving branch extends about 45° to the direction of card movement to engage a polarizing cut corner of the card.

The plastic support forms a double click mechanism with a cam recess that receives an inwardly—bent end of a steel wire cam follower. The housing of the card connector includes a sheet metal cover with a vertical side that forms a leaf with a free end. The leaf free end is biased inward against the cam follower to press it inward and keep it in the cam recess.

The novel features of the invention are set forth with particularity in the appended claims. The invention will be best understood from the following description when read in conjunction with the accompanying drawings.

BRIEF DESCRIPTION OF THE DRAWINGS

FIG. 4 is a right side elevation view of the connector of FIG. 2.

FIG. 5 is a partial top view of FIG. 4.

FIG. 6 is a partial sectional view taken on line 6—6 of FIG. 4, with the cover in place.

FIG. 7 is a sectional view taken on line 7—7 of FIG. 6.

FIG. 12 is a partial top view of the right side of the insulative support of FIG. 8.

FIGS. 13 and 14 are sectional views taken on lines 13—13 and 14—14 of FIG. 12.

FIGS. 19–23 are isometric views of the carriage of FIG. 17.

FIGS. 24–29 are views similar to those of FIGS. 2 to 7, respectively, but in which the card has been moved forward to an intermediate, mid-travel, position.

FIGS. 30–35 are views similar to those of FIGS. 24–29, respectively, but in which the card has been moved fully forward and the carriage is in an over travel position.

FIGS. 36–42 are views similar to those of FIGS. 1 to 7, in which the carriage has moved slightly backward from the position of FIGS. 30–35 to its locked position, and the card lies in its final position.

FIGS. 49–52 are similar to those of FIGS. 25–28, in which the card is shown in its intermediate position during ejection of the card.

FIGS. 62–84 and 85–87 are views similar to those of FIGS. 1–23 and 39–41, respectively, that illustrate another embodiment of the invention.

DESCRIPTION OF THE PREFERRED EMBODIMENTS

1. Limited Description of the Invention

Figure 1:
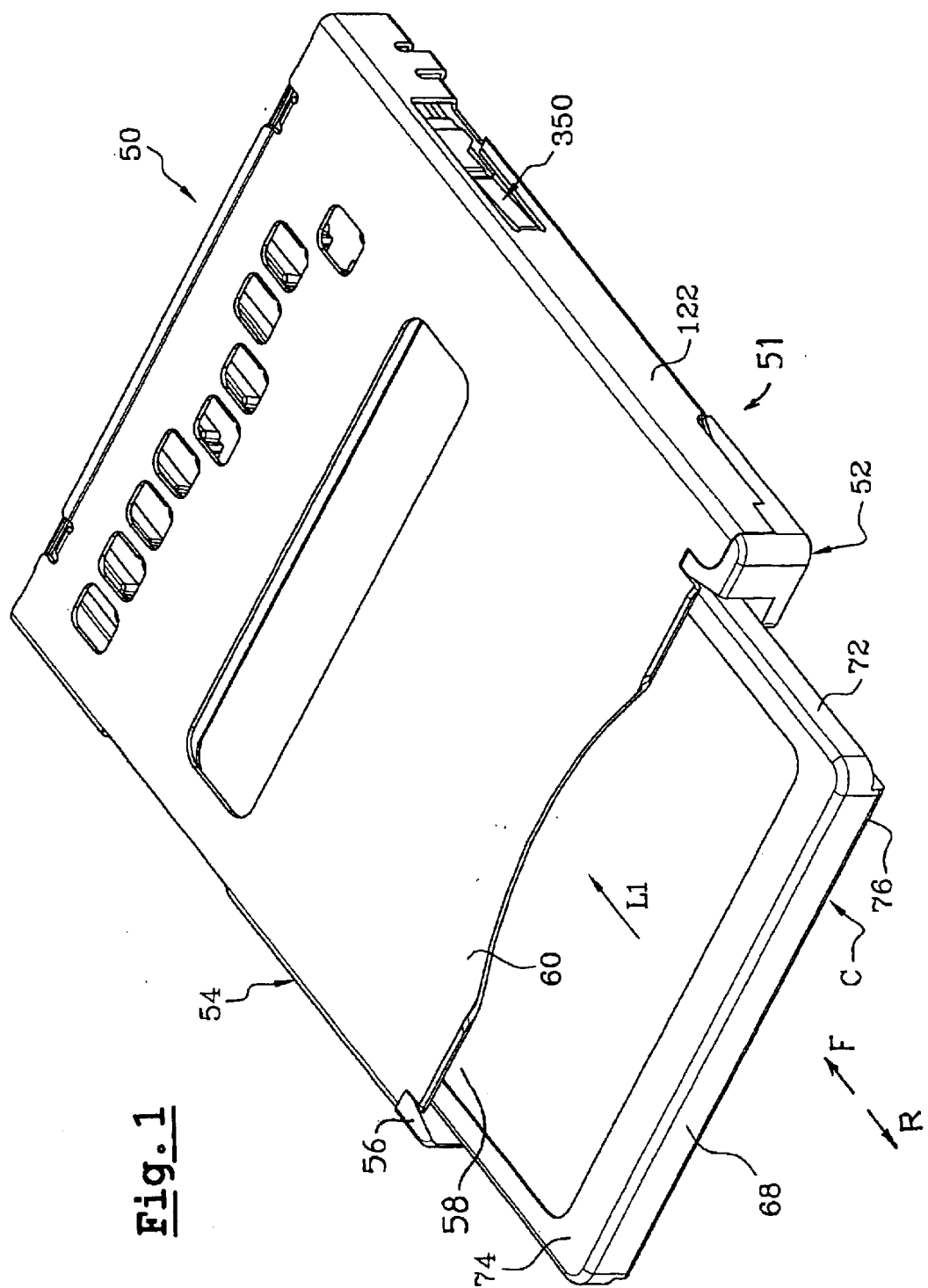
FIG. 1 is a top isometric view of a smart card connector of the present invention, shown with an SD card in a position wherein the card first contacts a carriage.
Figure 2:
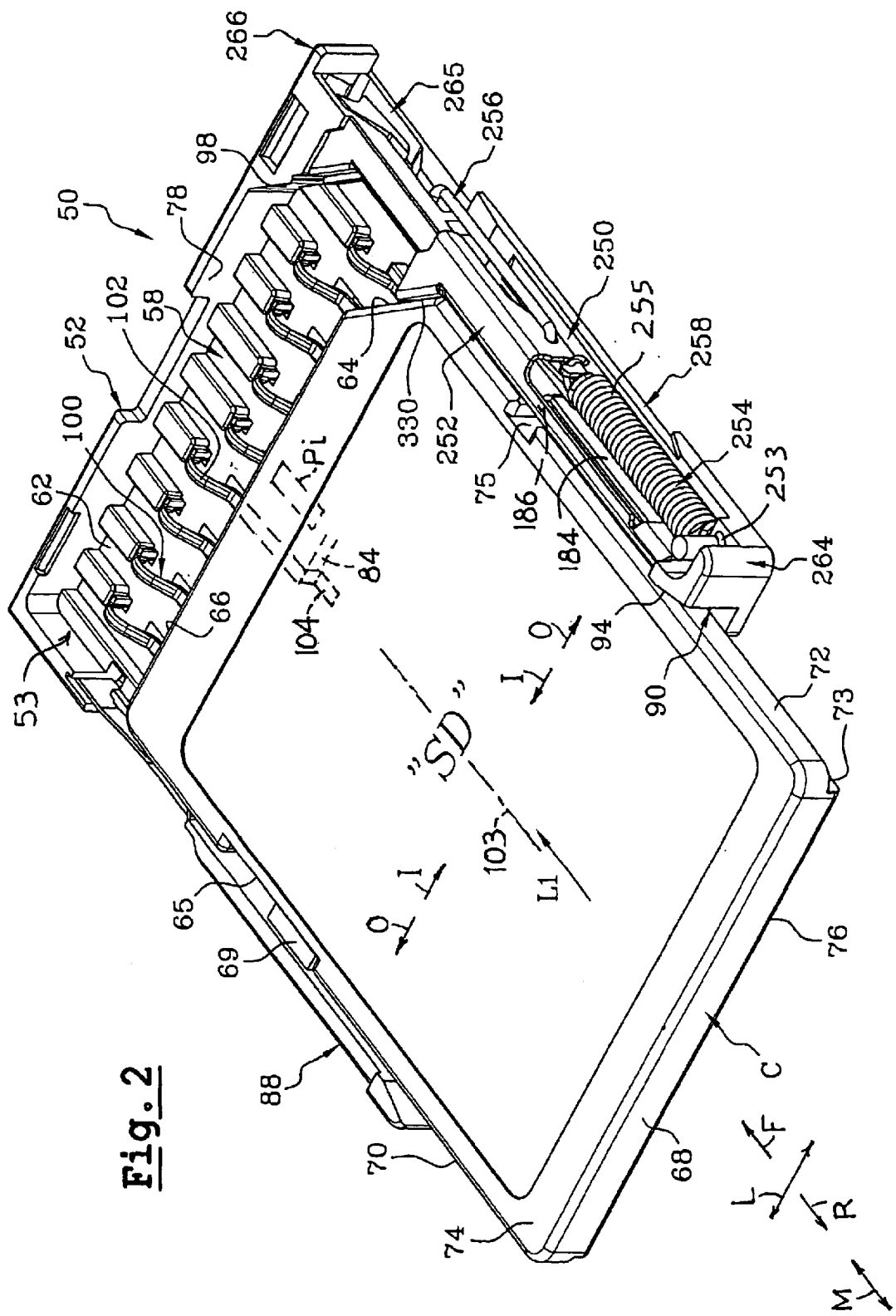
FIG. 2 is an isometric view similar to that of FIG. 1, but with the sheet metal cover removed.

FIG. 1 illustrates a smart card connector 50 that has a slot 58 for receiving a smart card C by forward F insertion of the card into the slot. The slot is formed by a housing 51 that includes a molded plastic insulative support 52 and a sheet metal cover 54. It is possible to mold the support with card hold-downs and not have a cover. As shown in FIG. 2, the card has opposite front end rear edges 66, 68 and laterally L opposite side edges 70, 72. A front end portion of the card has a series of contact pads Pi accessible from its lower face. The connector includes a plurality of contact elements 100 with pad-engaging ends that engage the pads when the card is fully forwardly inserted.

FIG. 2 shows that the connector includes an ejection device 250 for ejecting the card after it has been pushed forward along a card path 53 to its final position and information has been read out of or into the card. The ejection device includes a carrier, or carriage 252 that slides in forward F and rearward R directions on a lateral extension 258 of the plastic support 52. FIG. 2 shows an imaginary longitudinally M extending centerline 103, and shows arrows I and O that indicate directions that are inward I towards the centerline and upward O away from the centerline. The extension 258 extends outward O from the card path.

The ejection device includes a tension spring 254 that urges the carriage rearwardly, while the carriage is pushed forwardly by an inserted card. The ejection device 250 also includes a U-shaped steel rod 256 that forms a cam follower with a front end that projects into a cam recess that forms a cam 265. The combination of the cam follower, or locking hook 256, and cam 265 forms a double click mechanism that locks the carriage in a forward position the first time that the carriage is pushed forward. The second time that the carriage is pushed forward, from its forward position, the double click mechanism releases the carriage to move rearwardly under the force of the tension spring.

The carriage 252 has a driving branch 330 that lies in the path of the card. FIG. 2 shows the connector in its initial position, when the card C has been pushed forward until a polarizing corner 64 of the card has just engaged the driving branch 330, but the carriage 252 has not yet been pushed forward. When the card is pushed further forward, it pushes the driving branch 330 of the carriage forward. The card can be pushed forward until its front edge 66 abuts a front edge wall 78 of the housing support. The double click mechanism then holds the carriage and card close to its most forward position.

Figure 8:
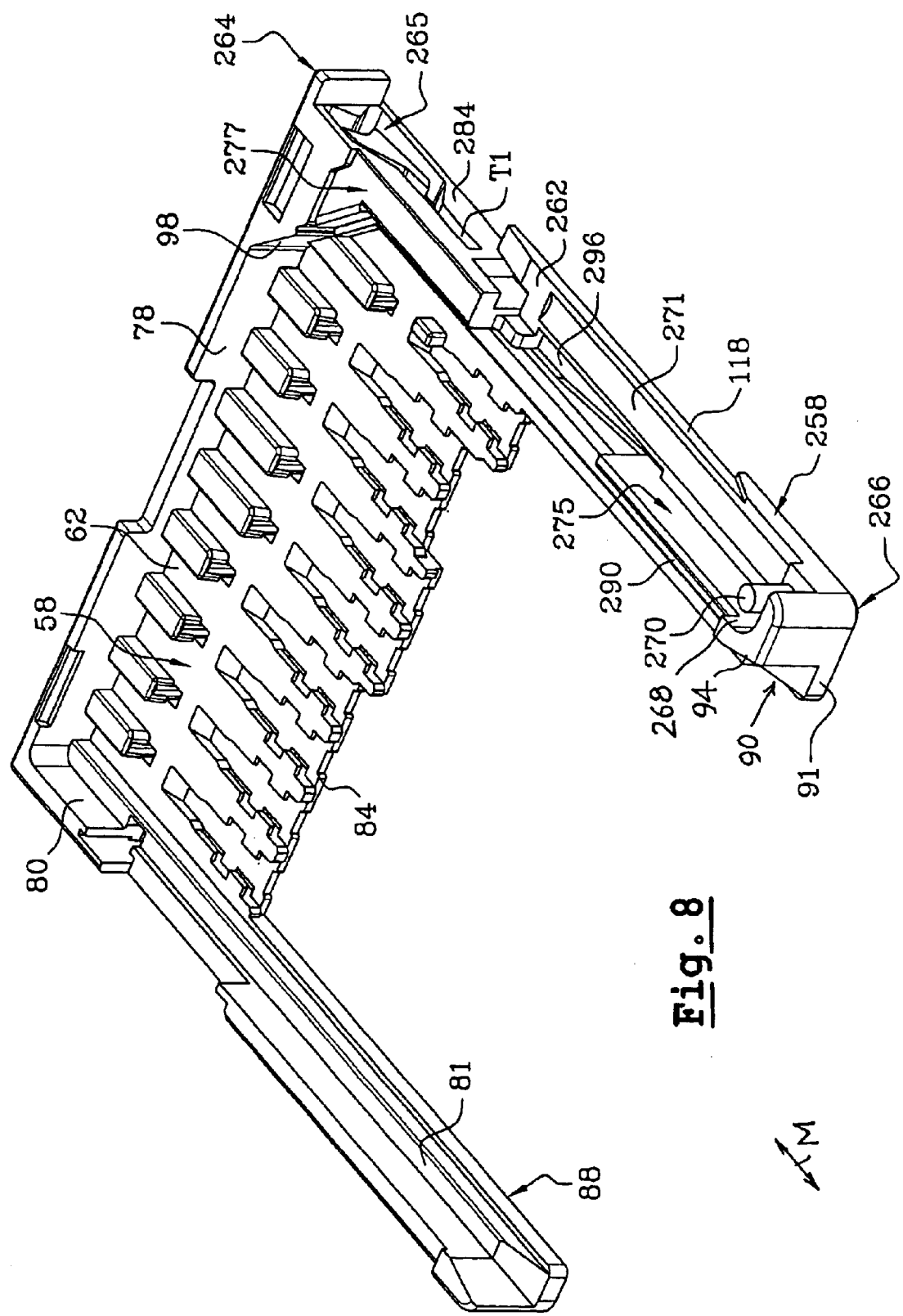
FIG. 8 is a top isometric view of the insulative support of the connector of FIG. 2.
Figure 17:
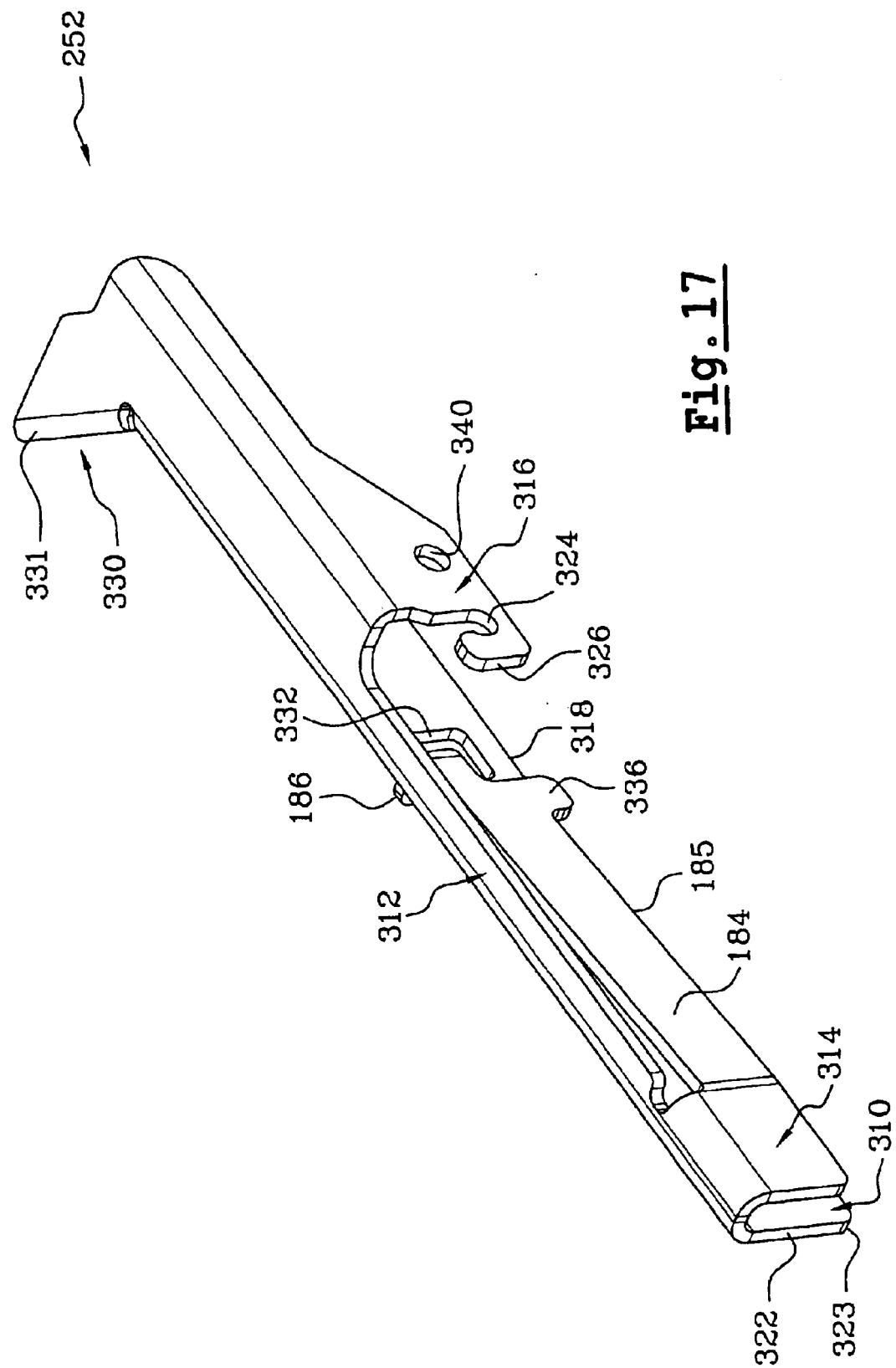
FIG. 17 is a top isometric view of the carriage of the connector of FIG. 2.

FIG. 17 shows that the carriage 252 is formed from a single piece of sheet metal. The carriage has inner and outer flanges 310, 314 and has an upper back, or U-base 312 that connects upper ends of the flanges. The flanges 310, 314 lie in primarily vertical planes. FIG. 8 shows that the lateral extension 258 of the support has a pair of ribs, including rear and front ribs 275, 277. The front rib 277 is wider and forms the cam recess 265. It is possible to consider the ribs as a single rib with a gap.

The U-shaped carriage straddles the ribs, with the inner flange lying against the inner sides of the ribs and the outer flange lying against the outer sides of the ribs. The U-base is held down by the sheet metal cover of the card housing. It is possible to orient the ribs and carriage so the U-base is lowermost or to one side. The provision of a carriage formed from a piece of sheet metal bent into a U shape which straddles one or more ribs on the housing support, provides a simple carriage and simple way of slidably mounting it.

Figure 9:
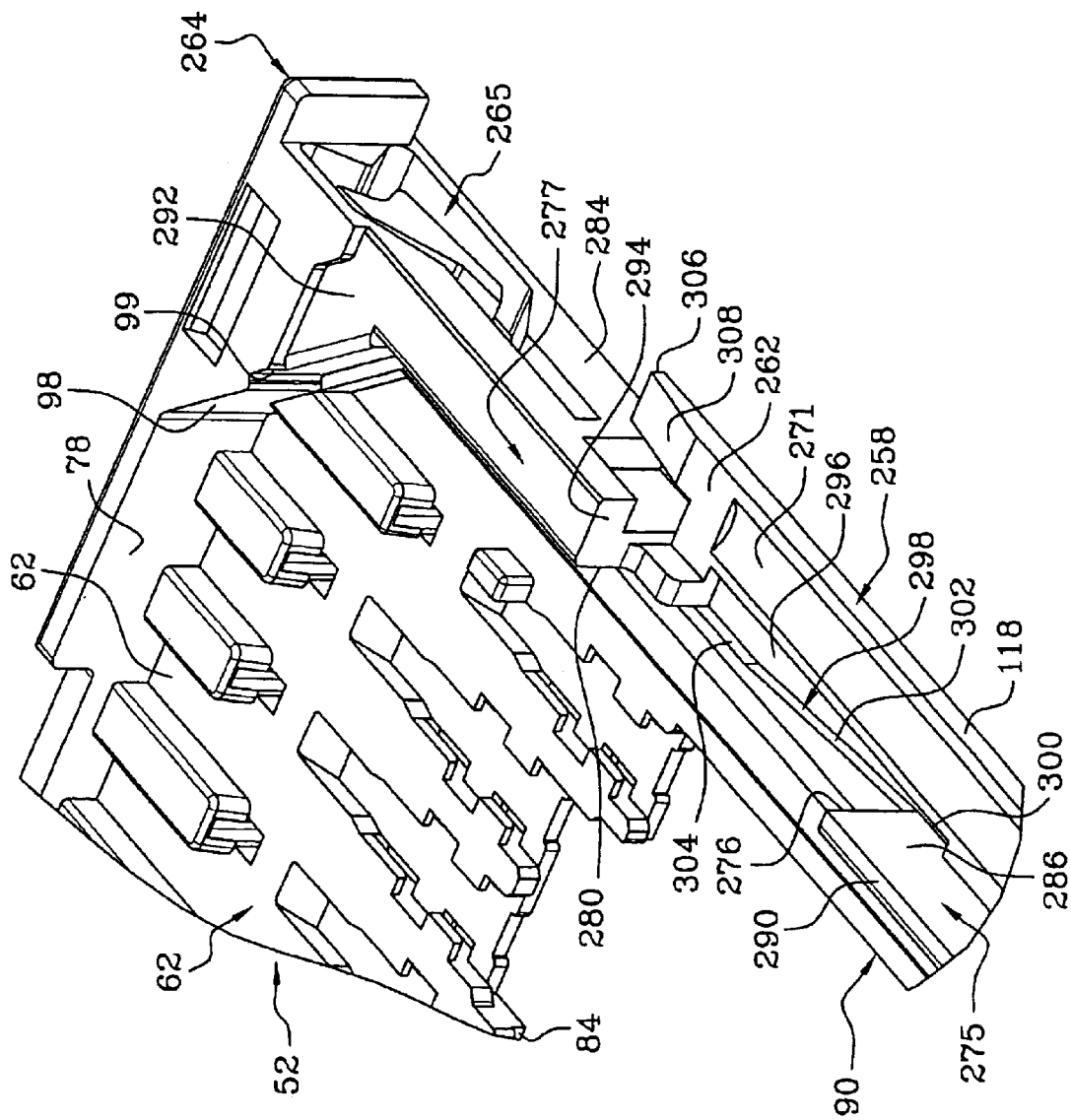
FIG. 9 is an enlarged isometric view of a portion of the support of FIG. 8.

FIG. 17 shows that the outer flange 314 forms a blade 184 with a free front end forming a spur 186. The blade is free to bend because only its rear end merges with the main portion of the carriage. The blade tends to assume the position shown in FIG. 17 in which its spur 186 projects fully inward of the carriage inner flange. The front free end of the blade also forms an actuator finger 336. FIG. 9 shows that the support forms a groove 296 with a blade-engaging wall that engages the actuating finger on the carriage blade to move the spur out of the card path. FIG. 2 shows that the spur 186 initially lies outward of the card path, so the spur does not initially move into the notch 75 at the side of the card. FIG. 27 shows the card in an intermediate position, with the spur 186 not yet moved into the card path. However, FIG. 33 shows the card and the carriage 252 in their full forward positions, with the spur 186 moved into the card path to lie in the notch 75. Thereafter, the spur prevents inadvertent rearward movement of the card, and can push the card rearward when it is desired to remove the card.

If the card does not have a notch 75 (FIG. 33) for receiving the spur 186, the spur will press against the side edge of the card. The spur will still resist accidental pullout of the card. A surface of the rear rib 275 can prevent the spur from engaging a card until the carriage moves forward. This is described later herein. Instead of relying on the tendency of the blade to project its spur into the card path, it is possible to form the groove 296 so it positively moves (through finger 336) the free end of the blade towards the card path when the carriage moves forward. However, this would make it more difficult to remove a card if the carriage is stuck in a forward position. It is possible to make a cover removable (FIG. 59) to remove a card.

Because of the double click mechanism, the carriage initially moves to a full forward position shown in FIG. 32 in which the front of the hook 256 lies at the top of the cam slot portion T4. When a person stops pushing the card forwardly, the front end of the cam follower hook settles in the position shown in FIG. 39. When a person wishes to remove the card, the person pushes the card forwardly a second time, until the hook reaches the position shown in FIG. 45 at the bottom of the cam section T5. When the card is released, the tension spring moves the carriage rearward. The spur 186 pushes the card rearward by several millimeters so the card can be grasped and pulled out, as the carriage moves rearward.

Figure 3:
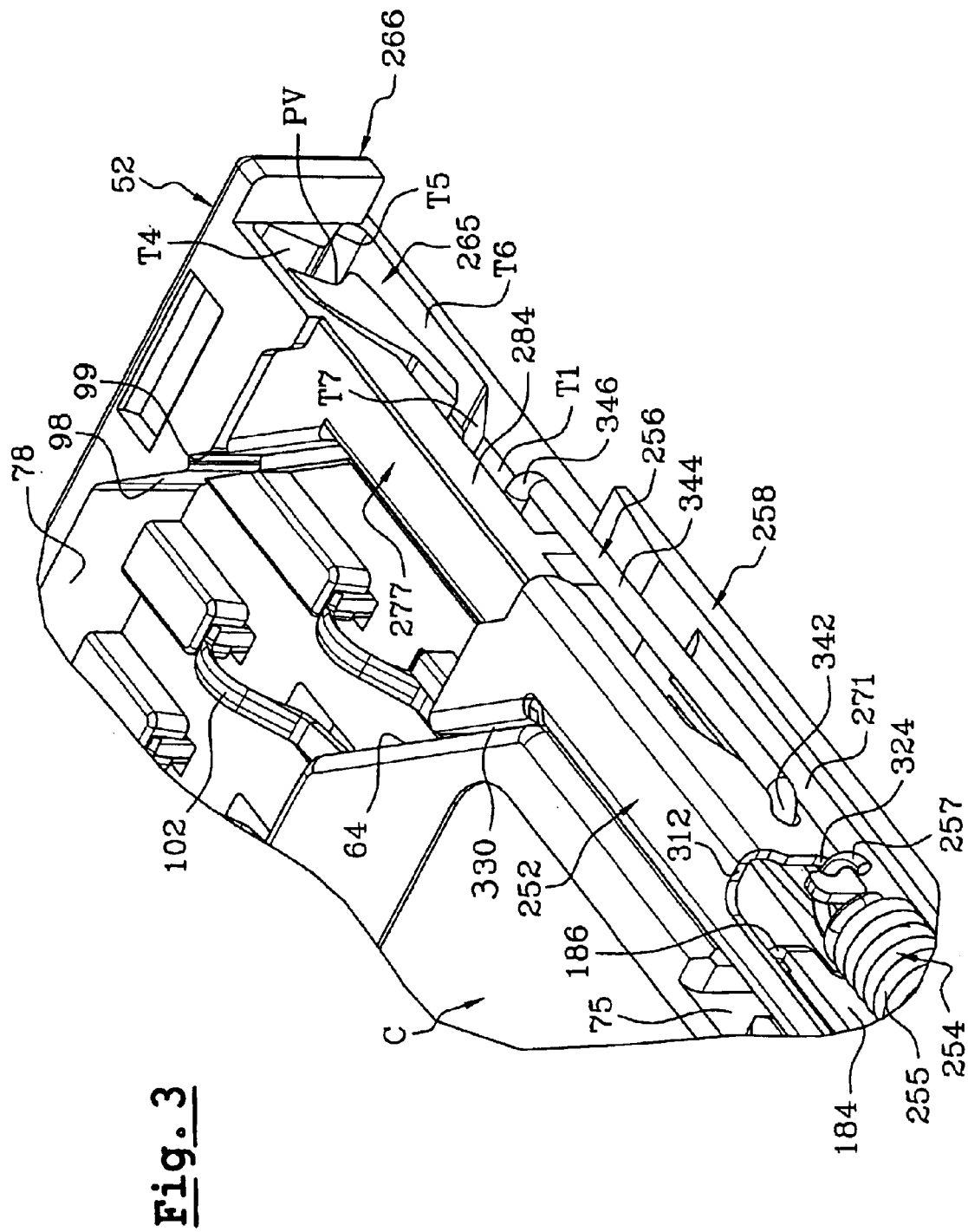
FIG. 3 is an enlarged isometric view of a portion of the connector and card of FIG. 2.

FIG. 3 shows that the drive branch 330 of the carriage engages a polarizing corner 64 of the card. The polarizing corner 64 extends at about 450 to the forward direction and assures that the card cannot be fully inserted upside-down. The support has a recess 99 that receives the drive branch 330. The recess 99 does not add to the overall length of the connector because it lies forward of the card polarizing corner. The sheet metal driving branch 330 extends only a short distance from the rest of the carriage.

The cam follower 256 (FIG.3) has a rear end 342 that projects through a hole in the outer flange of the carriage, and has a front end 346 that lies in the cam recess 265.

Applicant uses the sheet metal cover to push the cam follower 256 inwardly so as to keep it in the cam recess 265. FIG. 1 shows that the sheet metal cover forms a leaf 350 that presses inwardly against the cam follower. This is also shown in FIG. 28.

Although terms such as "vertical" etc. have been used to describe the invention as it is illustrated, it should be understood that the invention can be used in any orientation.

2. Detailed Description of the Invention

Figure 53:
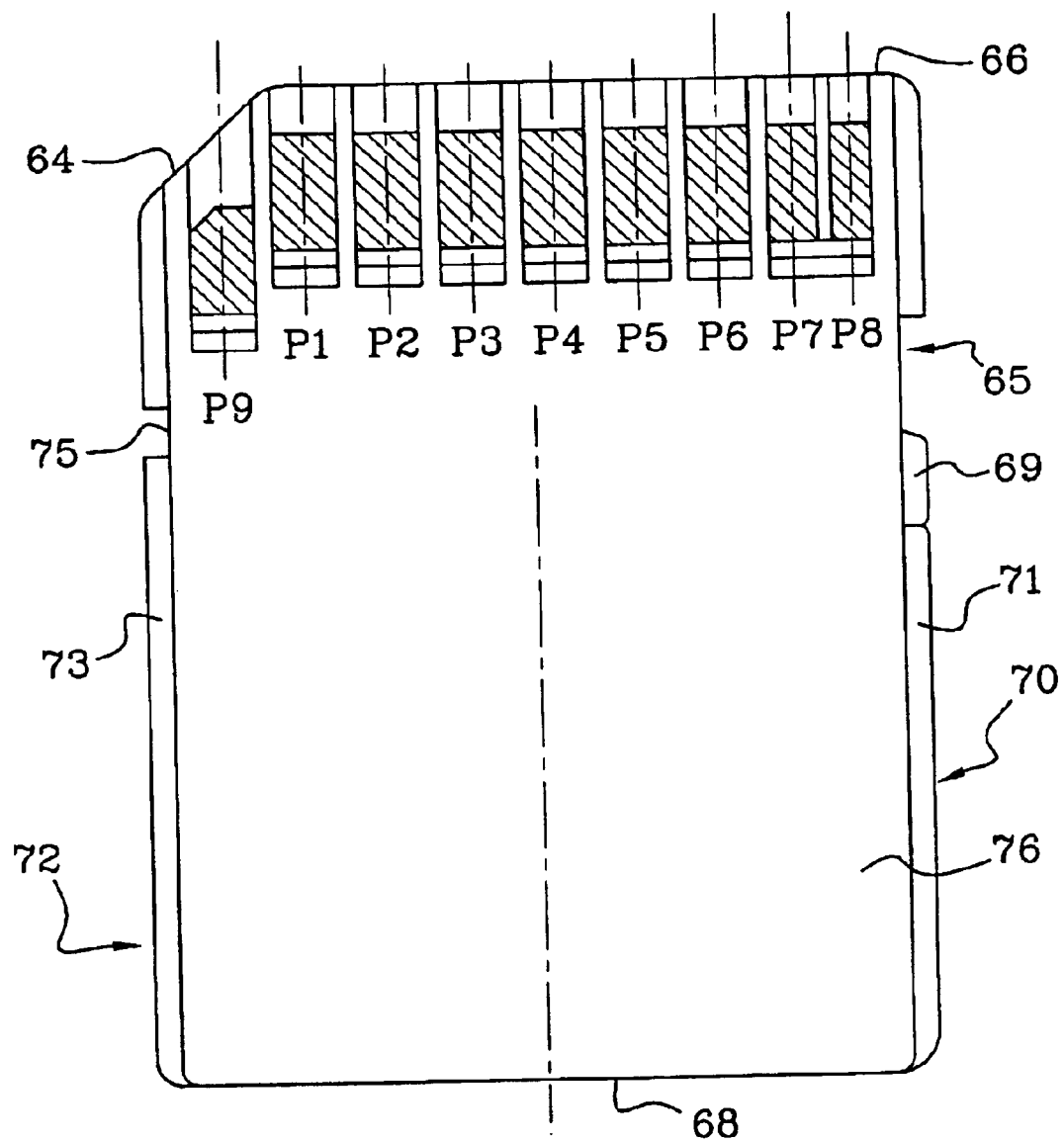
FIG. 53 is a schematic bottom view of an SD card.

FIG. 1 shows an electrical connector 50 that includes an insulating support 52 made of plastic and in the general form of a plate. The support has a planar horizontal upper face 56 in which a card receiving slot 58 is formed. The slot 58 has a lower bottom wall 62 (FIG. 2) and is open longitudinally rearward R for the longitudinal insertion of the front portion of an electronic memory card, which is for example a card C of the SD type shown in FIG. 53 or of the MMC type.

The SD-type card C of known design, shown in the figures, is of rectangular general shape bounded longitudinally by a transverse front edge 66, by a transverse rear end edge 68 and by two opposed parallel lateral edges namely the left lateral edge 70 and the right lateral edge 72.

The right front corner corresponding to the intersection of the edges 66 and 72 has a standardized corner 64 cut at 450 in order to polarize the portion and orient the card C.

The card C has a horizontal upper face 74 and a parallel opposed lower face 76 that is oriented toward the free contact ends 102 of the contact blades of the connector, and in this case downward toward the printed-circuit board CB (FIG. 7). The card C has, near its transverse front end edge 66, a series of conducting contact pads Pi labeled P1–PB (FIG. 53) that are oriented downward toward the printed-circuit board that carries the connector on its upper face.

The card C, when it is a conventional MMC card, or an SD-type card having a blocking notch 75 in its lateral edge 72, is thus capable of being inserted, in the forward direction L1 indicated in FIG. 1. The card can be inserted forward into the slot 58 as far as the point when its front transverse edge 66 butts against a front transverse end wall edge 78 (FIG. 2) that defines the front of the slot 58.

The opposed lateral edges 70 and 72 of the card C are guided slidingly in the housing 58 by opposed parallel longitudinal guide edges 80 and 82 (FIG. 10) respectively, which define the housing 58 transversely.

More precisely, as may be seen in the figures, the edges 80 and 82 have a stepped outline complementary to the outline of the edges 66 and 72 of the SD card (each of which has a step 71, 73, FIG. 7) with the support having a horizontal step 81, 83 over which the card inserted into the connector "slides" so as to be able to house either an SD card, as shown in the figures, or an MMC-type card (not shown in position in the connector) which is then received above the steps 81, 83.

As shown in FIG. 8, the card-receiving slot 58, in which the front portion of the card C is received, is bounded transversely at the front by a front wall 78 and at the rear by a rear edge 84.

To improve the sliding lateral guiding of the card C during its insertion into the slot 58 or its extraction therefrom, the body of the insulating support 52 has two long opposed longitudinal M extensions or arms 88 and 90 that extend longitudinally rearward beyond the rear edge 84 in order to increase the length of the longitudinal guiding edges 80 and 82.

Figure 24:
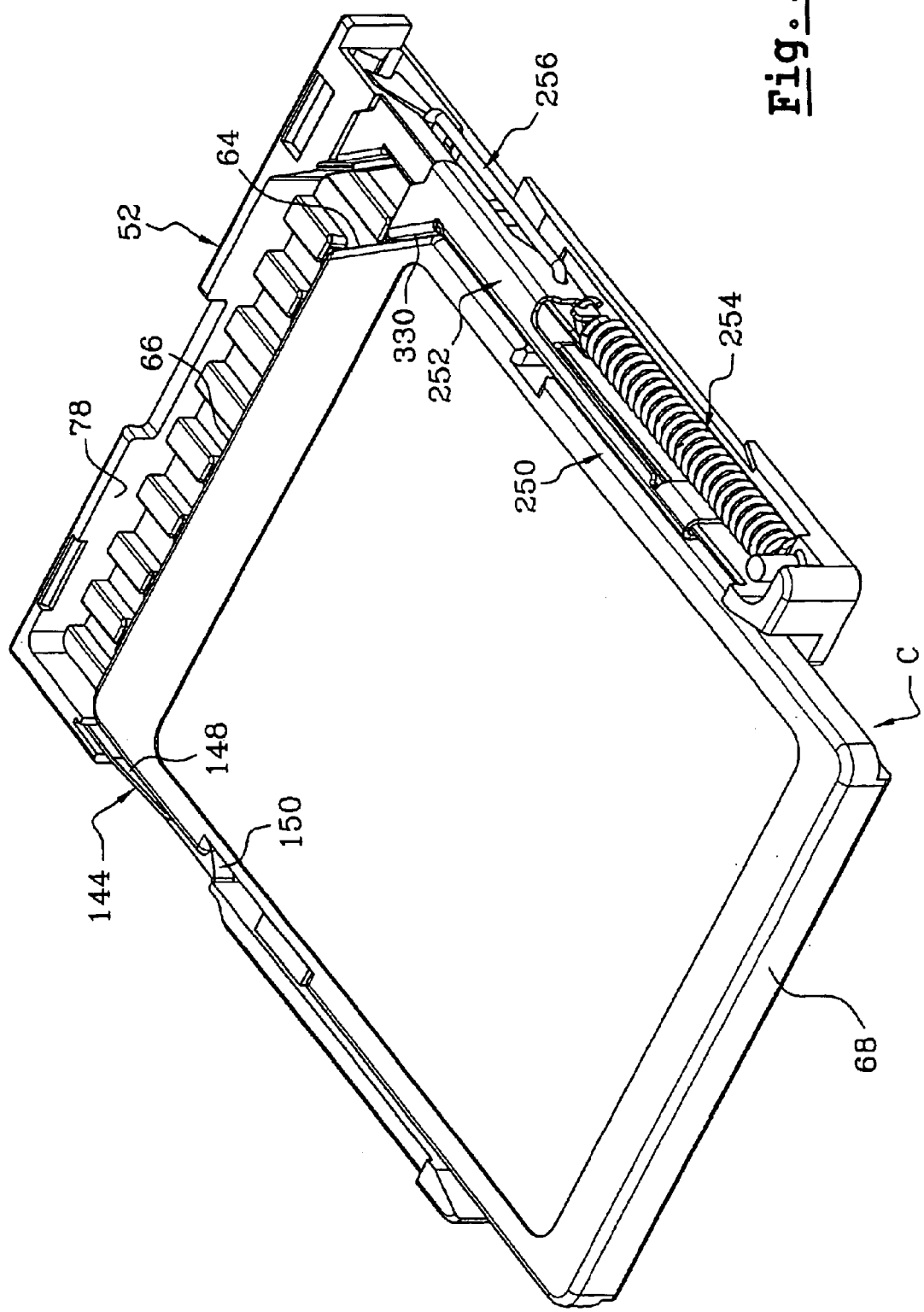

In a known manner, so as to provide the polarization function of positioning and orienting the card C, the corner of the walls of slot, or cavity 58 corresponding to the intersection of the transverse edge of the longitudinal edge 82 has a vertical face 98 inclined at 450, this being complementary to the shape of the cut corner face 64, as may be seen in FIG. 24 when the card C is fully inserted in the correct position.

According to a technique known in the field of connectors for connecting smart cards, the insulating support 52 carries a series of contact elements 100 (FIG. 2) here nine in number, that are produced in the form of elastically deformable blades, a free contact end 102 of which projects vertically above the plane of the bottom face 62 in order to cooperate with the conducting pads that can be seen on the lower face 76 on the card C.

Each contact blade 100 has a tab-shaped rear free connection end 104 that terminates approximately in line with the rear face 84, each connection tab 104 being designed here in the form of a tab to be soldered onto the surface of the upper face of the printed-circuit board.

In the embodiment illustrated in the figures, the connector 50 comprises, in addition to the insulating support 52, a metal or metallized lid (or cover) 54 (FIG. 1) that in particular lies at or above the upper face 56 of the insulating support 52 with its upper plate-shaped main part 60 that closes the card-receiving slot 58 at the top. The metal cover 54 (FIG. 15) has, in order for it to be mounted on the insulating support 52, two parallel laterally L spaced cover sides 120 and 122 that extend vertically downward along corresponding side portions 116 and 118 (FIG. 8) of the vertical outer longitudinal faces of the insulating support 52.

The cover sides 120 and 122 are shaped as slideways, being extended horizontally under the insulating support 52 by inwardly bent-over horizontal branches 124 and 126 (FIG. 7) that are housed in corresponding recesses formed in the lower face of the insulating support 52.

FIG. 2 shows that the connector 50 illustrated in the figures includes an ejection device 250 for ejecting the card from the connector 50.

The ejection device 250 essentially consists of a sliding carriage or slide 252, an ejection spring 254, a U-shaped locking hook 256 and a complementary part 258 of the insulating support 52 comprising in particular a locking cam 265.

More precisely, as may be seen in FIG. 8, the part 258 of the insulating support forming an integral part of the ejection device 250 is a longitudinal portion that projects laterally beyond the card path. The part 258 slightly increases the transverse, or lateral width of the insulating support 52, and therefore of the connector 50, by 2 mm compared with that of a simple connector (i.e. without an ejection device).

The lateral part 258 is open laterally on the right, that is to say toward the outside of the insulating support 52, and is bounded overall by a horizontal end wall 262.

The part 258 is thus overall in the form of a cavity that is bounded at its front end by the right front corner 264 of the insulating support 252, in which in particular the inclined face 98 is formed, and by the right rear corner 266 bounded by the rear transverse face 91 of the longitudinal arm 90 with the card insertion chamfer 94.

The two, right front and right rear, corners 264 and 266 are bounded vertically upward and downward by portions of the upper face 56 and lower face 57, respectively, of the insulating support 52.

The corner or block 266 has a recess 268 in which a vertical cylindrical pin 270 is provided, in order to fasten the hook-shaped rear longitudinal end 253 (FIG. 2) of the spring 254. The spring is a tension coil spring, the body 255 of which is cylindrical being partly housed in a longitudinal housing, of hollow cylindrical section 271 (FIG. 8), formed in the wall 262.

The part 258 has two vertical ribs for guiding the carriage 252 as it slides longitudinally. The first, rear rib 275 of small transverse thickness extends longitudinally forward from a wall 274 of the right rear block 266 and is bounded at the front by a transverse front end face 276 (FIG. 9). The second, front rib 277 is of larger transverse thickness, that is to say that it is bounded laterally to the inside by a vertical longitudinal face 280 which is coplanar with the inner vertical face 282 of the rear rib 275 and is bounded laterally to the outside by a vertical face 284 that is offset laterally to the outside with respect to the outer vertical face 286 of the rib 275.

The height of the two ribs 275 and 277 are approximately the same, the rear rib 275 being bounded by a rounded upper edge 290, while the wider front rib 277 is bounded by a horizontal upper face 292. The height of the rear rib 275 is slightly smaller than that of the front rib 277 in order to guarantee that the lower edge 318 of the inner flange 310 of the carriage 252 slides in the groove 319 of the insulating support, bearing vertically on the bottom of the groove 319 so as the ensure proper guiding when it slides, with low friction.

Figure 10:
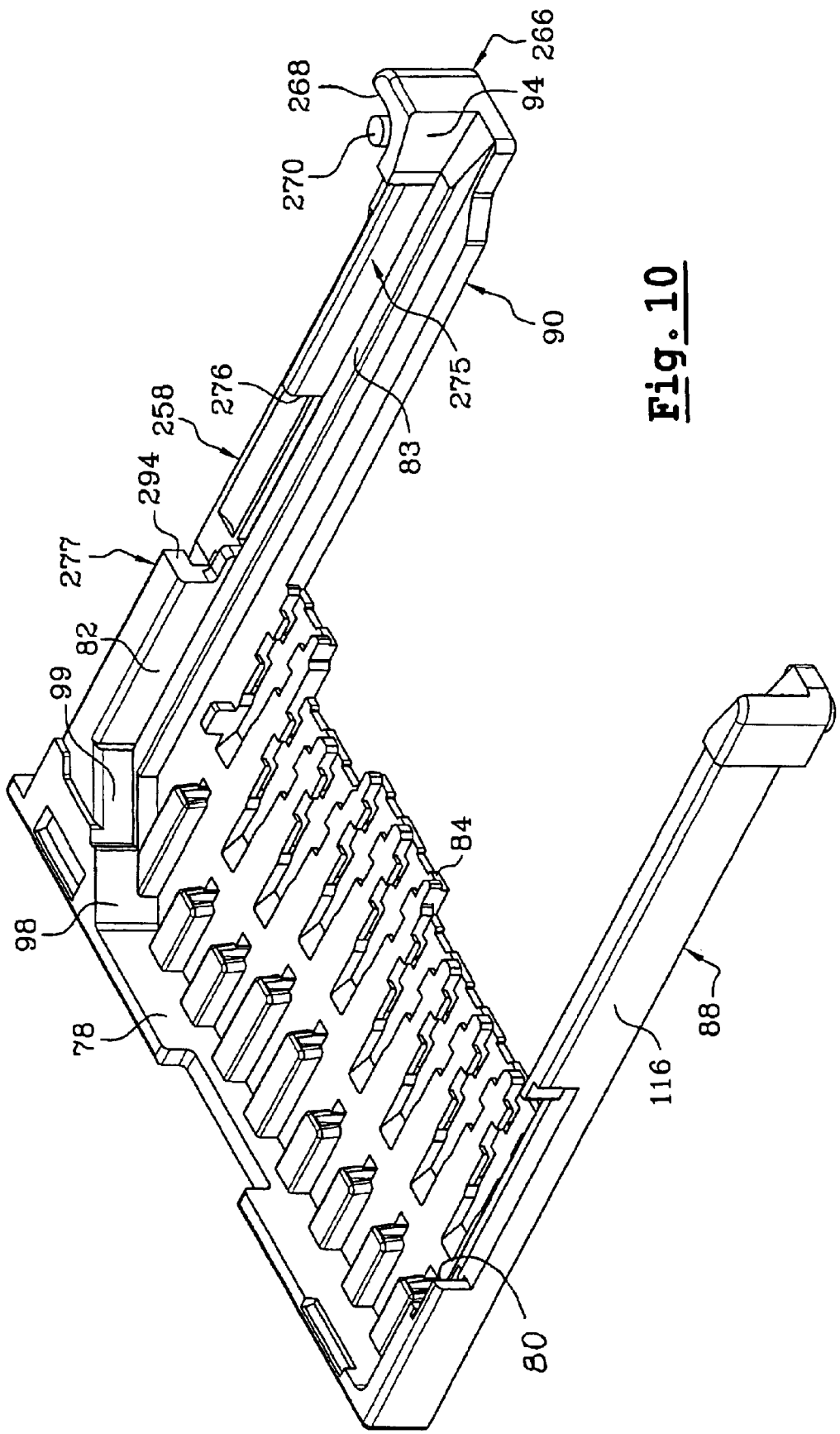
FIGS. 10 and 11 are similar to those of FIGS. 8 and 9, but taken from the left side.
Figure 11:
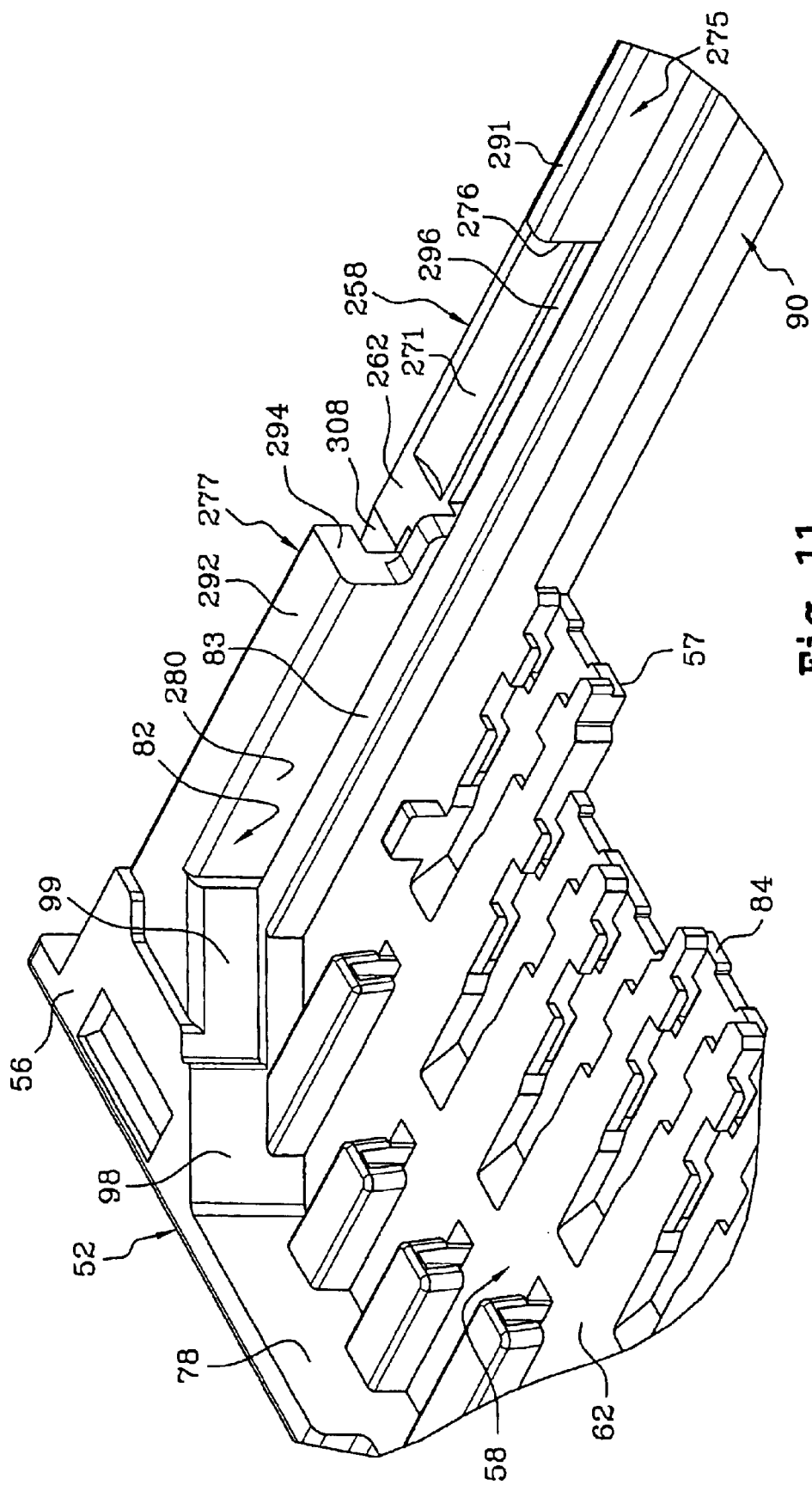

FIG. 10 shows that between the transverse front end face 276 or the rear rib 275 and the transverse rear end face 294 of the front rib 277, the part 258 is open transversely to the inside, toward the slot 58 and therefore toward the right lateral edge 72 of the card when the latter is in the connector. Within the cut-away thus formed in the opposed faces 276 and 294 (FIG. 9), the bottom face 262 has a longitudinal recess 296 that is bounded laterally to the inside of the connector by a vertical edge 298 constituting a cam surface.

More precisely, the cam surface 298 comprises a rear section 300 (FIG. 12) of longitudinal orientation, which lies in the extension of the outer lateral face 286 of the rear rib 275, then an inclined straight central portion forming the ramp 302, and finally a front section 304 of longitudinal orientation, offset transversely to the inside with respect to the rear section 300.

The outer lateral face 284 (FIG. 9) of the front rib 277 is a vertical longitudinal plane face that is perpendicular to the general plane of the card C and is extended longitudinally forward, beyond the actual front rib 277, in order to constitute that face in which the locking cam 265 is formed, the known general design of which is heart-shaped.

As will be explained below, the inward transverse offset of the outer face 284, in which the cam 265 is formed, with respect to the outer lateral face 118 of the insulating support 52, makes it possible to have a cut-away forming a housing for the U-shaped locking member, or cam follower 256 (FIG. 3). This cut-away is open vertically at the top and at the bottom and is bounded longitudinally rearward by a transverse front end edge 306 (FIG. 9) of that part 258 of the support which is thinned near this edge 306 in order to constitute a longitudinal face 308 inclined downward with respect to the horizontal upper face 262, as may be seen especially in FIGS. 3 and 9.

The carriage 252 will now be described in detail with reference to FIGS. 17 to 23. The carriage 252 is produced here in the form of a piece made from cut and folded sheet metal, Overall, it is in the form of a U-shaped member of longitudinal general orientation which, in the mounted position, straddles the rear rib 275 (FIG. 8) and front rib 277 that guide it so as to slide longitudinally in both directions relative to the insulating support 52. For this purpose, the carriage 252 (FIG. 17) essentially consists of longitudinal vertical flanges and a longitudinal horizontal upper back 312.

At its rear end, that is to say in line with the rear rib 275, the carriage 252 has an outer vertical flange 314, giving it a cross section in the form of an upside-down U, the width of which is complementary to the transverse thickness of the rib 275. Likewise, near its front end, the upper back 312 is extended by a front outer vertical flange 316, offset laterally to the outside relative to the rear flange 314 so as to have a cross section in the form of an upside-down U complementary to the front rib 277 that it straddles.

The lower longitudinal edge 318 of the inner flange 310 is continuous and designed to be housed in a longitudinal slot of the insulating support, along the inner faces of the rear rib 275 and front rib 277. The carriage 252 (FIG. 17) is bounded longitudinally to the rear by the rear end edge 322.

The lower rear corner 323 of the flange 310 is capable of cooperating with the rear end 321 of the groove 319 in order to define the rear rest position of the carriage 252 (FIG. 2) relative to the insulating support, toward which position the carriage is elastically returned by the tension spring 254 which is housed for this purpose in a notch 324 (FIG. 3) formed near the rear transverse edge 326 of the front outer lateral flanges 316 of the carriage 252. The inner lateral flange 310 extends substantially over the entire length of the carriage 252 and is bounded longitudinally to the front by a front end edge 328 (FIG. 18).

At its front longitudinal end, the carriage 252 has a driving branch 330 that lies in a vertical plane inclined transversely to the inside relative to the plane of the flange 310 so as to be housed inside the slot 58 (FIG. 2). The driving branch 330 is joined to the carriage back 312 (FIG. 18) via a 90° bend 331. The branch 330 is inclined here at about 45°, that is to say at the angle of inclination of the cut edge 64 and of the face 98 of the insulating support.

As may be seen in the figures, the inclined face 98 (FIG. 3) of the insulating support 52 includes a recess 99 that is sized, as will be explained below, so as to be able to house the driving branch 330 in the forward overtravel position of the carriage 252 and of the card C. The thickness of the sheet metal from which the carriage 252 is made is such that its back 312 that straddles the upper edges 290 (FIG. 12) and 292 of the ribs 275 and 277 is located slightly set back vertically with respect to the horizontal upper face 56 (FIG. 3) of the insulating support. This allows the carriage 252 to slide longitudinally relative to the insulating support 52 under the upper horizontal plate 60 of the cover 54 that lies horizontally above the back 312 of the carriage 252.

Figure 18:
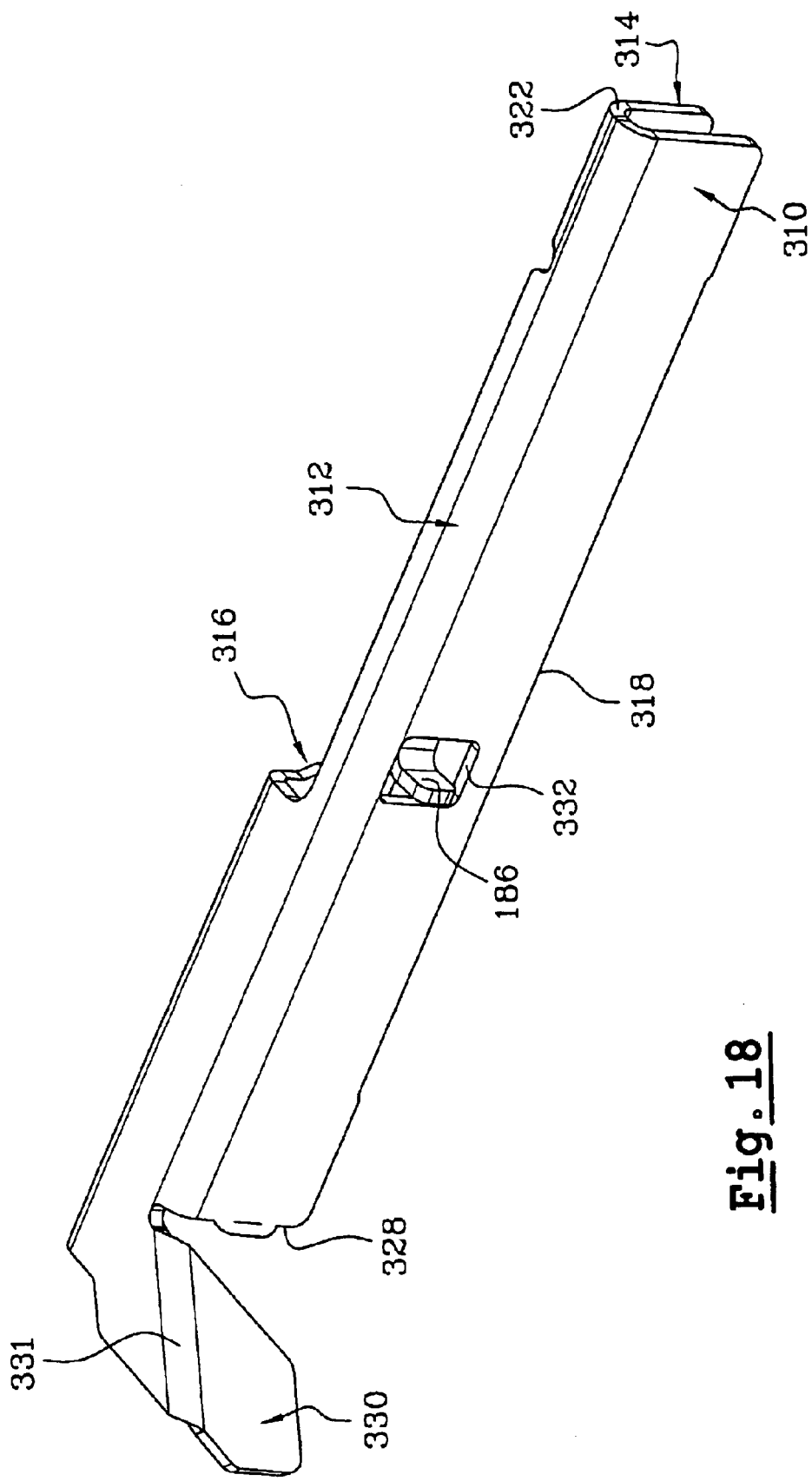
FIG. 18 is a view similar to FIG. 17, but taken from an opposite side.

As may be seen in FIG. 18, the inner flange 310 also has a rectangular window 332 placed at approximately mid-length, which is designed to allow passage of a spur 186 for blocking notch 75 (FIG. 2) of the right longitudinal edge 72 of said card. The spur 186 is formed at the front longitudinal end of a resilient blocking blade 184 (FIG. 20) that is made as one piece, by cutting and folding, with the carriage 252. More precisely, the blade 184 extends longitudinally forward from the front transverse edge 334 of the rear outer flange 314 making an angle to the vertical plane of the latter, that is to say that, in what is referred to as its rest state, as may be seen in FIGS. 20 and 21, the blocking blade 184 and 74spur 186 extend generally inwardly. As may be seen in FIGS. 19 and 20, the spur 186 extends through the window 332 so as to project transversely inward by about 0.6 mm beyond the inner face 311 of the inner vertical flange 310 of the carriage 252.

Near its front free end, the lower edge 185 (FIG. 19) of the blocking blade 184 has an actuating finger 336 that extends vertically so that, in the mounted position, it lies in the cut-away 296 (FIG. 9) and so as to be able to cooperate via its inner vertical lateral face with the cam 298, toward which it is elastically urged, continuously, when the carriage 252 is in the mounted position.

According to this design, the guiding point formed by the actuating finger is therefore fixed longitudinally relative to the cam profile 298, along which it moves in synchronism with the card C.

Finally, the front outer flange 316 (FIG. 19) has a hole 340 intended to house the rear end strand 342 (FIG. 6) of the U-shaped locking member 256.

As may be seen in FIG. 6, the U-shaped cam follower member 256 is a bent wire element having a main portion 344 of longitudinal orientation and two perpendicular strands, a rear strand 342 and a front strand 346, which, in the mounted position of the U-shaped member, extend transversely to the inside so that the strand 342 lies in the hole 340 (FIG. 19) in the carriage 252 and so that the front strand 346, of greater length, lies in the heart-shaped locking cam 265.

The cover 54 (FIG. 1) according to the invention differs essentially by the presence of a resilient tab 350 that is made in one piece with the rest of the cover. The tab 350 extends longitudinally to the front in order to lie opposite the cam 265 (FIG. 3) and in order for the main longitudinal strand 344 (FIG. 6) of the hook 256 to be elastically urged, continuously, this being achieved by means of two bends 352 and 354 (FIGS. 6, 15) according to the longitudinal position of the hook 256 relative to the cover 54 with its blade 350 for keeping the hook in place.

The left edge 70 (FIG. 2) of the SD card has a write protect device, which is a notch 65 in which a cursor 69 may occupy a rear position when the protect device is not activated and a forward position when the protect device is activated. The connector includes a switch 140 for detecting the longitudinal position of this cursor.

Figure 56:
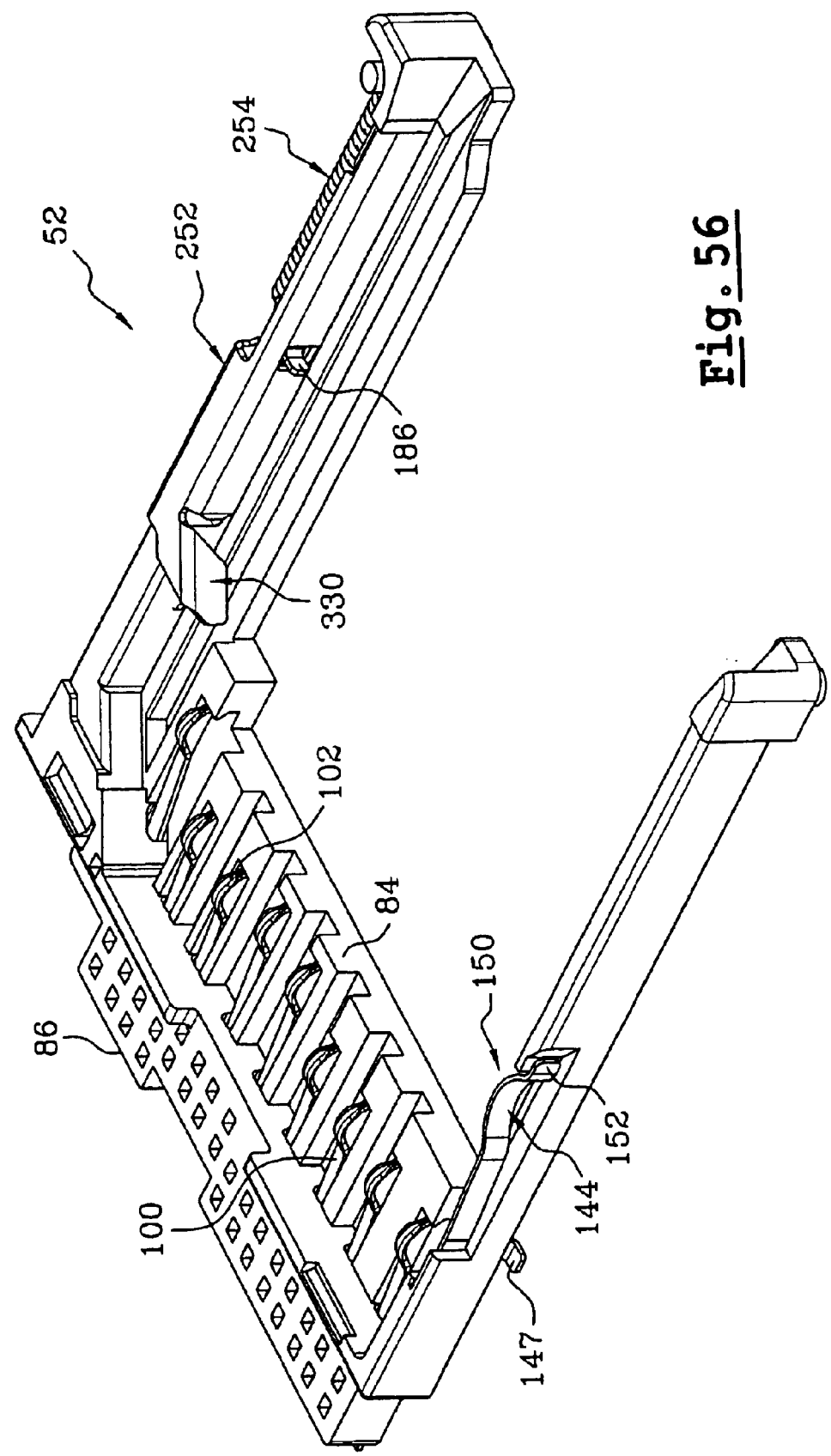

For this purpose, a switch has a contact blade 142, incorporated into the metal cover, and a movable detection blade 144 (FIG. 56) mounted on the insulating support 52.

Figure 15:
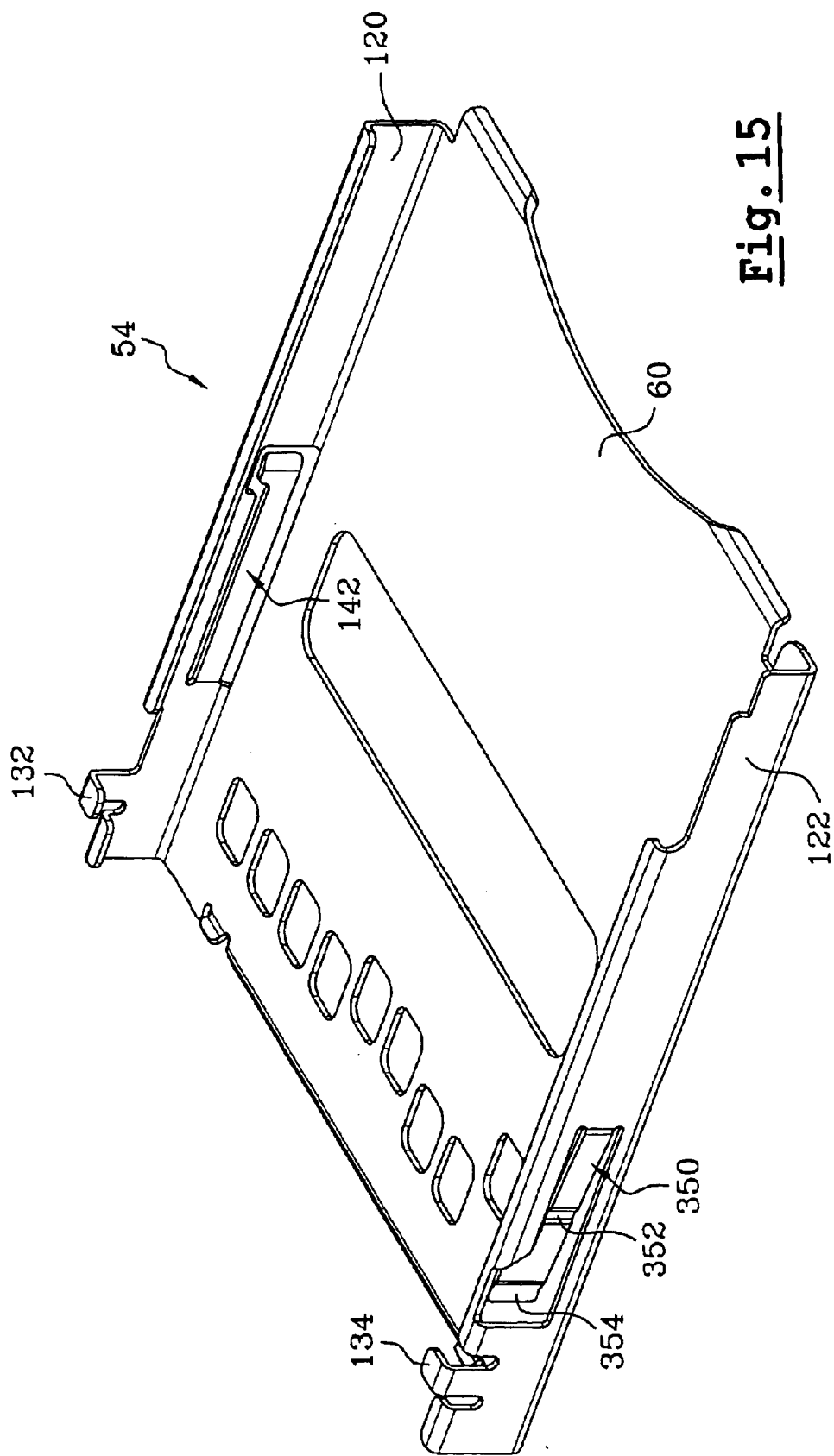
FIG. 15 is a bottom isometric view of the sheet metal cover of the connector of FIG. 1.
Figure 16:
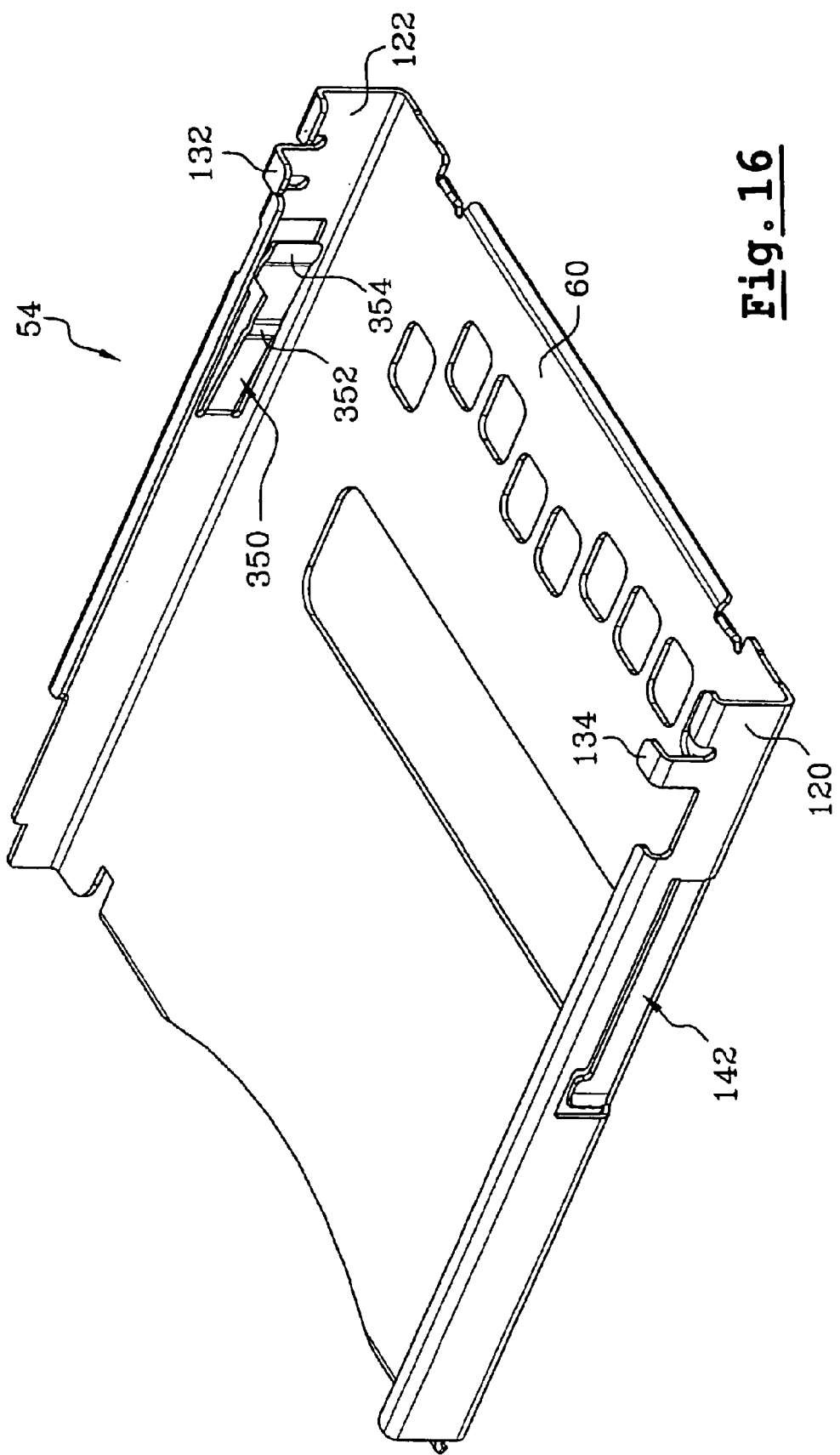
FIG. 16 is a view similar to FIG. 15 but taken from an opposite side.

As may be seen especially in FIGS. 15 and 16, the left cover side wall 120 of the cover 54 forms the blade 142 which is electrically grounded, as is the cover 54 via soldered tabs 132 and 134. The movable blade 144 (FIG. 56) is of longitudinal overall orientation and it has a front fitting and connecting foot that is housed in a complementary hole formed for this purpose in the insulating support 52 near the lateral edge 80. The foot includes a connecting tab 147 intended to be soldered or attached in contact with an associated conducting track on the printed-circuit board.

Figure 58:
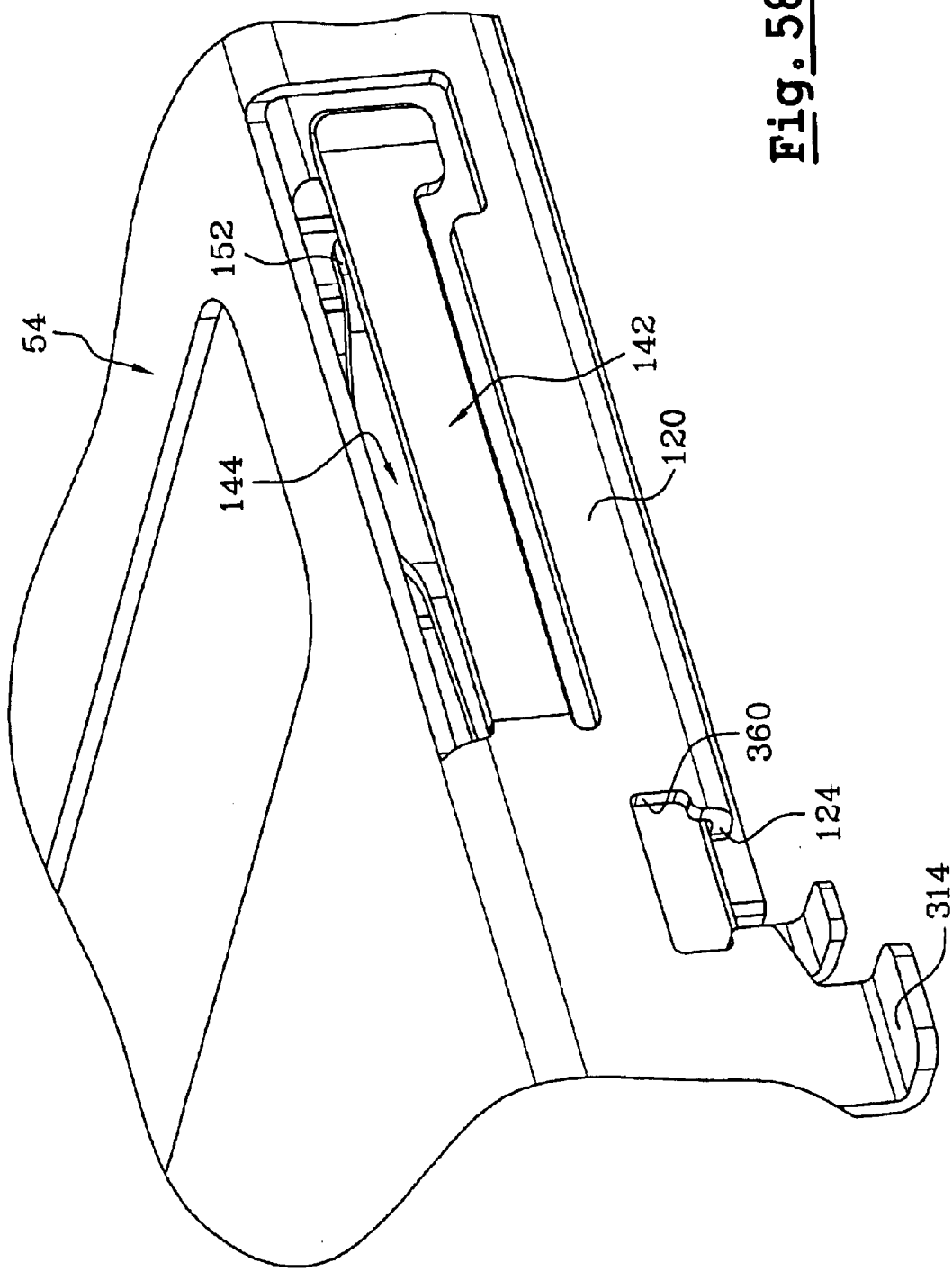
FIGS. 58 and 59 are isometric views of another embodiment of the cover of the connector.

The movable blade is extended rearward by an elastically deformable branch 148 that terminates in a detection strand 150. The strand 150 is curved inwardly and then in a contact tab 152, which can come into electrical contact with the facing inner surface portion of the fixed contact blade 142 (FIG. 58).

The rest position corresponds to the rear position of the protect cursor 69 (FIG. 2) and the switch is in its normally "open" state, whereas it is closed when the cursor 69 is in the advanced position.

This switch makes it possible, in combination with the ejection means according to the invention, to detect whether the card is no longer in the use position, but is still partly present in the connector, that is to say the card has been "forgotten" in the connector after the automatic ejection means have been triggered.

The operation of the connector and its ejection device 250 will now be described.

In the position illustrated in FIGS. 1 to 7, the carriage 252 is shown in its rear rest position toward which it is returned by the tension spring 254, this position being defined by the inner flange corner 323 (FIG. 17) and the entire rear vertical portion butting against the rear end 321 (FIG. 12) of the groove and against its vertical extension.

In FIGS. 1–7, the card C is shown in an intermediate position that it reaches during its insertion in the forward direction L1 and in which the cut corner face 64 of its transverse front end edge 66 comes into contact with the rear face of the drive branch 330 of the carriage 252. This intermediate position is also a position of the card when it is being ejected.

In this position, and as may especially be seen in FIG. 6, the blocking notch 75 on the card C is facing the window 332 and the blocking spur 186 (FIG. 5) belonging to the carriage 252. The spur is in a retracted position since the blocking blade 184 of the U-shaped carrier bears elastically against the outer face 286 of the support rear rib 275 with the actuating finger 336 facing the rear portion 300 of the cam 298.

In this position, if the insertion travel of the card C is interrupted, it is of course possible to extract it longitudinally rearward since the spur 186 is not housed in the card notch 75.

In order to fully insert the card into the connector 50 and to lock it in the use or contact position, the user continues the insertion by applying a forward force in the direction L1 in order to reach the intermediate position of advance of the carriage 252 illustrated in FIGS. 24 to 29.

In the first position, and as may be seen especially in FIGS. 3, 4 and 6, the front strand 346 of the hook 256 lies at the rear part of a first portion T1 of the cam. In order to reach the intermediate position, the user pushes the card against the return force that is applied to it by the tension spring 254, the card driving the carriage 252 forward by means of the drive branch 330 that receives the thrust force via the cut corner face 64.

Figure 25:
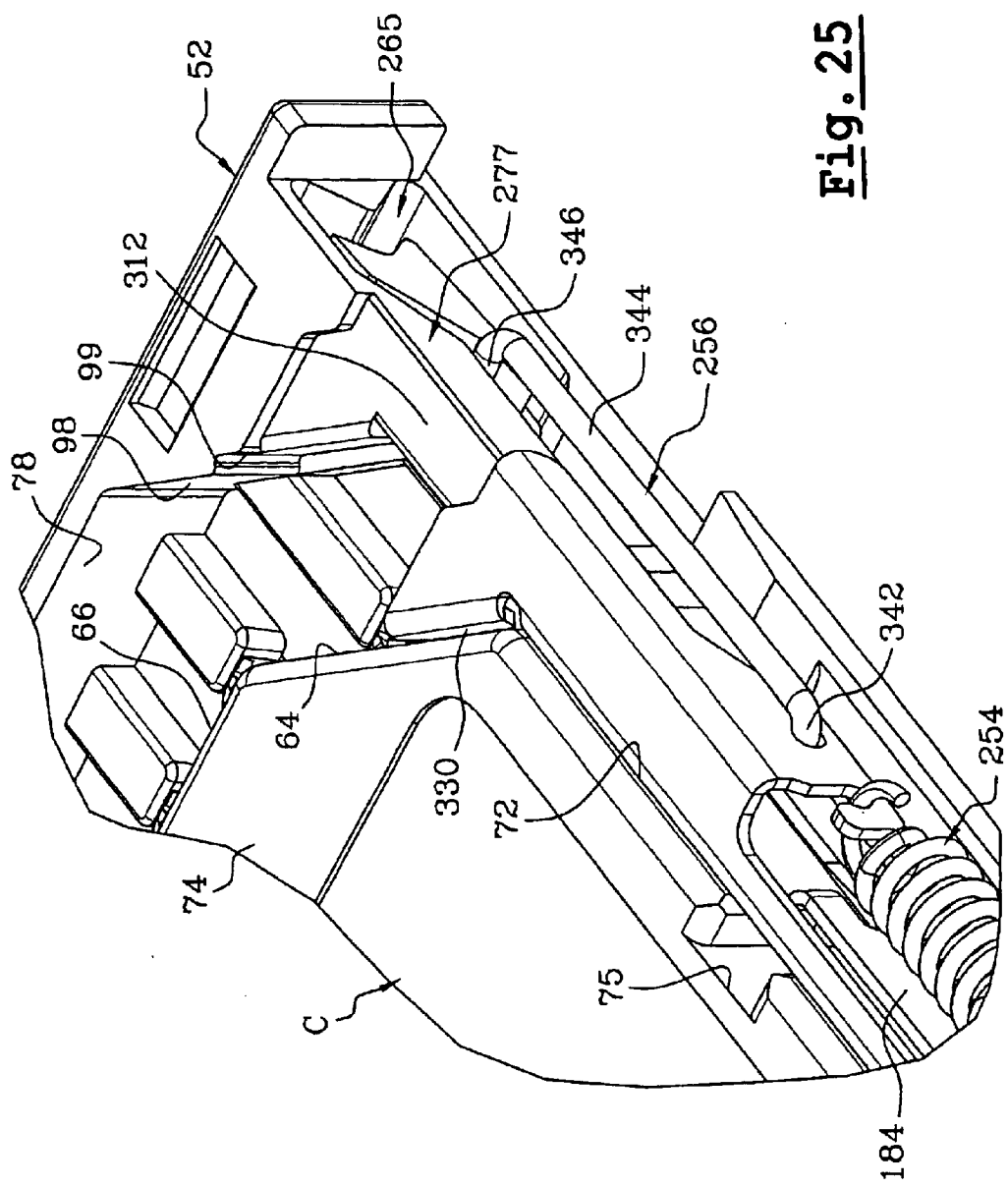
Figure 29:
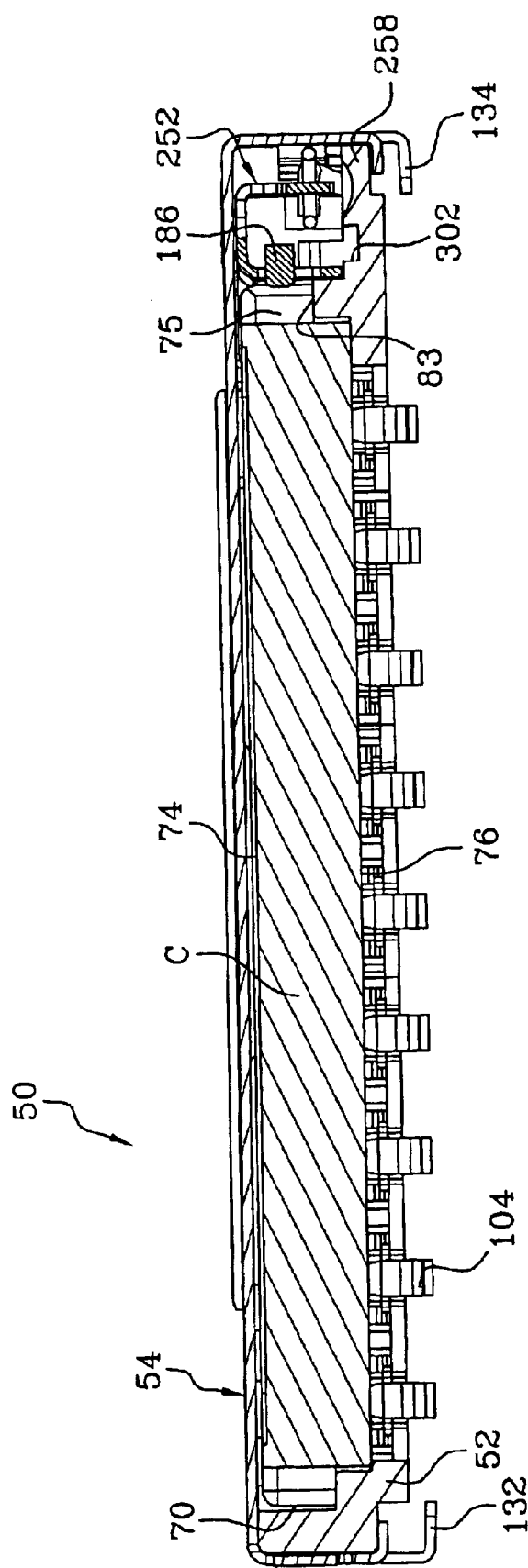
Figure 30:
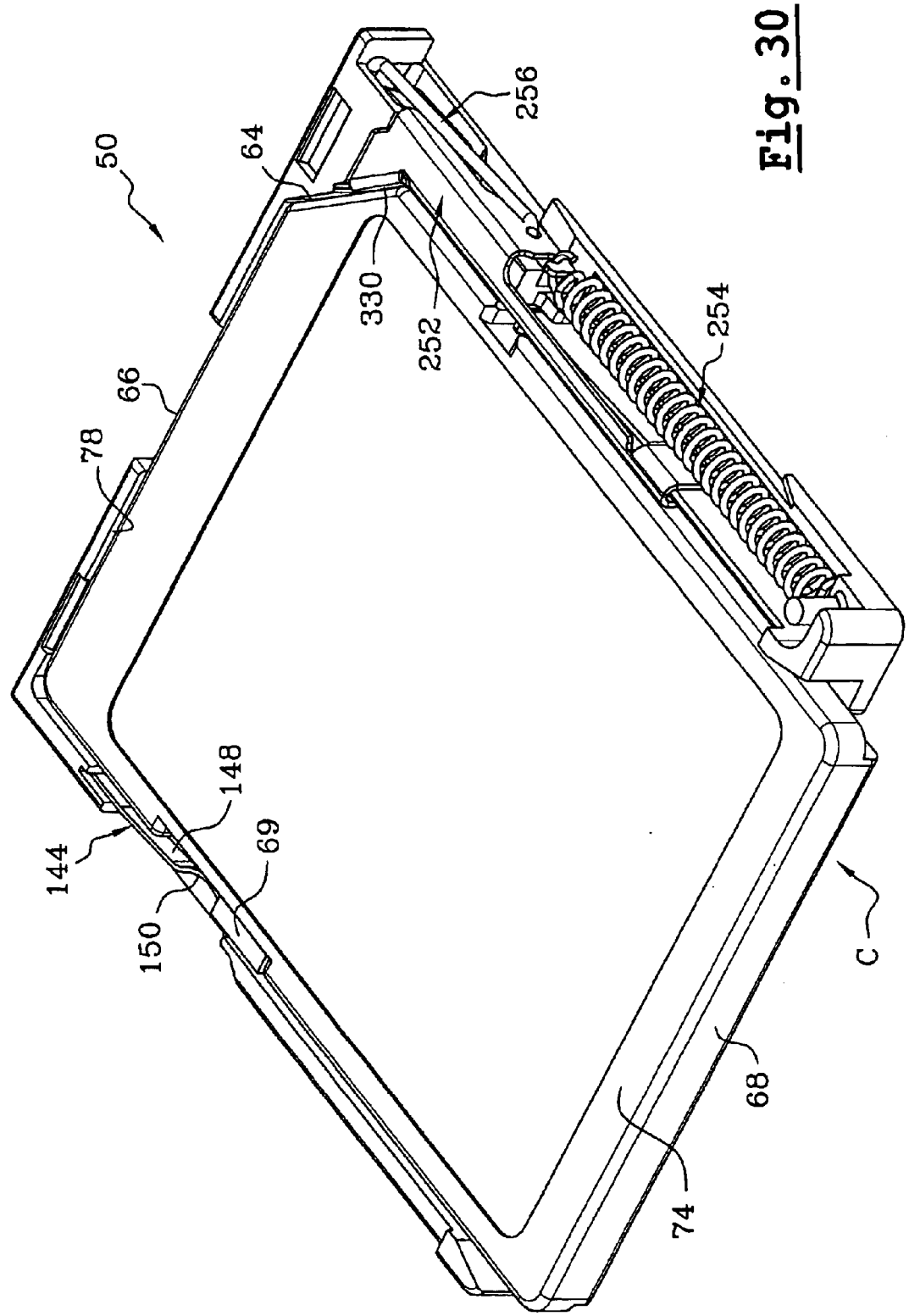
Figure 31:
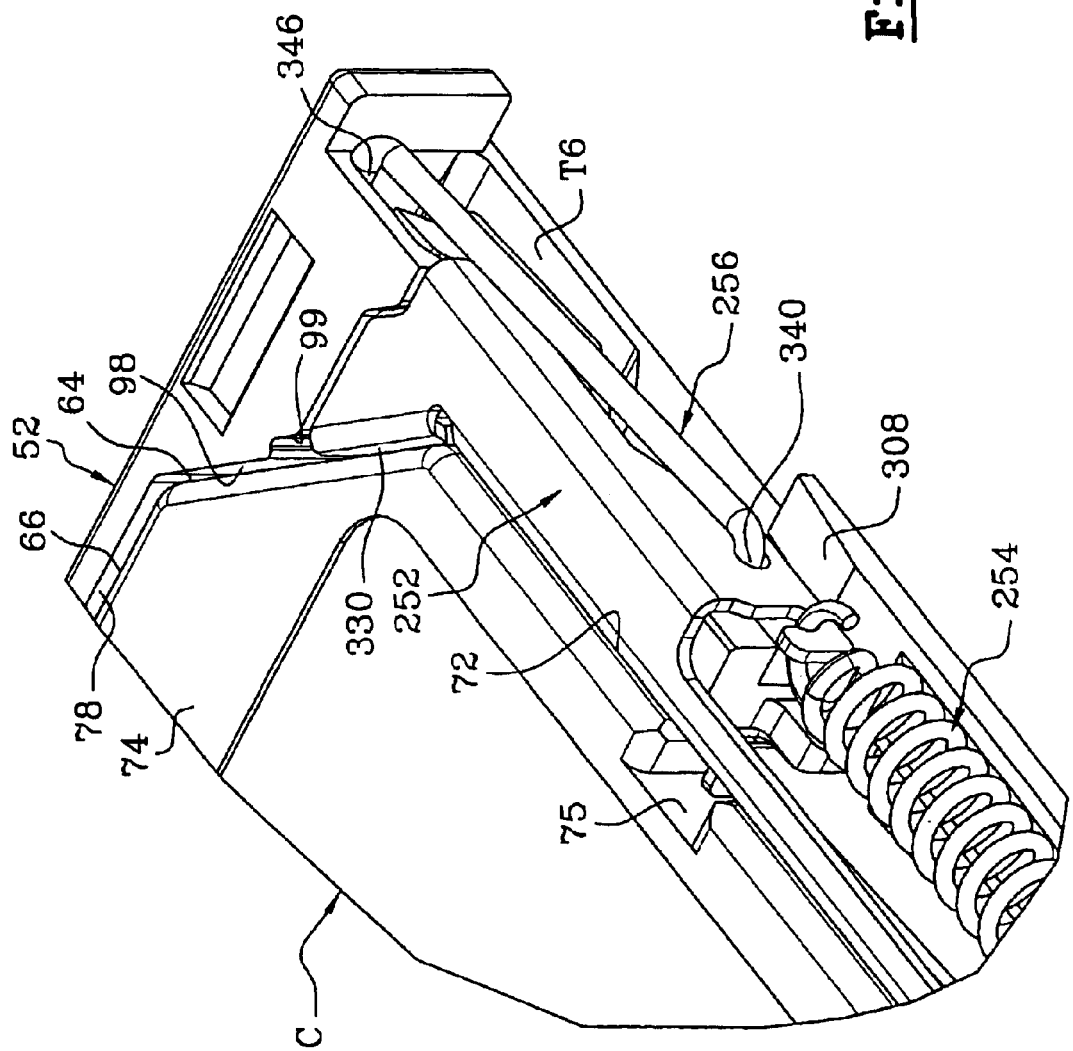
Figure 35:
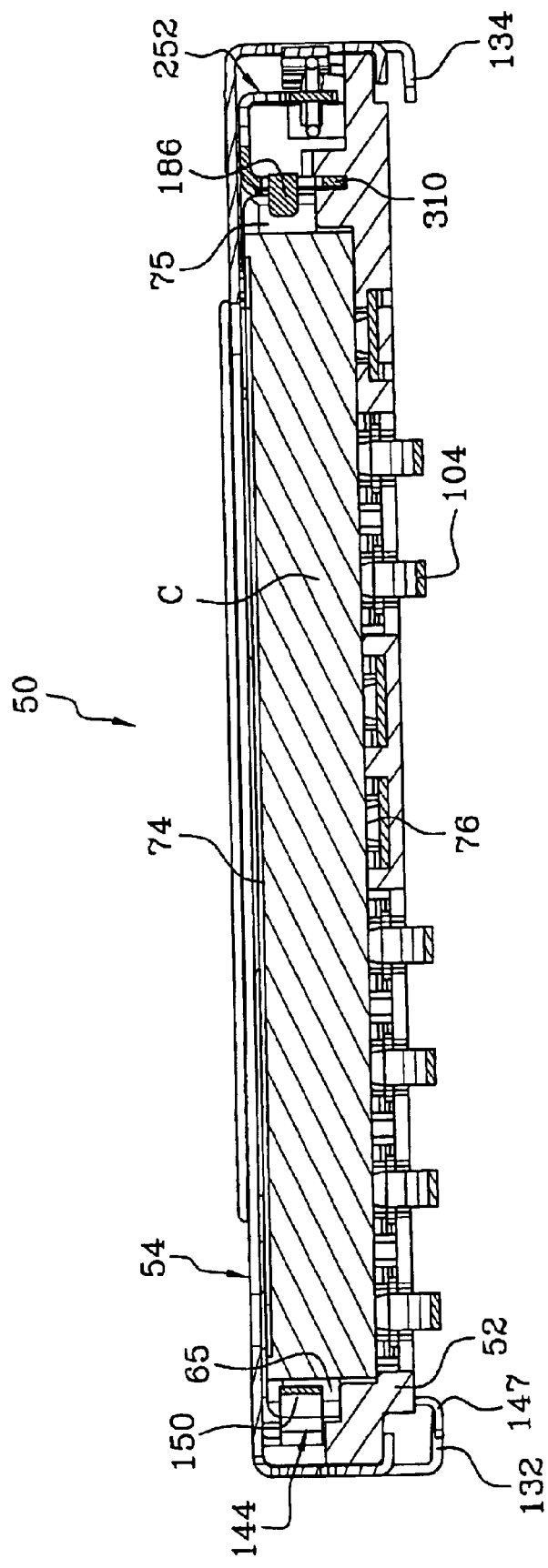
Figure 36:
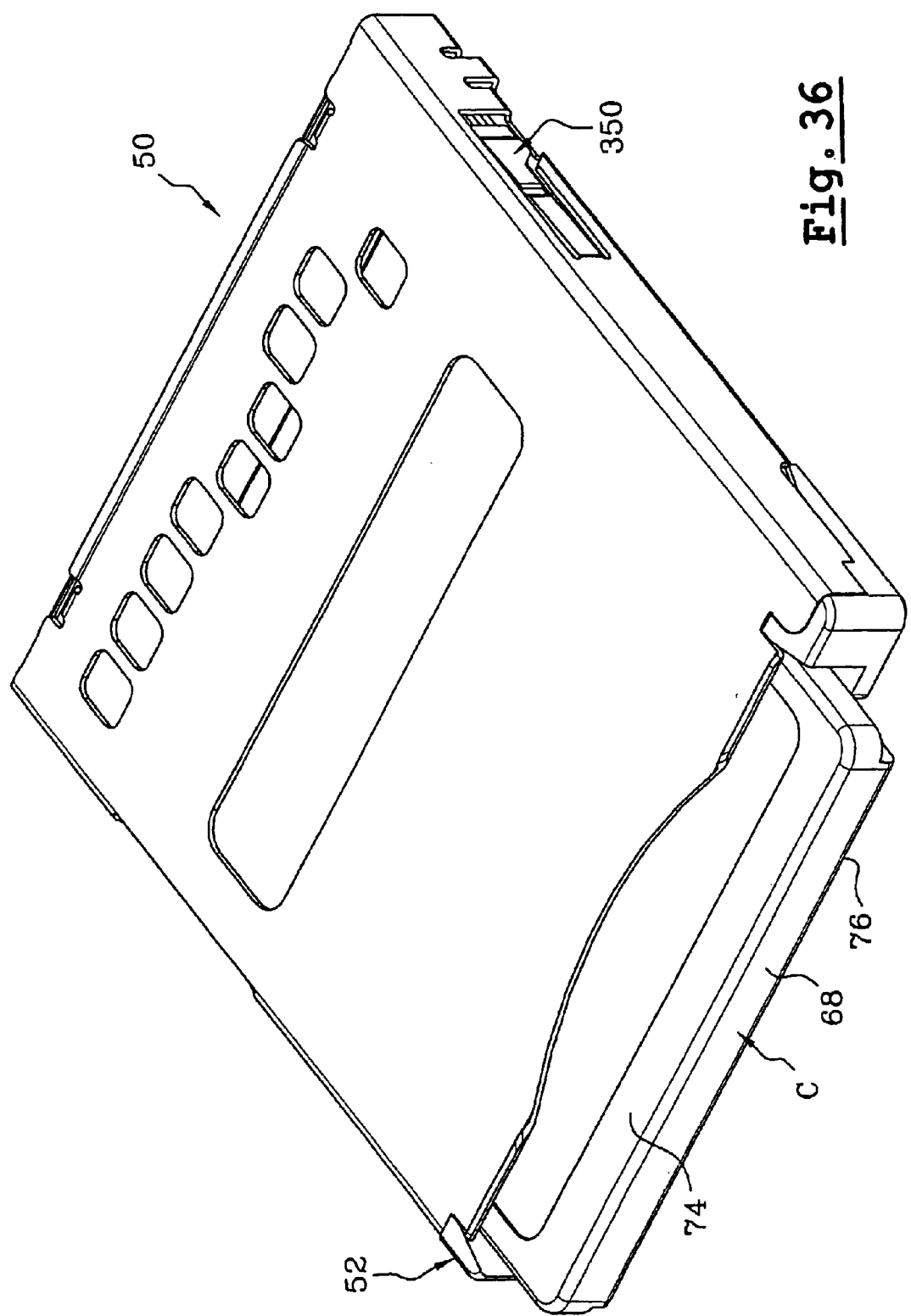
Figure 37:
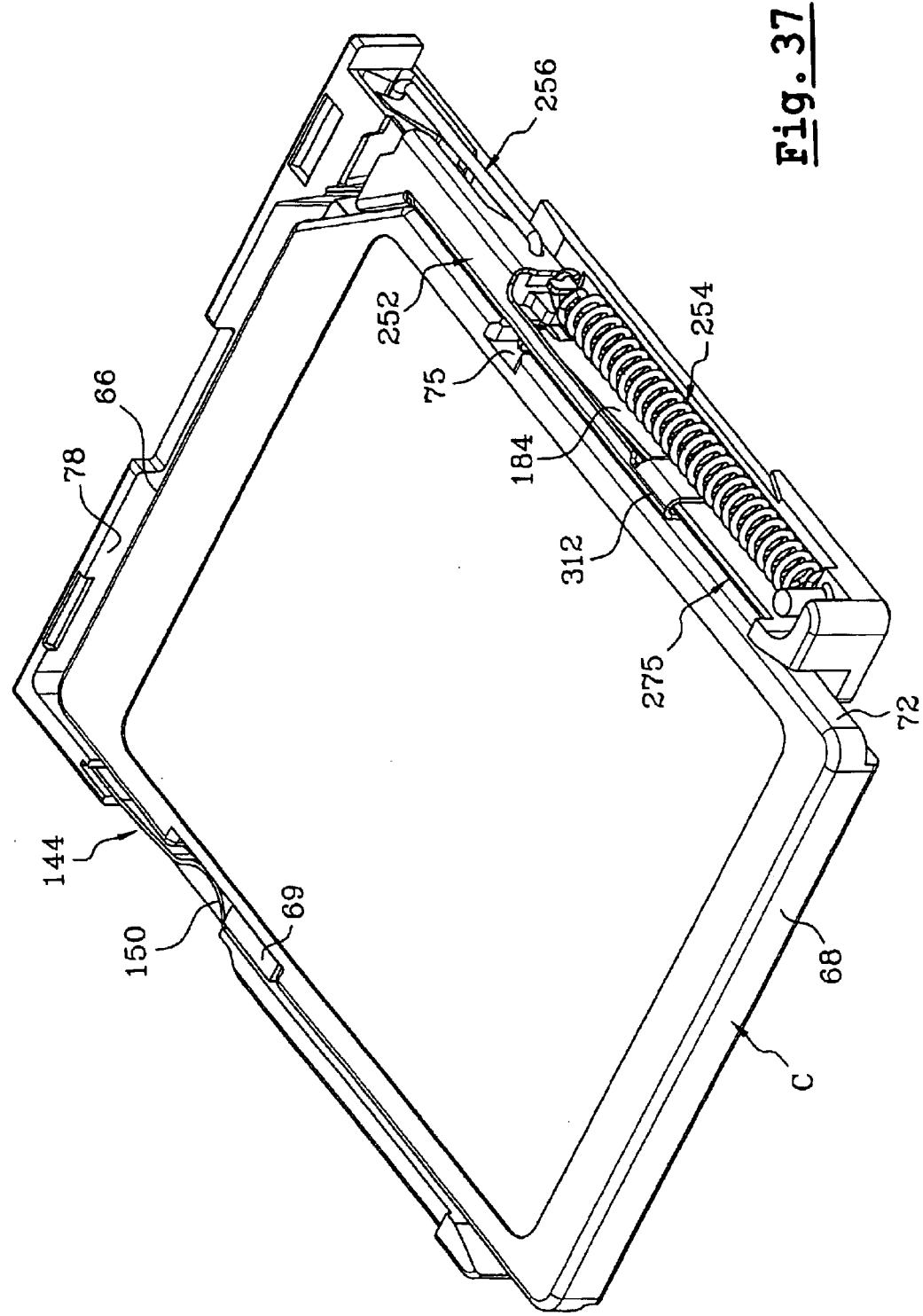
Figure 38:
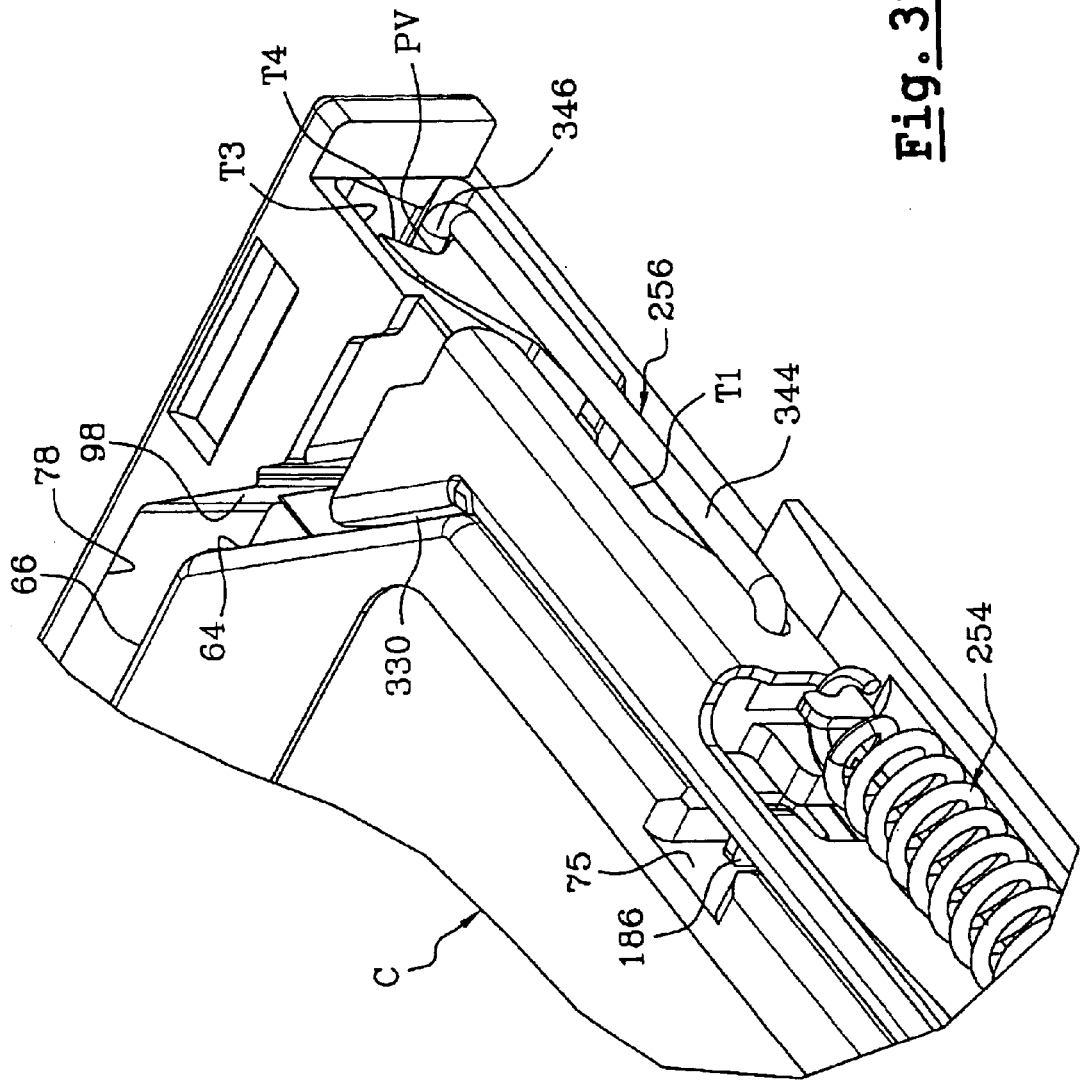
Figure 42:
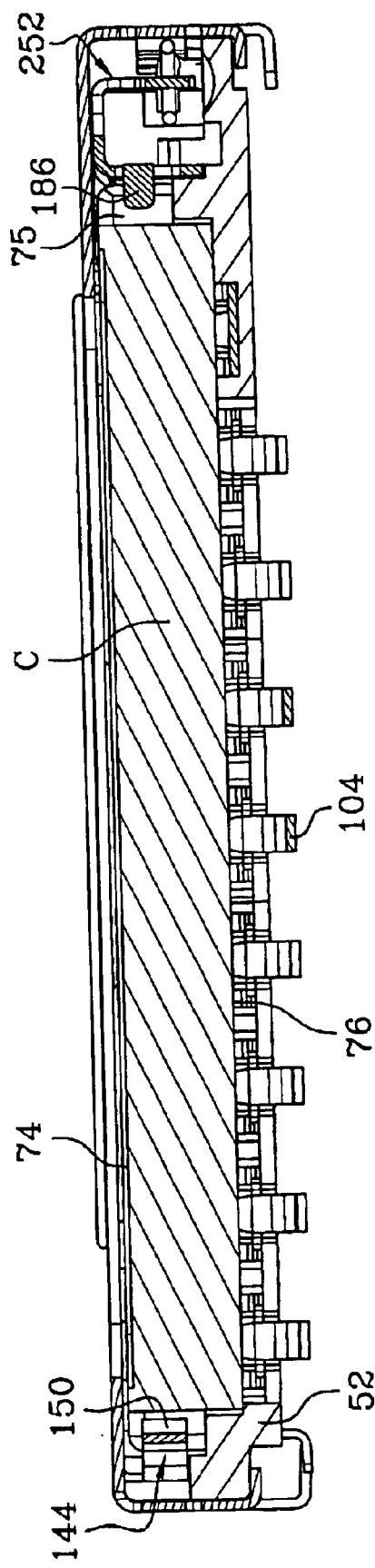
Figure 43:
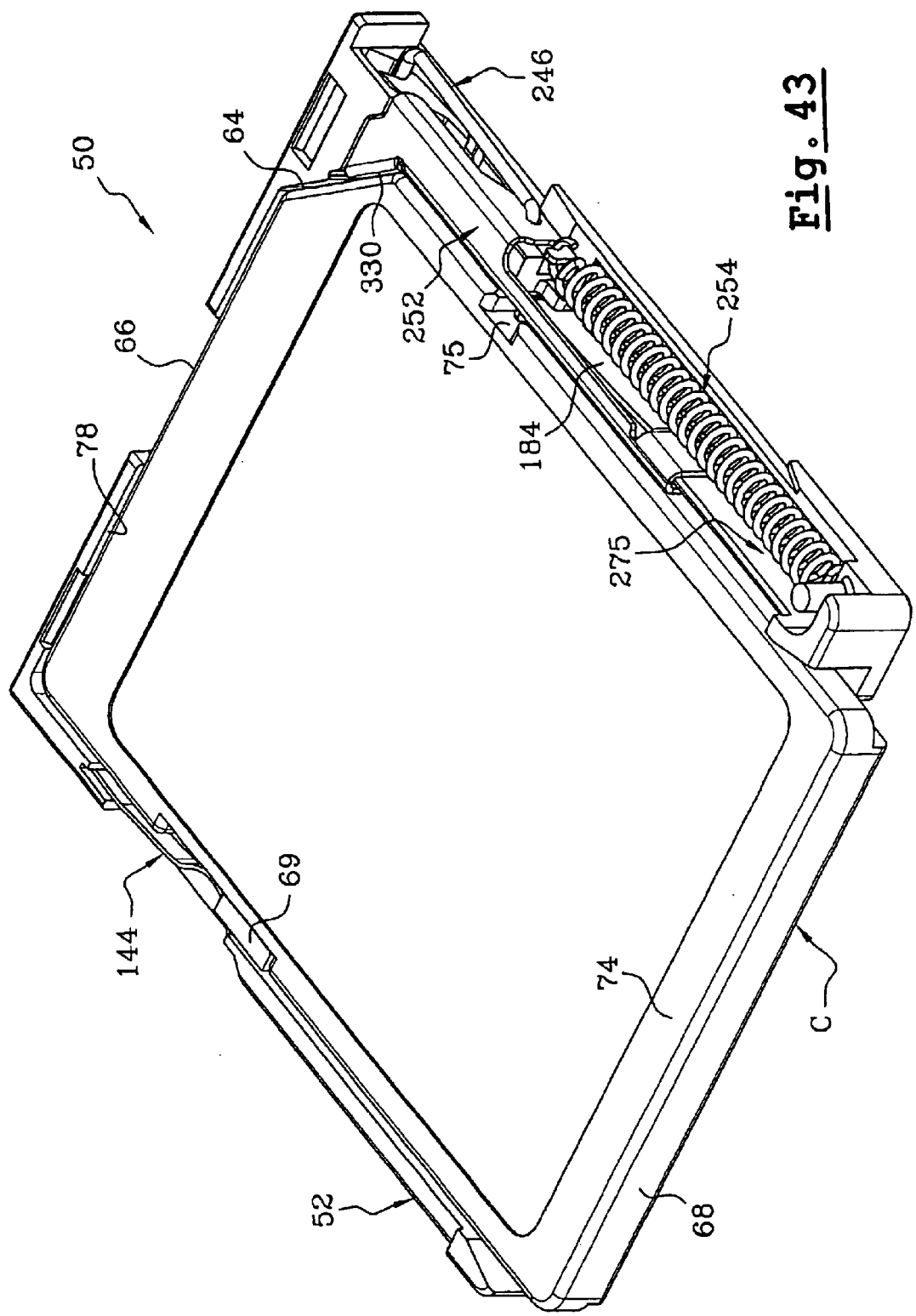
FIGS. 43–48 are views similar to those of FIGS. 30–35, in which the card is shown in its overtravel position during unlocking.
Figure 44:
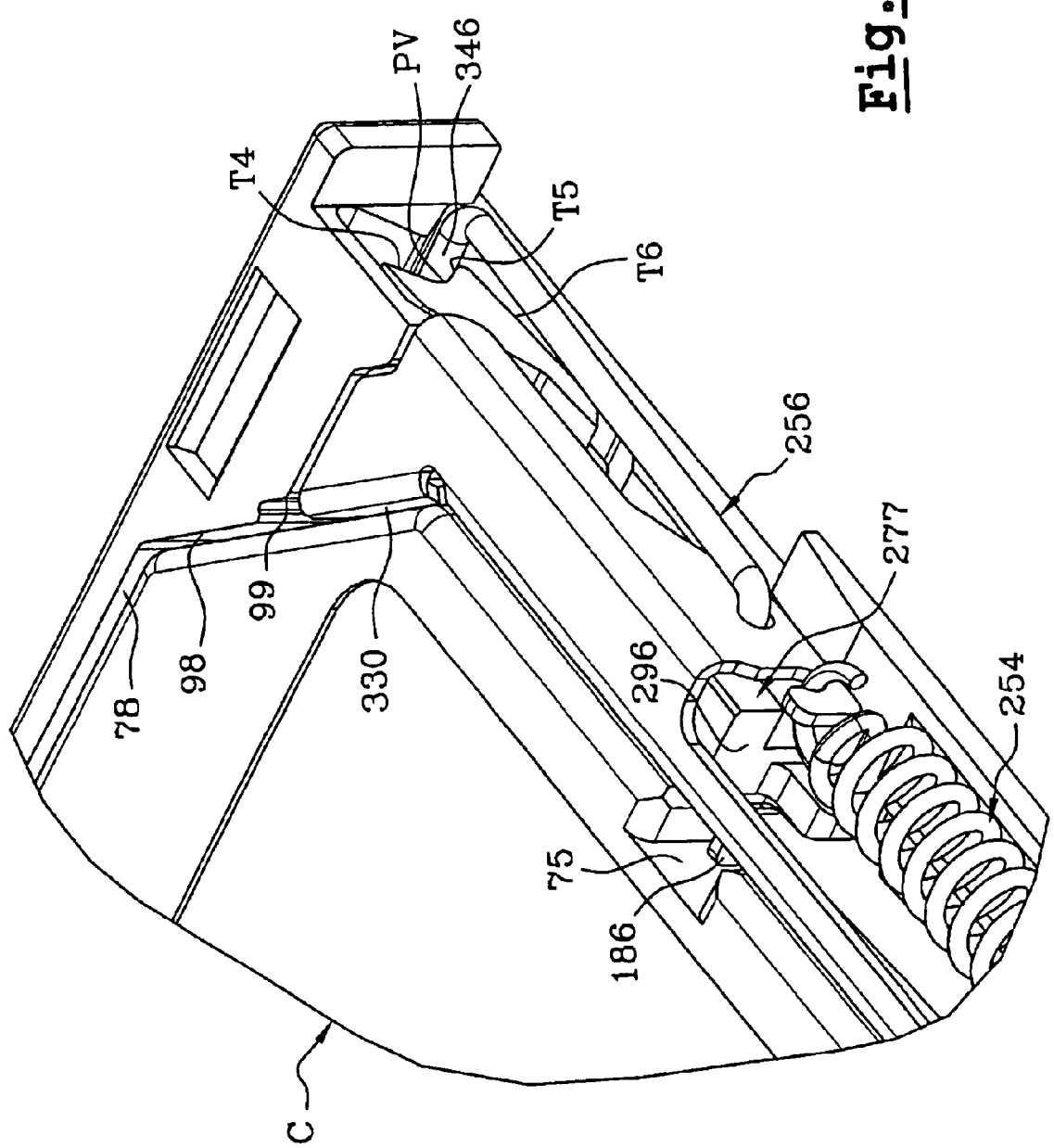

The front transverse strand 346 of the locking hook 256, which is driven forward by the carriage 252, reaches the front end of the horizontal portion T1, as may be seen in FIGS. 25, 26 and 28.

The blocking spur 186 is still in the set-back or retracted position facing the blocking notch 75 on the card since the blocking blade 184 still bears elastically against the outer lateral face 286 of the rear rib 275.

As may be seen by comparing, for example, FIG. 6 with FIG. 28, the U-shaped locking member or hook 256 is of course moved longitudinally forward, from the left to the right relative to the connector and therefore relative to the blade 350 that pushes the hook 256 transversely inward, the contact point between the blade 350 and the main longitudinal strand 344 of the hook 256 then being formed by the bend 354.

As may be seen in FIGS. 27 and 28, the insertion travel of the card in the direction L1 may be continued until its front transverse edge 66 butts against the front end wall 78 of the insulating support 52.

This position of maximum insertion of the card C in the housing 58 against the return force applied to it by the spring 254 via the carriage 252 is illustrated in FIGS. 30 to 35. This position corresponds to the locking overtravel of the carriage.

During the displacement, in order to pass from the position illustrated in FIG. 26 to that illustrated in FIG. 32, the front transverse strand 346 of the hook 256 travels along a second, inclined portion T2 (FIG. 26) and then a third, upper horizontal portion T3 of the cam profile 265, the forward longitudinal movement and then the upward movement of the locking hook 256 being possible because of its articulation about a horizontal axis (relative to the carriage) thanks to its rear transverse strand 342 (FIG. 28) housed so as to rotate in the hole 340 of the front outer flange 316 of the carriage.

The abutment of the edge 66 of the card against the end wall 78 is made possible by the recess 99 (FIG. 34) formed in the inclined face 98 of the insulating support that receives the drive branch 330 (FIG. 17).

During the displacement between the positions shown in FIGS. 26 to 28 and 30 to 34, the resilient blocking blade 184 (FIG. 34) having the blocking spur 186 (FIG. 33) flexes transversely, owing to the effect of its intrinsic elasticity, to the inside of the connector toward the edge 72 of the card. Such blade bending can occur since the blade no longer bears against the outer lateral face 286 (FIG. 34) of the rear rib 275 (FIG. 9), so its actuating finger 336 (FIG.17) can cooperate with the end of the cam profile 298 (FIG. 9) and especially with the front portion 304 of the latter.

The blocking spur 186 thus extends into the blocking notch 75, as may especially be seen in FIG. 33.

Of course, it will be noted that, as long as the cut corner face 64 is in contact with the rear face of the drive branch 330, the relative positions of the card C and of the carriage 252 do not change, that is to say the window 332 through which the blocking spur 186 can move is still facing the blocking notch 75 on the edge 72 of the card C.

To lock the card C in its normal operating position shown in FIGS. 36 to 42, the user releases the force that he was applying beforehand to the rear transverse edge 68 of the card and the latter is then elastically returned, via the carriage 252 and its drive branch 330, under the action of the tension return spring 254.

Starting from the position illustrated in FIGS. 32 to 34, the card therefore moves back in the longitudinal direction L2 in order to reach its locking position that is determined by the front strand 346 of the locking hook 246 coming into abutment, longitudinally rearward, against the point of inflection or locking point PV (FIG. 26) of the cam 265 that corresponds to the intersection of two inclined portions T4 and T5, forming a V, of the locking cam 265 after, of course, travel by the strand 346 vertically downward and longitudinally toward the rear of the portion T4.

In this operating position of the card C, and as may be seen for example in FIG. 39, the main longitudinal strand 344 of the locking hook 256 again extends in an approximately horizontal direction.

The carriage 252 is permanently under tension because of the return force that is applied to it by the spring 254, thus defining a precise longitudinal position, with no slack, of the carriage 252 relative to the insulating support 52 of the connector 50, and therefore a corresponding position of the card in which its contact pads are in contact with the ends 102 of the contact blades 100.

Of course, the blocking spur 186 (FIG. 40) still lies in the blocking notch on the card owing to the action of the blocking blade. 184 (FIG. 17) with its actuating finger 336 (FIG. 17) bearing against the support.

Thus, in the operating position (FIG. 39), if the user tries to extract the card C out of the connector manually by pulling the card rearward in the direction L2, the blocking spur 186 (FIG. 40) constitutes a stop that cooperates with the front edge of the card notch 75 in order to prevent rearward card movement, it not being possible for the carriage 252 to move back as it is retained by the locking hook 256.

The slight rearward travel made possible because of the length of the notch 75 is such that the contact pads Pi on the card remain in contact with the contact ends 102 of the contact blades 100.

To unlock the card, for the purpose of ejecting it from the connector via the ejector carriage 252, and starting from the operating position shown especially in FIGS. 39 to 42, the user must again push on the rear transverse face 68 of the card in the direction L1 in order to bring the card C and the carriage 252 into the unlocking overtravel position illustrated in FIGS. 43 to 47.

In this position, the card is again in forward abutment in the housing 58 with its transverse edge 66 in contact with the transverse end wall 78 of the insulating support 52.

However, depending on the various dimensional tolerances, especially the card tolerances, the abutment position may result from the cut corner face 64 coming into contact with the face 98 of the insulating support 52.

The position of the stop and of the branch 330 of the carriage 252 and the length of the hook 256 are such that, in the overtravel position, the strand 346 lies at the front end of the heart-shaped cam 265.

Figure 45:
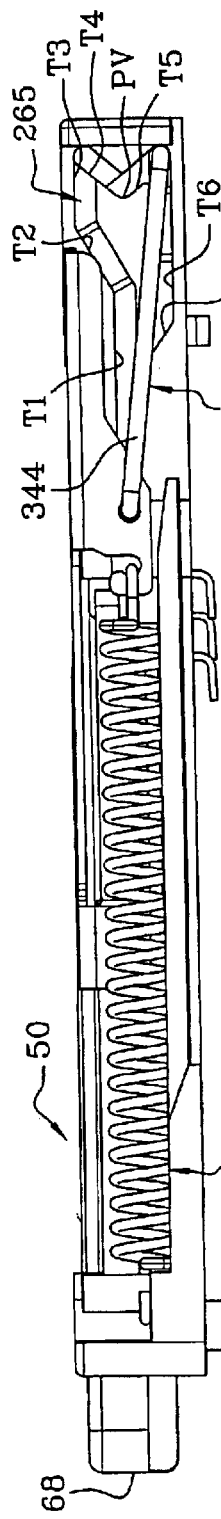

During this unlocking overtravel, the front strand 346 of the locking hook 256 travels along the portion T5 (FIG. 39) of the cam 265 downward and forward, so as, as may be seen especially in FIG. 45, to face the lower longitudinal horizontal portion T6 of the locking cam.

In order to eject the card from the connector, rearward from the unlocking overtravel position, all that the user has to do is to release his thrust force on the rear transverse edge 68 of the card C, the latter then being free to move back from the right to the left under the action of the spring 254 that is applied to it via the drive branch 330 that bears against its cut corner face 64.

The card moves back in the direction L2 passing through the intermediate ejection position shown in FIGS. 48 to 52.

Figure 46:
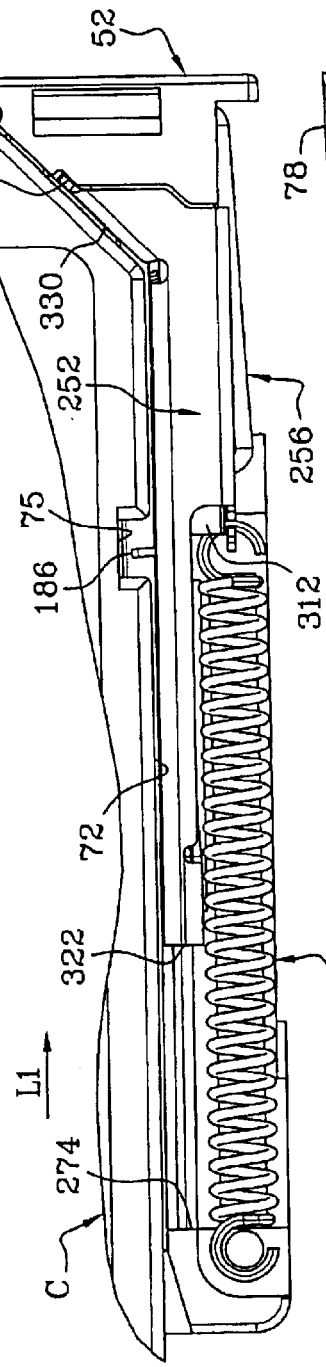
Figure 47:
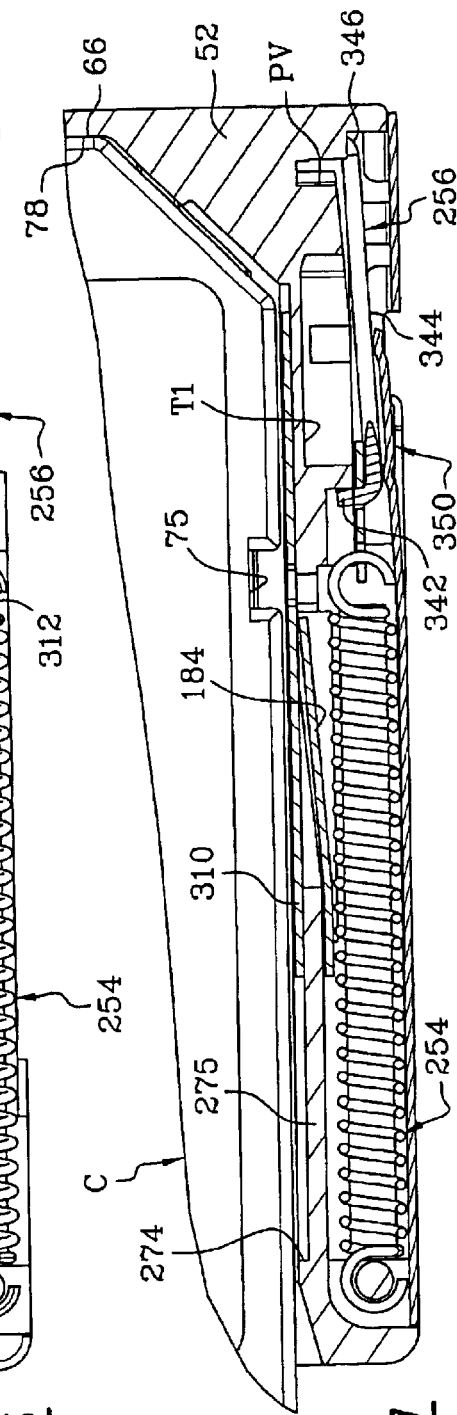
Figure 48:
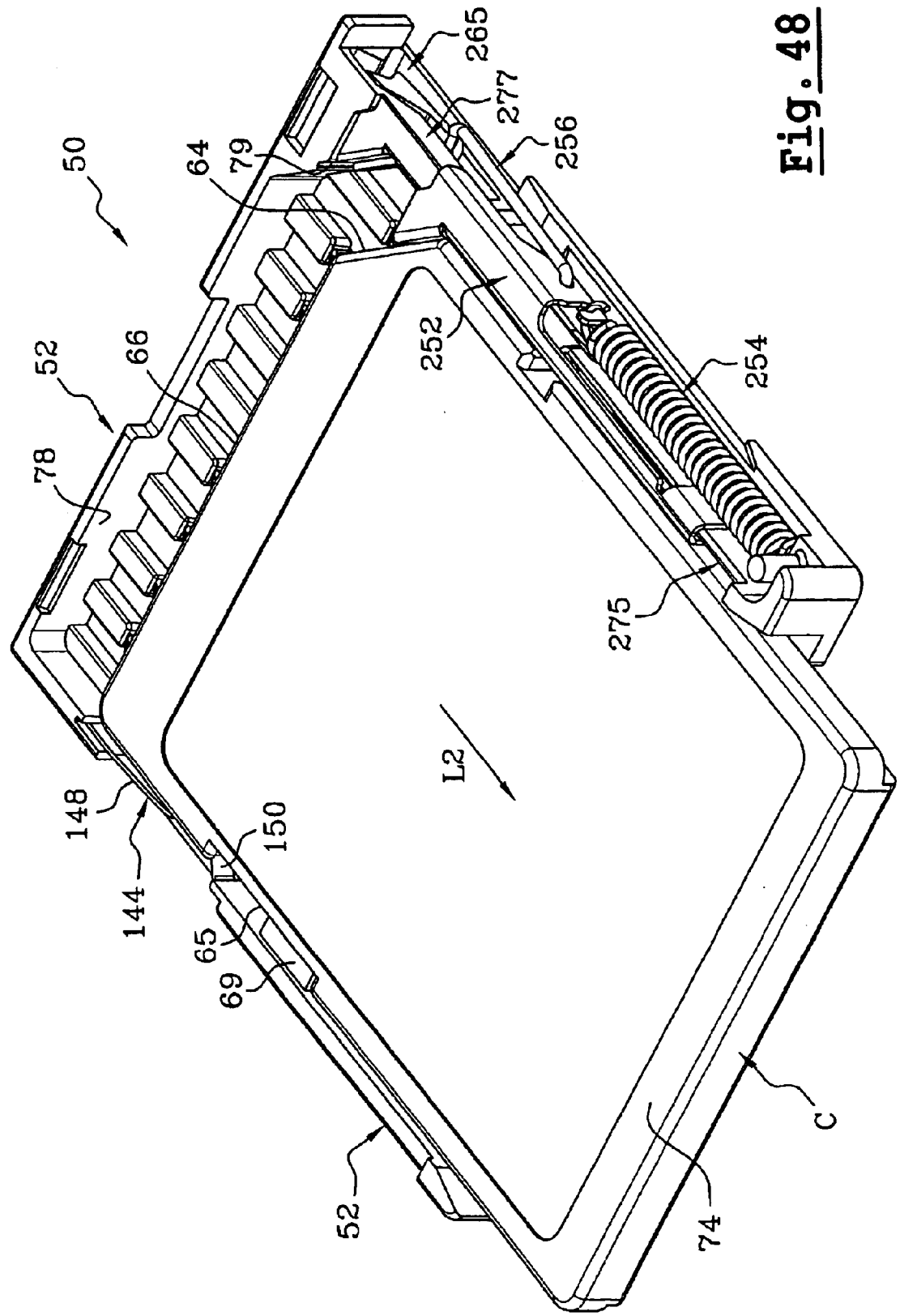
Figure 49:
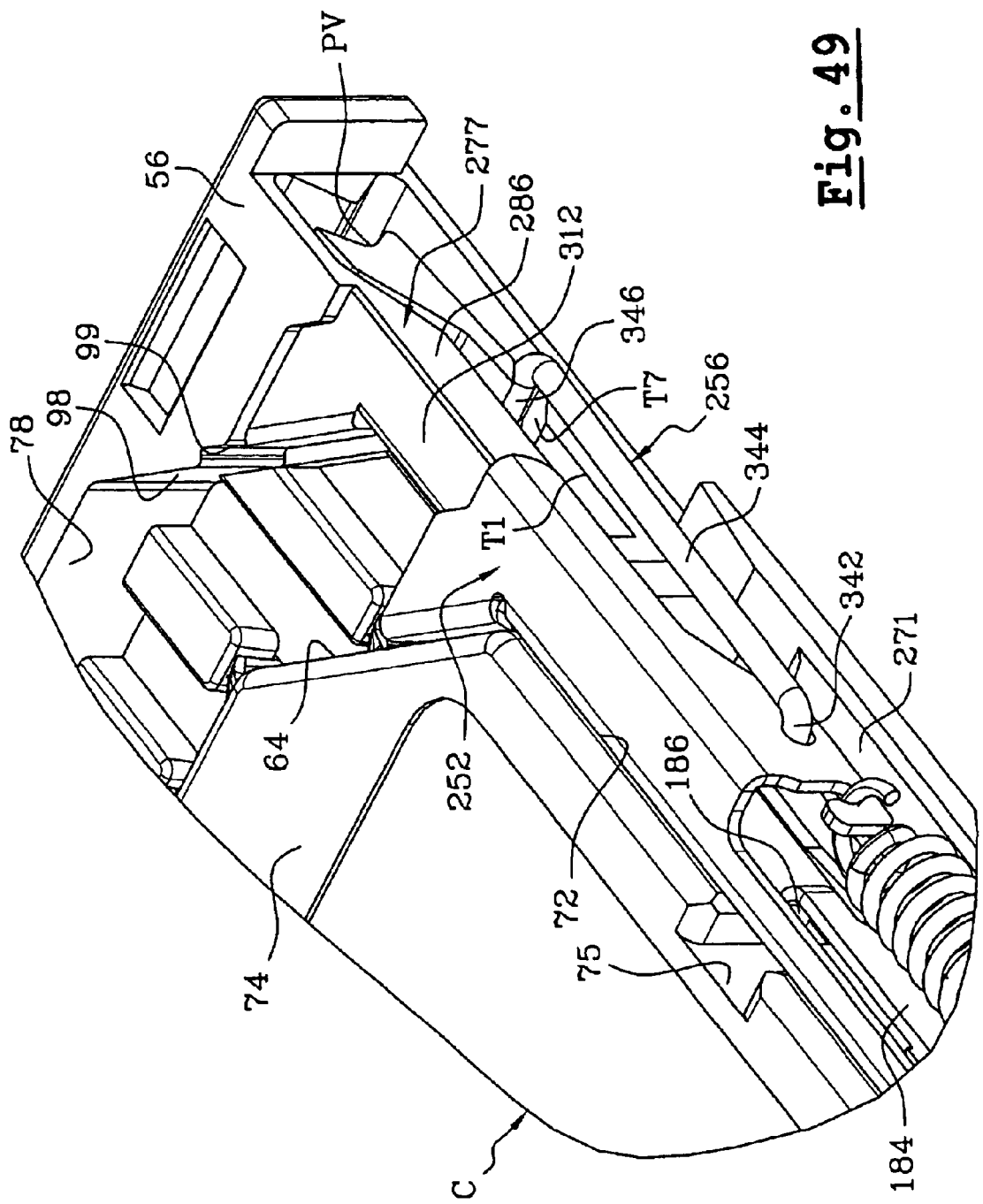

On passing from the unlocking overtravel position illustrated in FIGS. 45 to 47 to the intermediate ejection position illustrated in FIGS. 50 to 52, the blocking spur 186 is automatically retracted from the blocking notch 75 owing to the progressive cooperation of the finger 346 for actuating the change of state of the blocking blade 184 that cooperates with the central ramp-shaped portion 302 of the cam profile 298. This retraction of the blocking spur 186 is also ensured by the front edge of the rear rib 275 that acts on the blade 184.

Thus, the spur 186 is rapidly retracted from the notch 75 and the rearward movement of the carriage 252 and the corresponding acceleration of the card C may result in its automatic ejection, which may or may not be accompanied by the carriage 252 with its drive branch 330 over the entire ejection travel, the ejection travel of the carriage 252 terminating when the latter again occupies its rear rest position illustrated in FIGS. 1 to 7.

It will be noted that in the intermediate ejection position shown in FIGS. 48 to 52, the front transverse strand 346 of the locking hook 256 has reached the rear longitudinal end of the lower horizontal portion T6 of the locking cam 265 and it is then in position for traveling along the inclined rear strand T7 that runs into the portion T1 into which the strand 346 again penetrates at the end of the rearward travel of the carriage 252, in order to resume the position illustrated in FIGS. 4 and 6.

The design according to the invention makes it possible to use the connector 50 with its ejection means 250 by introducing thereinto a "conventional" MMC card, that is to say one without a blocking notch 75, the inner free end edge of the blocking strand 186 then bearing against the solid lateral face of the right lateral edge 72 of the card, without preventing the operation of the card locking device in the operating and ejection position of said card, the rubbing of the spur 186 against the edge 72 then constituting a card brake opposing any inopportune rearward movement of the card out of the housing 68 of the connector 50, for example owing to the effect of vibrations of the appliance equipped with the connector 50.

Should the carriage 252 remain in the locked operating position illustrated in FIGS. 39 to 41, for example following insertion of a conventional MMC card and manual extraction of the latter out of the connector, that is to say without making use of the automatic ejection carriage 252, it is found that the blocking spur 186 then projects into the housing 58 in the position illustrated in FIG. 40, that is to say in the path of a card that would then be inserted into the connector.

However, this state does not prevent the insertion of a card into the operating position again, whether this be a conventional MMC card or an SD card, as it is then the cut corner face 64 of the card that is inserted into the connector that cooperates with the spur 186 in order to temporarily move the latter away until it is again facing the blocking notch 75 if the inserted card is an SD-type card.

During the unlocking overtravel, the hook 256 swings generally downward about its rear strand 342, this swinging being made possible owing to the recess formed by the inclined upper facet 308 of the lateral extension 258 of the insulating support 52.

Figure 54:
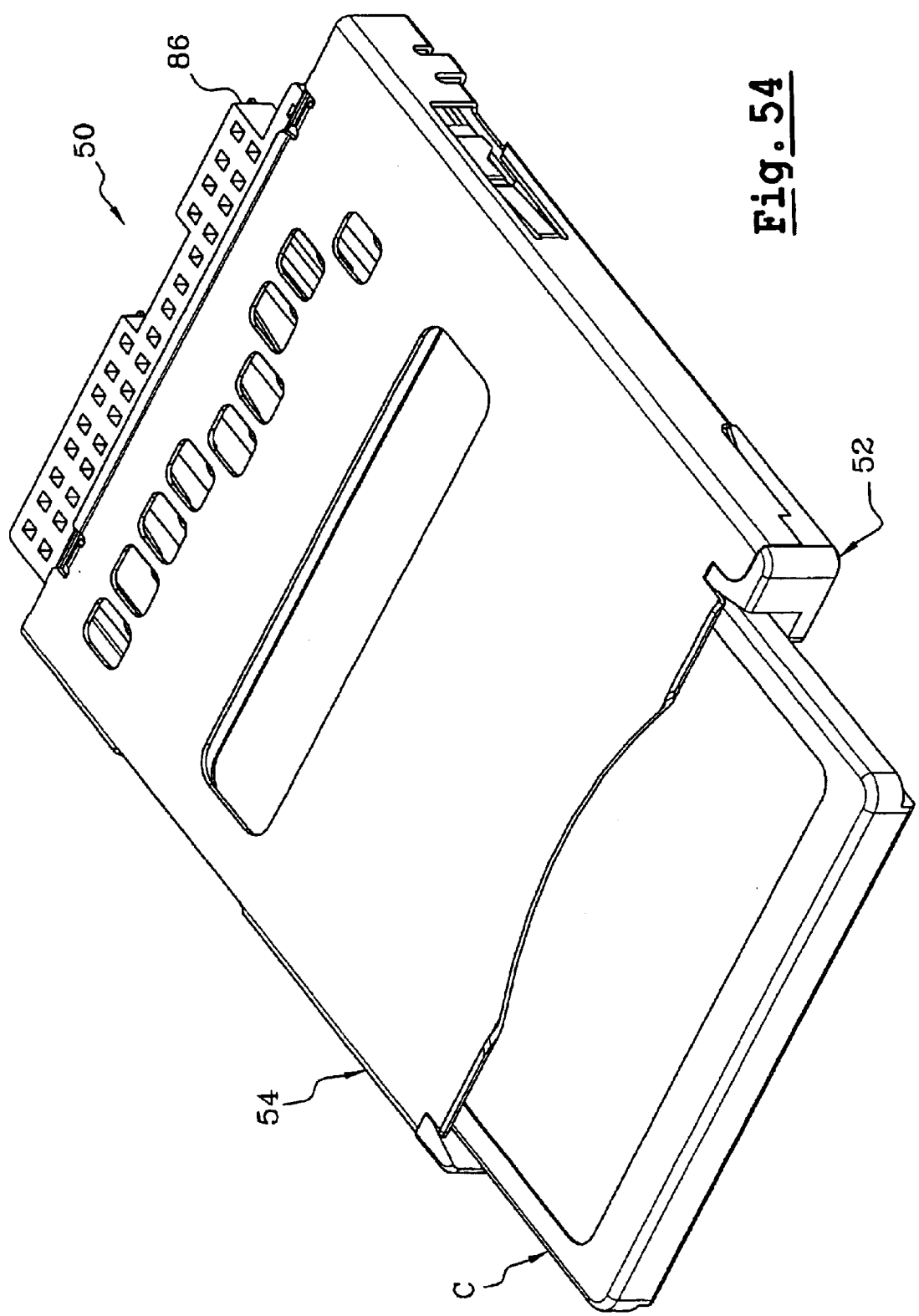
FIGS. 54–56 are views similar to those of FIGS. 1, 2, and 10 which show another embodiment of the invention in which the connecting tabs of the contact blades extend towards the rear of the support.
Figure 55:
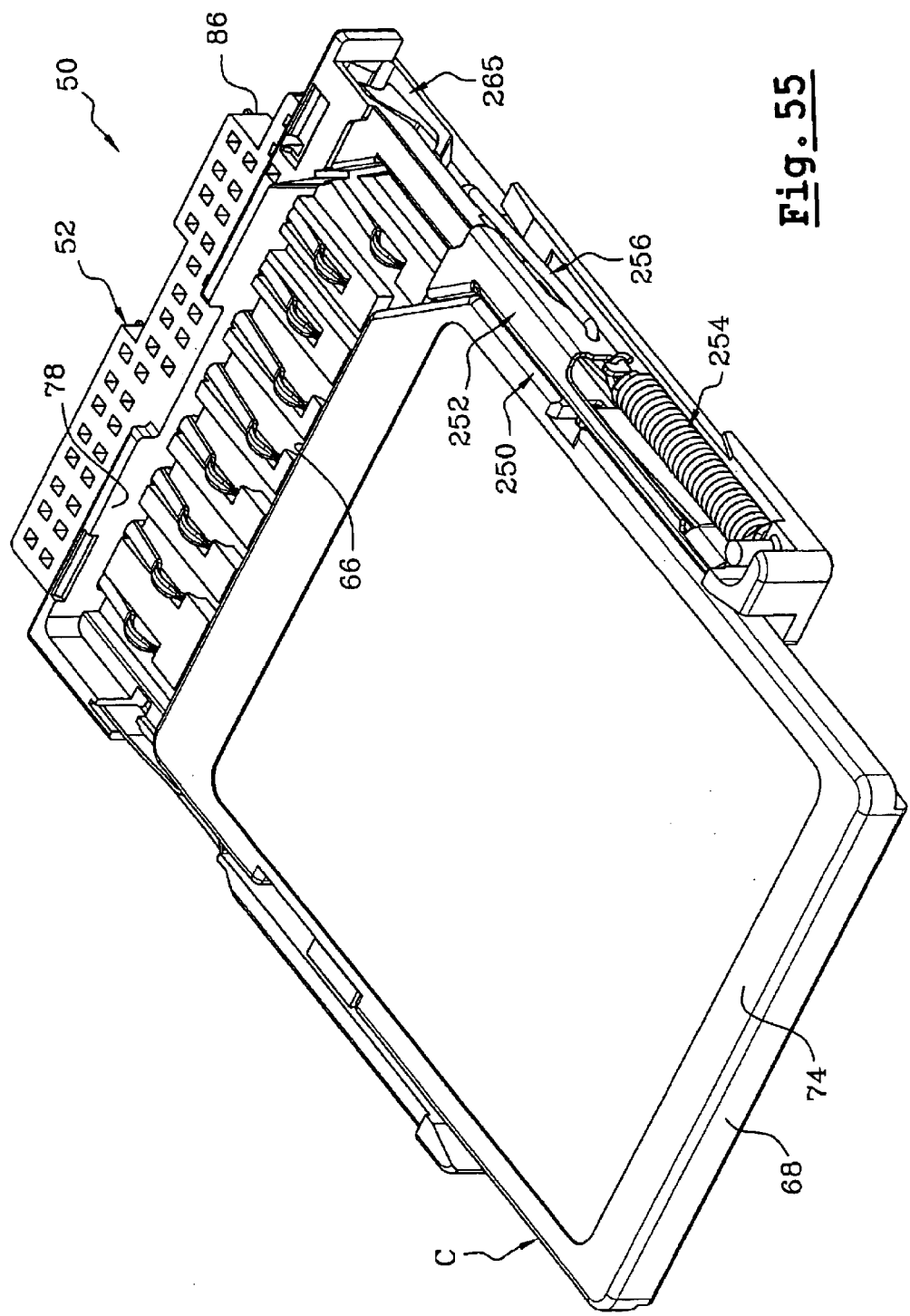
Figure 57:
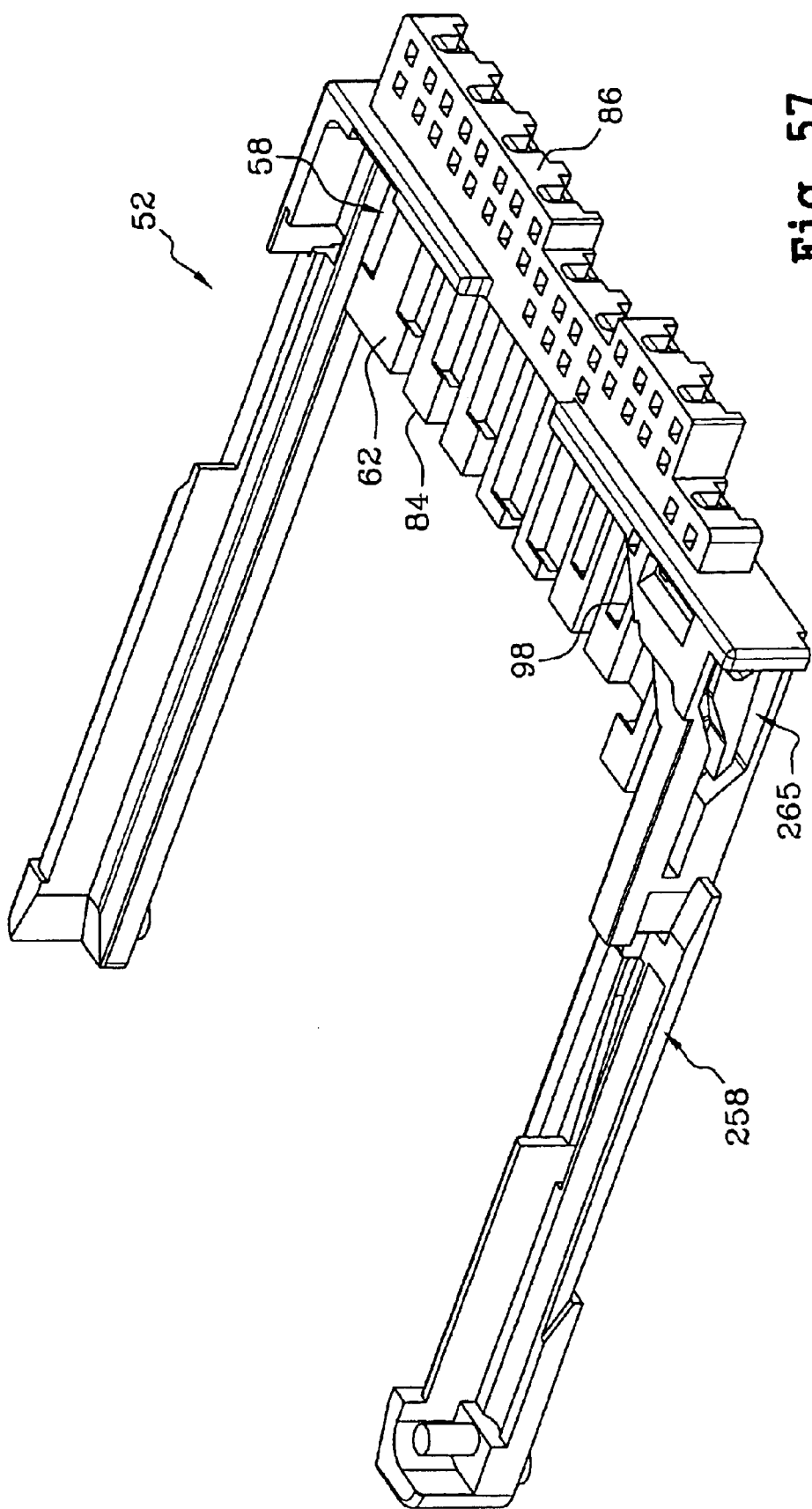
FIG. 57 is a top and front isometric view of the support of FIGS. 54–56.

In a variant illustrated in FIGS. 54 and 57, the tails of the blades 102 extend longitudinally forward beyond the front transverse face 86' of the insulating support 52'.

Figure 59:
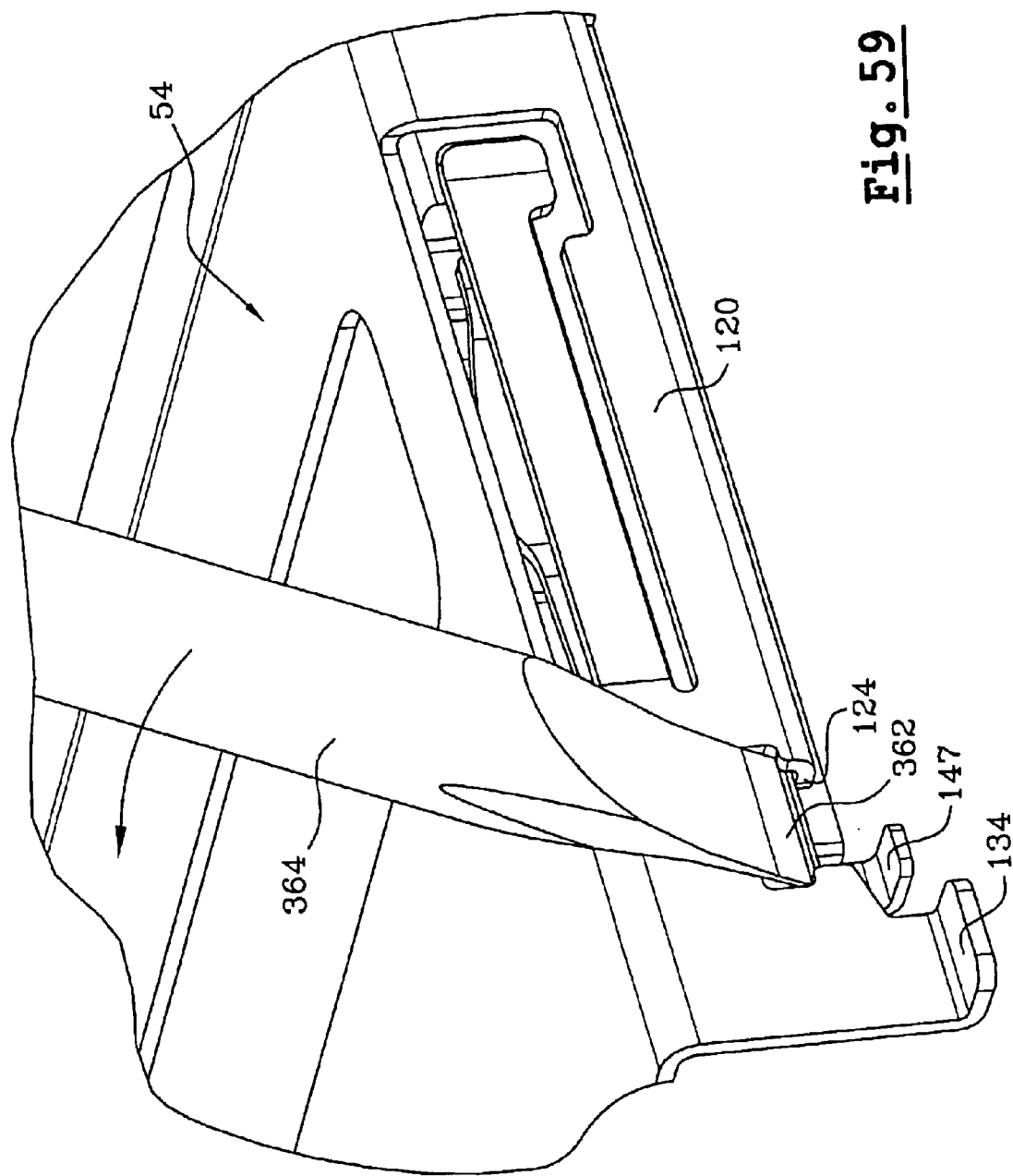
Figure 60:
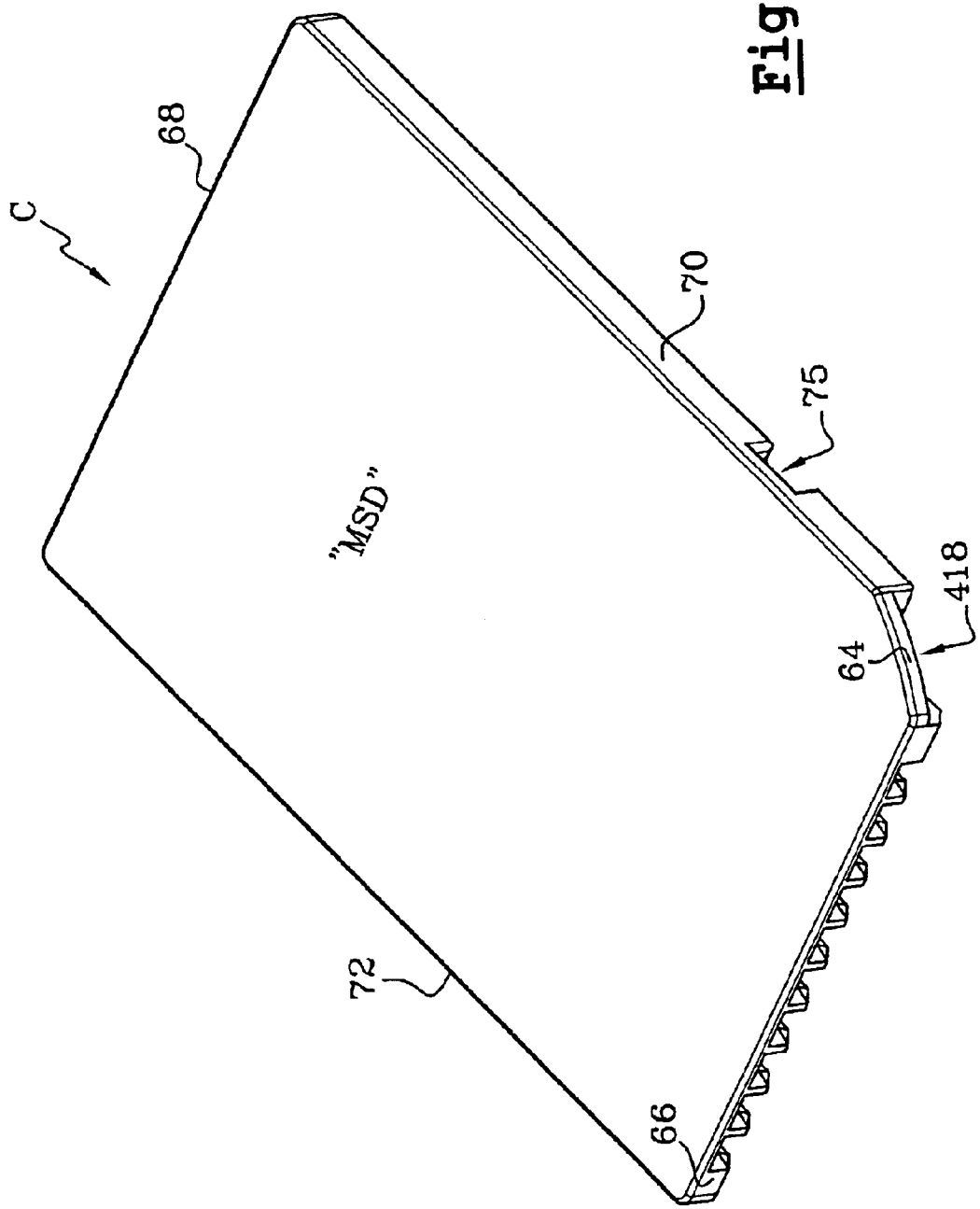
FIG. 60 is a top isometric view of an MSD-type smart card.
Figure 61:
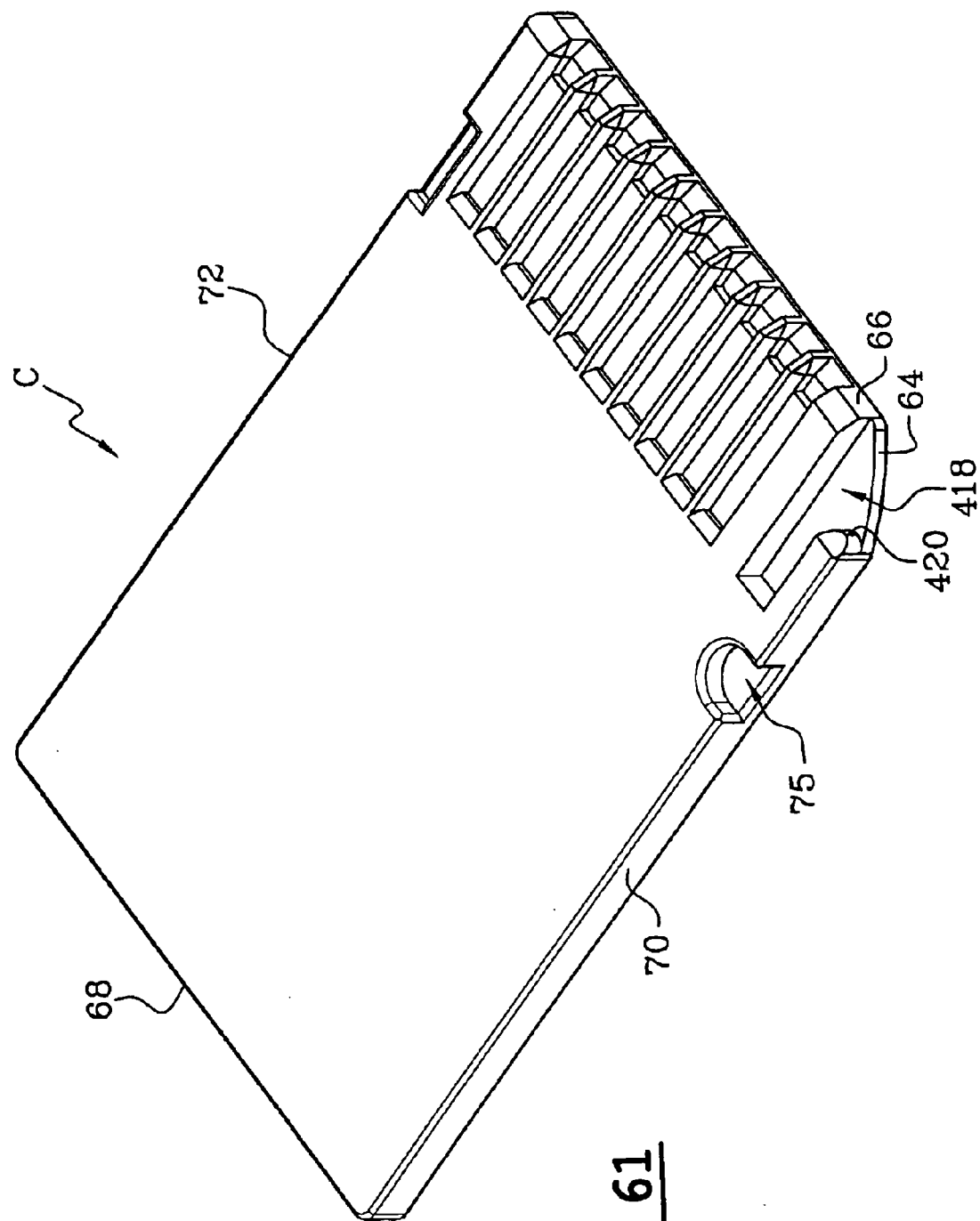
FIG. 61 is a bottom isometric view of the MSD-type card of FIG. 60.

The embodiment variant of the cover 54 shown in FIGS. 58 and 59 makes it possible for the cover 54 to be removed or "unclipped". For this purpose, the rim 120 (FIG. 58) has a cut-out or slot 360 having the general shape of a "T" into which the lower end 362 (FIG. 59) of a tool 364 may be inserted in order to provide a lever effect for the purpose of causing a slight elastic deformation of the cover 54 in this region. This deformation allows the branch 124 to be released transversely to the outside.

The design of the slot prevents an excessively large vertical engagement of the tip 362 of the tool in order not to damage either the upper face of the printed-circuit board or the blade 147 of the switch 140, this blade being oriented here transversely to the outside.

After elastic deformation, it is possible to release the cover, especially for the purpose of allowing the manufacturer of the electronic equipment to carry out a maintenance operation in order to repair electronic or other components located beneath the cover 54, the latter being put back into place by vertical fitting or "clipping".

This variant is the more advantageous the longer the cover 54, that is to say especially when the ejection means according to the invention are present.

According to another variant, the carriage is made in the form of a pusher, the rear longitudinal end of which is capable of receiving a longitudinally forward maneuvering force applied to it, especially for the purpose of ejecting the card.

The embodiment illustrated in FIGS. 62 to 87 will now be described, in which identical, analogous or similar elements to those described and shown with reference to FIGS. 1 to 52 are denoted by the same reference numbers.

The design of this second embodiment of a connector is shown here with a card C of the MSD (Sony) type, but it is not limited to this type of card and may in particular, as previously, be used in association with a card of the SD (SanDisk) type.

Because of the presence of the notch 75 (FIG. 67) formed in the left longitudinal edge 70 of the card, all the means for ejecting and retaining the card C fulfilling the function of the "push-on, push-off" type, are placed laterally along the longitudinal left edge of the connector, that is to say that all these means and the associated main elements of the connector are placed in a "mirror"-type symmetry with respect to the same elements shown in FIGS. 1 to 52.

Figure 78:
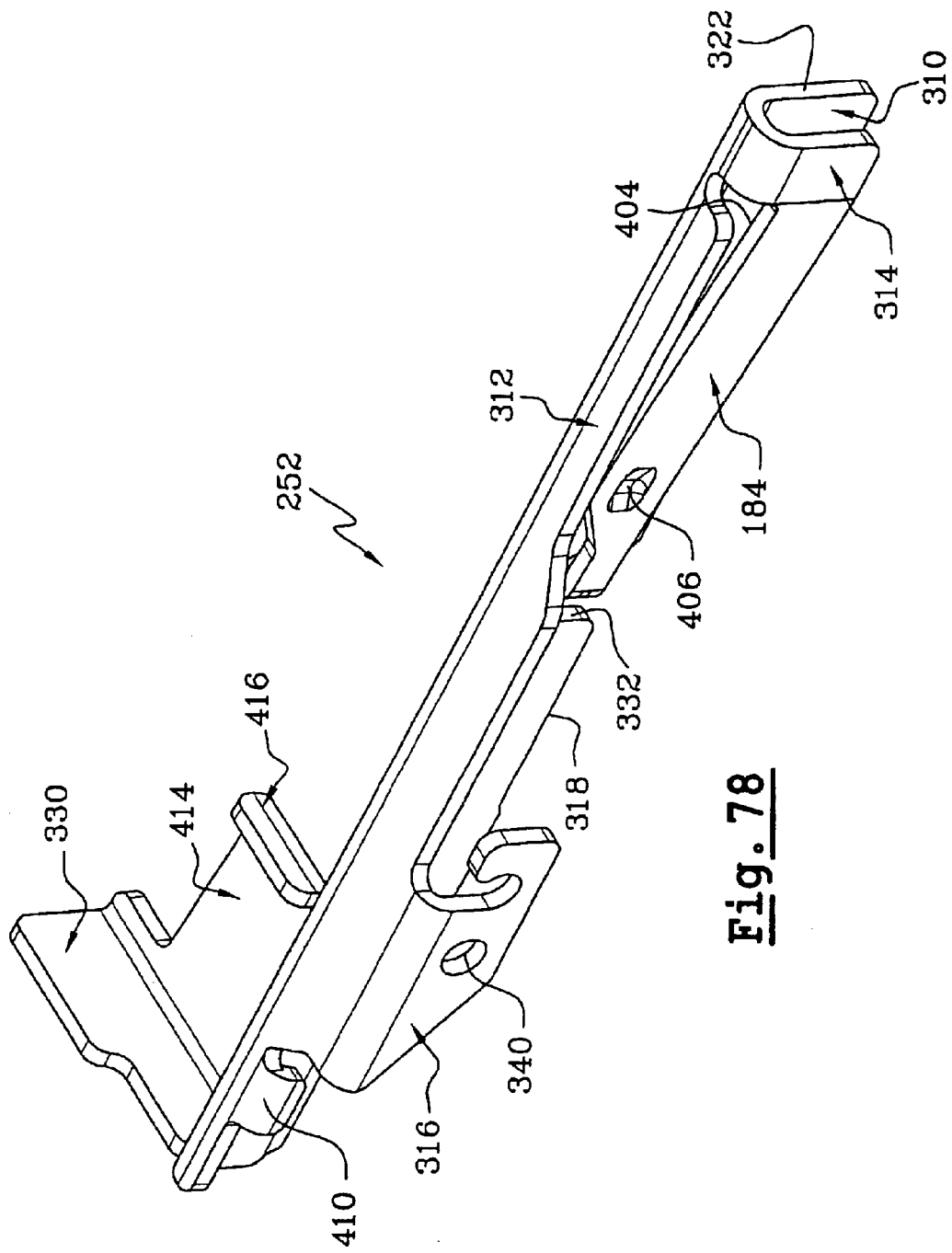

This second embodiment is essentially distinguished from the first embodiment by firstly the design of the card ejection carriage 252 (FIG. 78). The lower edge of the blocking blade 184 no longer has an actuating finger and the insulating support 52 no longer has a complementary cam profile with which the inner vertical lateral face of the finger for actuating the deformations of the blocking blade 184 cooperated.

Figure 79:
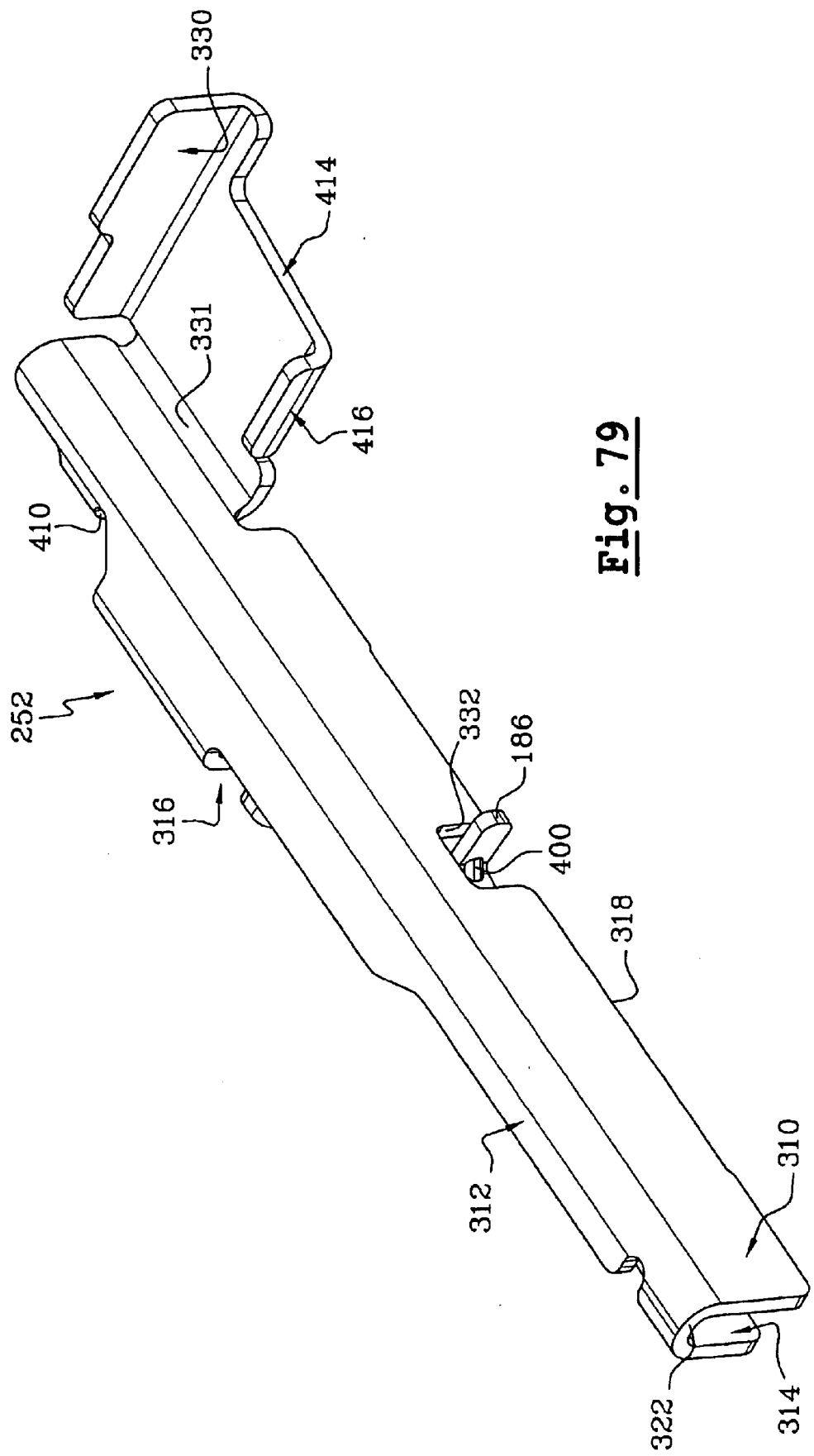

As may be seen in FIG. 79, the window 332 through which the blocking spur 186 can move, is open vertically downward and emerges in the lower edge 318.

The spur 186 is of lower height in order to be able to penetrate the blocking notch 75 of the card C, which also is of smaller height and a stiffening-forming rib 400 is provided in the inner corner between the blocking spur 186 and the front longitudinal end of the blocking blade 184.

The rear part of the upper back 312 of the U-shaped member, with its inner flange 310 and outer flange 314, straddles the rear rib 275 of the insulating support 52, the design of which is generally identical to that described above.

The rib 275 (FIG. 70)is bounded to the front by its transverse front end face 276, the intersection of which with the inner face defines a vertical front end edge 402 (see FIG. 70) that lies facing the facing lateral inner longitudinal face 404 (FIG. 78) of the blocking blade 184.

This inner lateral face 404 is generally plane and of vertical orientation and it includes, near its front longitudinal end (at which the blocking spur 186 is placed), a boss 406 that projects transversely inward toward the vertical plane in which the lateral outer longitudinal face 286 of the rear rib 275 lies, the intersection of which with the transverse front end face 276 defines the edge 402.

Thus, during longitudinal displacements of the carriage 252 relative to the insulating support 52, and therefore relative to the rear rib 275, 286, 402, the forward "front" of the portion of the inner longitudinal face 404 of the blocking blade 184, that cooperates with the rear rib 275, moves longitudinally along the blade 184 in the opposite direction to that of the displacement of the carriage 252 and of the card C.

The area of the surface for guiding the deformation of the blocking blade 184 is generally proportional to the elastic deformation of the blade 184, that is to say proportional to the force exerted on the blade.

Its value is zero in the locked or blocking position, corresponding to a zero force applied to the blade 184. Its value is a maximum in the unlocked position, corresponding to a maximum force applied to the blade.

Compared with the first embodiment shown in FIGS. 1 to 52, this design greatly simplifies the insulating support 52 insofar as the guiding cam 296, 298 of FIG. 9 is omitted, which also results in greater robustness of the corresponding tool for molding the insulating support.

The force exerted on the blocking blade 184 is centered with respect to the axis of the elastically deformable blade 184 and there is therefore no parasitic rocking moment entailing a risk of "twisting" the blade, thus making the blocking/unblocking function fully effective.

At the end of extraction travel, the retraction or transverse shift of the blocking spur 186 is equal to that of the forward front of the guiding surface of the blade.

By omitting the profile of the guiding cam 298 it is possible to reduce the total thickness of the connector by about 0.4 mm.

Wear of the faces and surfaces in mutual rubbing contact is virtually zero since, when the elastic force exerted by the blade is at its maximum value, practically the entire lateral inner longitudinal surface of the blocking blade 184 bears against the facing face 286 of the rib 275.

In order to control the longitudinal position of the carriage 252, and therefore of the card C, in which position the blocking spur 186 is completely disengaged from the blocking notch 75 of the card C, the boss 406, that is provided for this purpose on the blocking blade 184, projects transversely by about 0.1 mm.

The boss 406 (FIG. 78) which comes into play only at the end of extraction travel of the card C allows a precise check to be made of the amount of transverse shift of the blocking spur 186, and of the longitudinal position in which this shift is obtained, that is to say until the user has completely removed the card from the connector.

Figure 68:
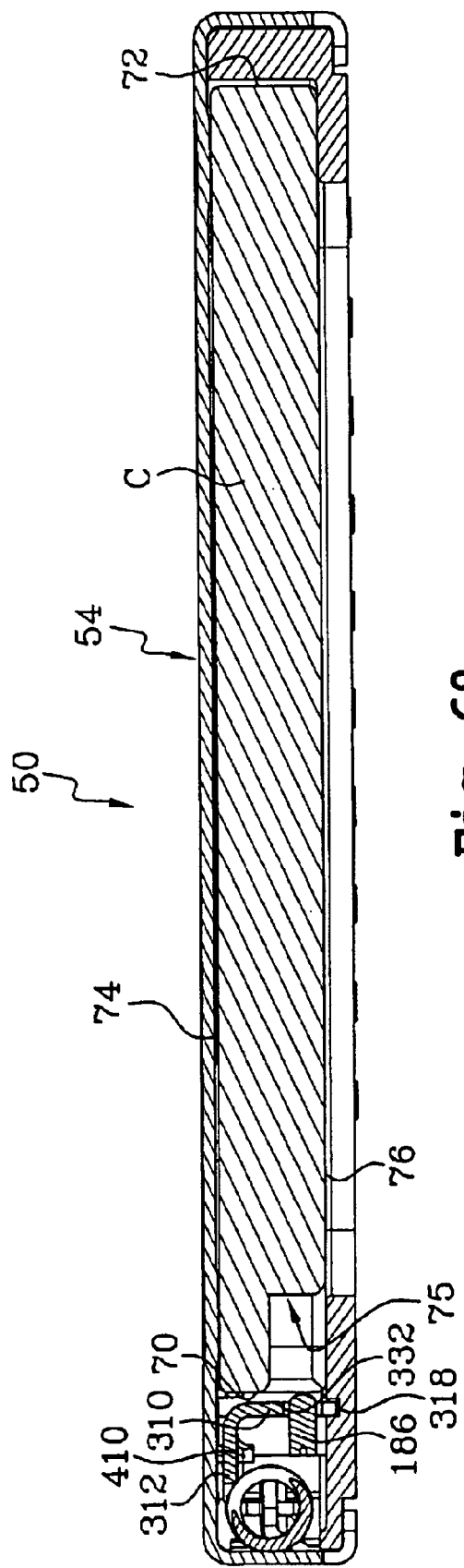
Figure 69:
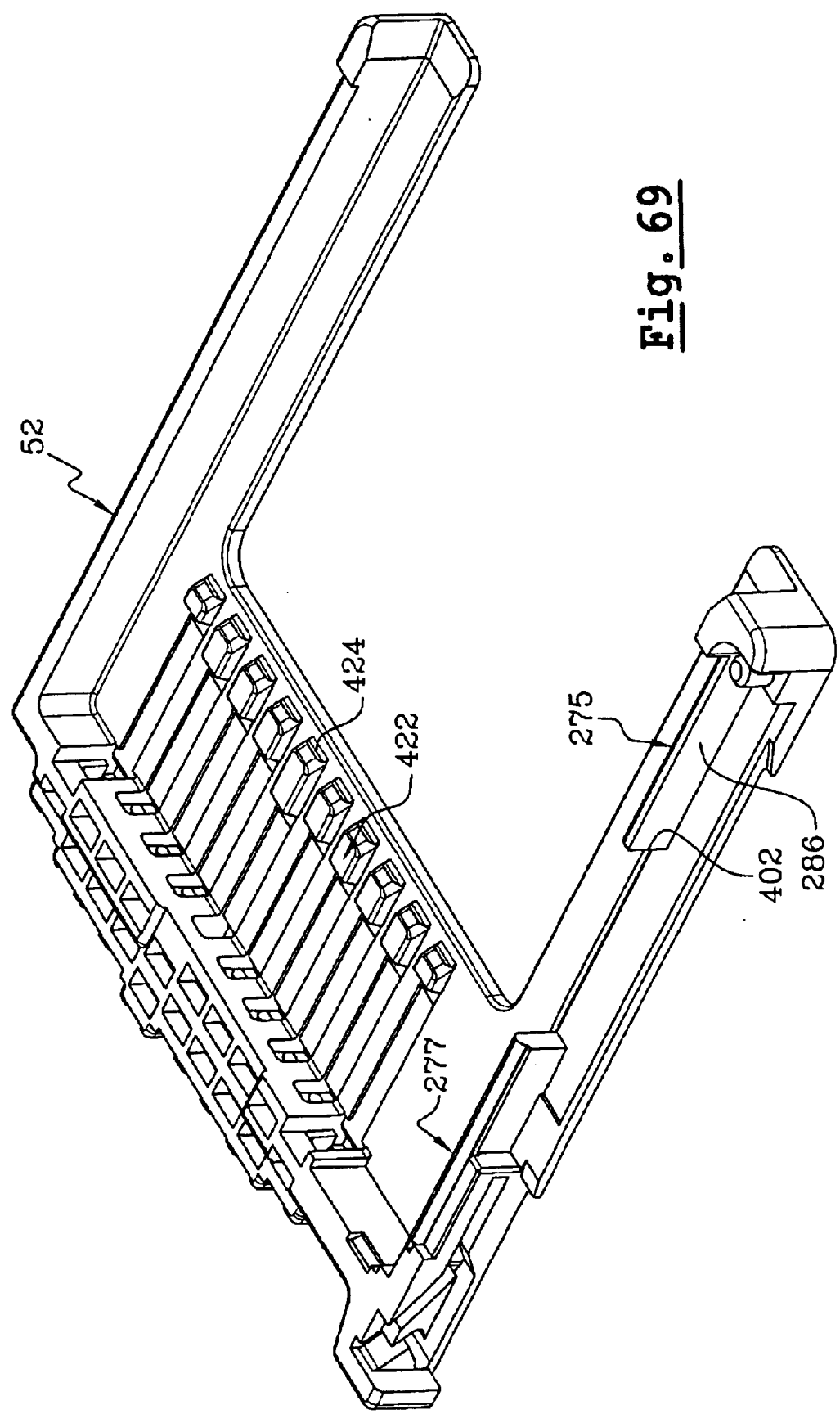
Figure 70:
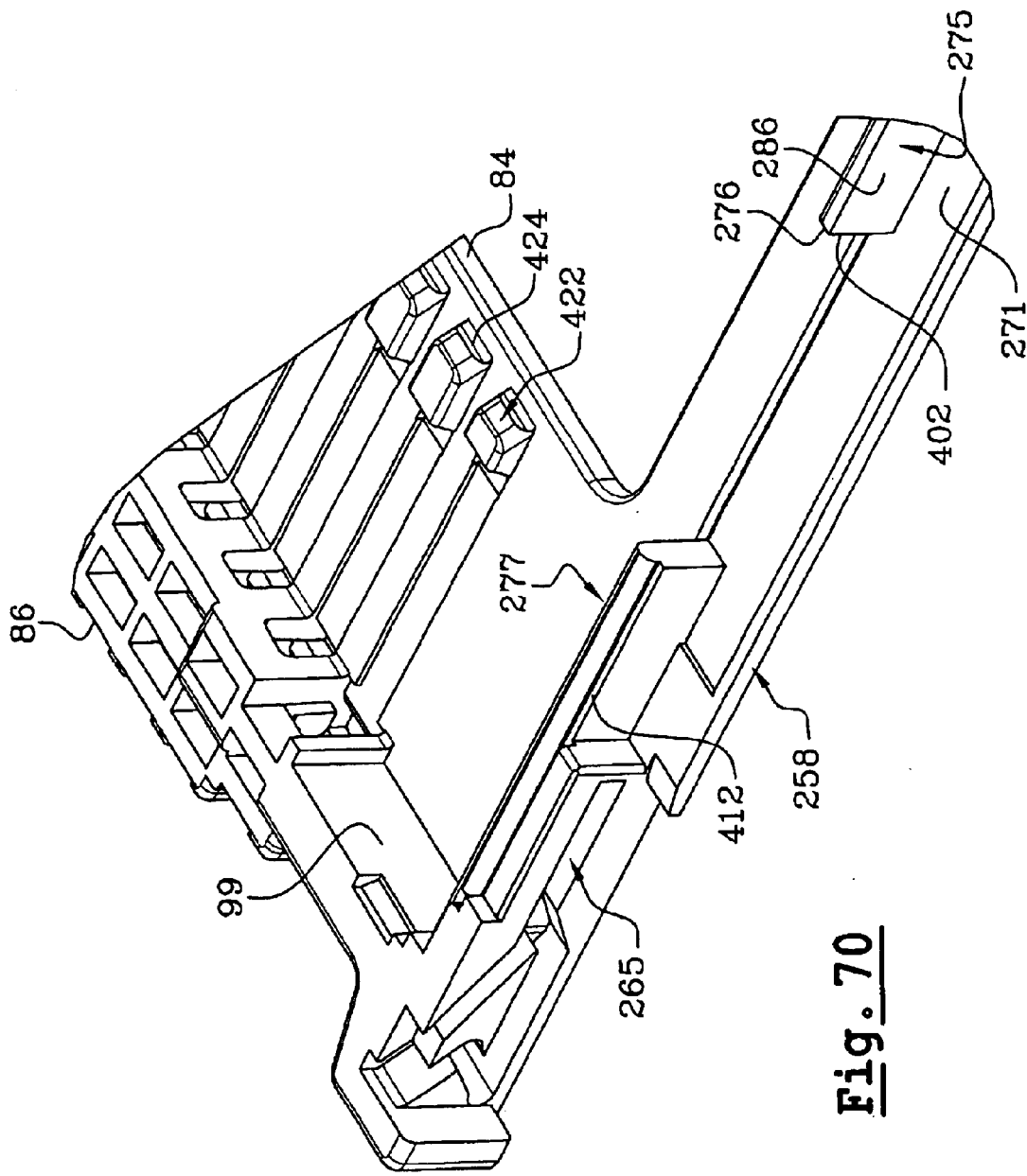
Figure 71:
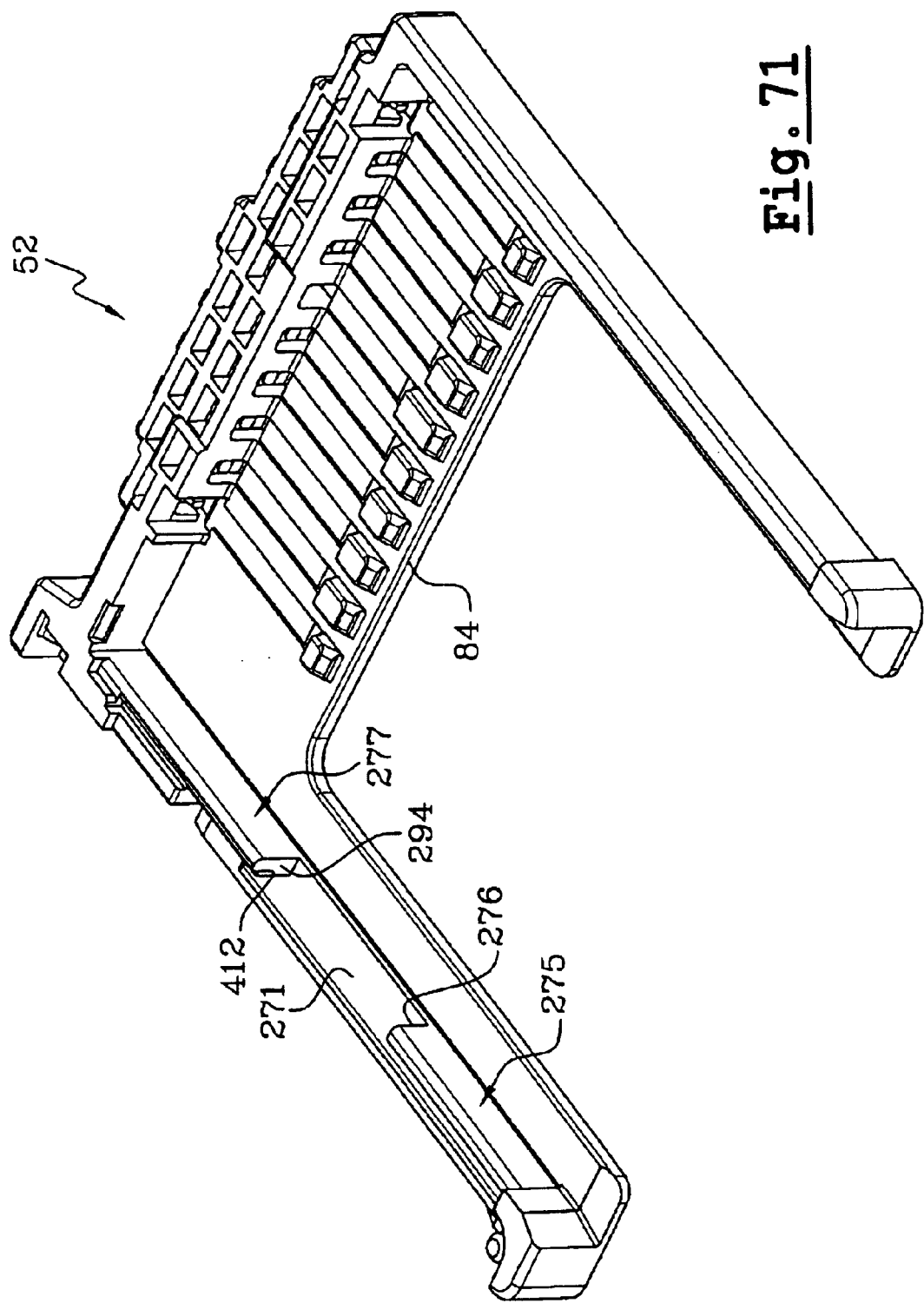
Figure 72:
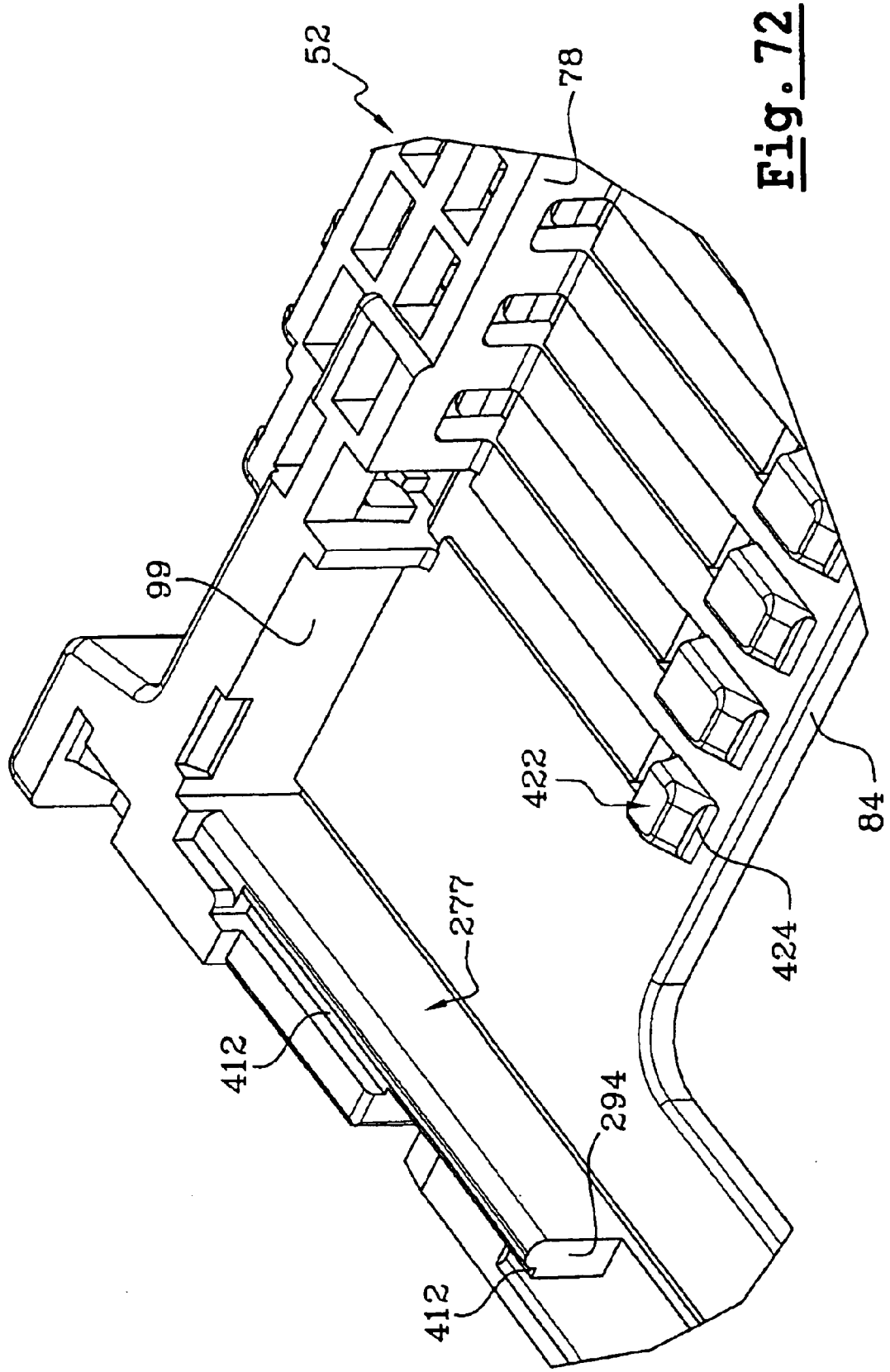

As may be seen especially in FIG. 68, longitudinally toward the front beyond the portion of the front outer lateral flange 316 of the carriage 252 that has the hole 340, the upper back 312 is extended vertically downward by a tab-shaped outer lateral flange portion 410 that is designed to be permanently "engaged" with the front rib 277 that has, for this purpose, a groove 412 for the passage and guiding of the tab 410.

The branch 330 for driving the carriage 252 via the lateral left portion of the front transverse edge 66 of the card C is also modified, especially so as to fit with the design of the MSD-type card.

The branch 330 thus lies generally in a vertical transverse plane perpendicular to the plane of the inner flange 310 of the carriage 252, to which it is joined by a transverse horizontal tab 414 joined to the flange 310 via a lower longitudinal bend 331.

As may be seen for example in FIG. 66, the branch 330 extends transversely inward over a length sufficient to ensure that it extends at least partly opposite a straight transverse portion of the front transverse edge 66 of the card, and to do so since the join between the front edge 66 and the longitudinal left edge 70 is not a standardized 45° cut corner face but simply a convexly curved joining region 64.

At its rear longitudinal end, a horizontal tab 414 (FIG. 78) that joins the flange 310 to the drive branch 330 also has a tab or branch 416, of vertical transverse orientation, that extends upward from the tab 414 (like the branch 330) and is a polarizing tab 416 that comes into play when the card C is improperly inserted.

This is because the height of the tab 416 is less than the total height of the drive branch 330 and it is such that, when the card is inserted in the correct position, the tab 416 is housed in the recess 418 formed under the card opposite the convex joining edge 64.

In the event of improper insertion, it is the front transverse edge 66 or rear transverse edge 68 of the card that cooperates directly with the rear face of the tab 416 in order to drive the carriage 252, which therefore cannot reach a forward longitudinal position allowing it to be locked. When the user releases his insertion force applied to the card C inserted in an incorrect orientation, the ejection spring causes (via the carriage 252 and the tab 416) at least partial, automatic "re-ejection" of the card C, which therefore does not remain in the connector.

The longitudinal position of the tab 416 is designed for this purpose in order to ensure minimal tensioning of the spring 254, but without locking the carriage by the hook 256.

When the card is inserted correctly, the rear face of the transverse polarization tab 416 constitutes an-additional bearing region for the facing portion 420 of the card (see FIG. 87) and thus constitutes an additional bearing surface for the carriage 252 to be driven by the card C, which is added to the surface formed by the rear face of the drive branch 330 with which the front transverse edge 66 of the card C cooperates.

Thus, this design provides a supplement to the mechanical stop, formed by the rear transverse face 422 of the boxes or casings 424 (see FIG. 69) that protect the ends of the contact blades of the connector and physically prevent the card from being fully inserted if it has not been inserted in the correct position, in order therefore to fulfill in addition the function of re-ejecting the card that has thus been wrongly inserted.

Figure 64:
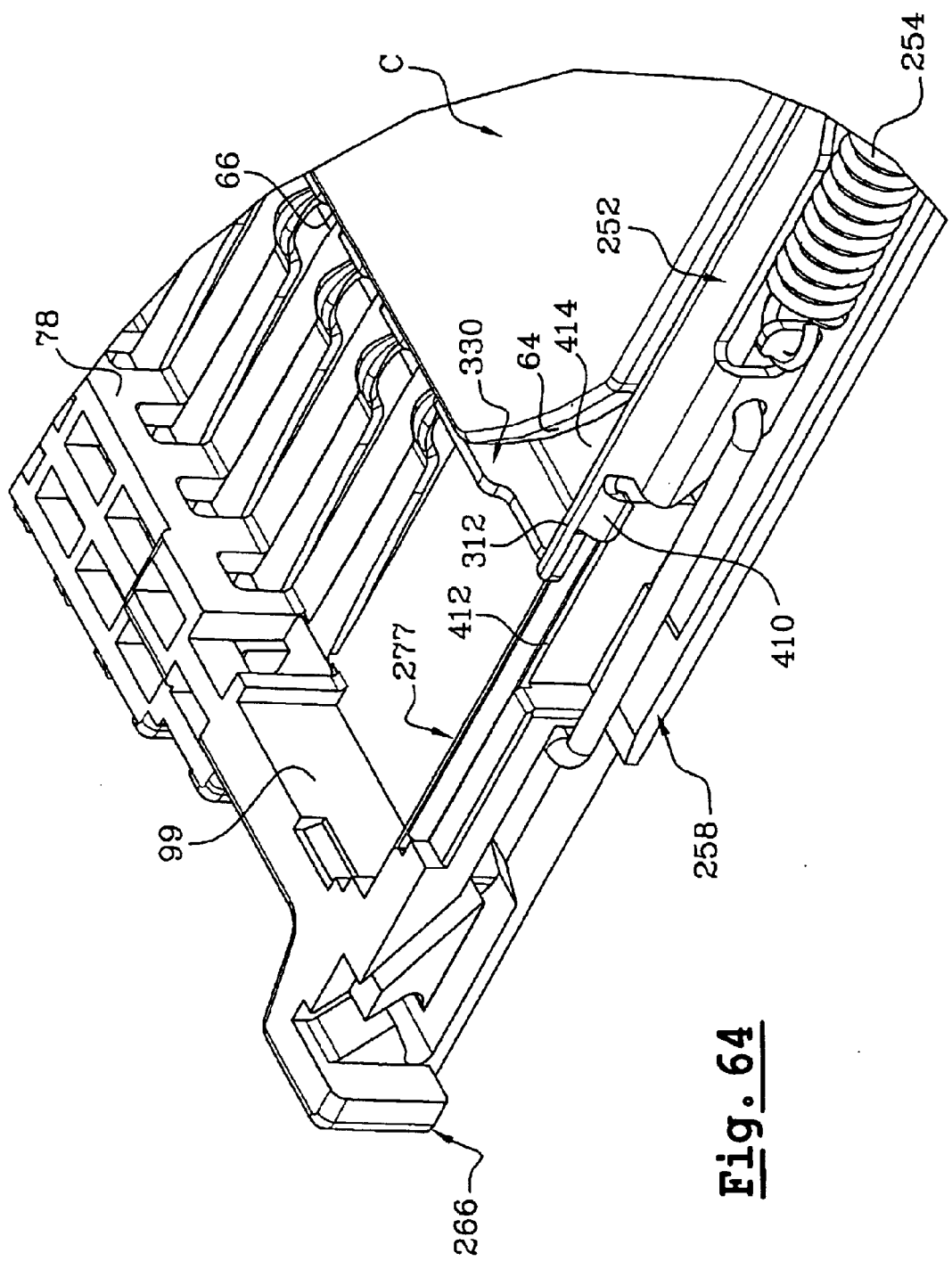

By comparing, for example, FIGS. 3 and 64, and also FIGS. 4 and 65, it may be seen that it has also been possible to reduce the total thickness of the insulating support significantly (by 0.5 mm) by eliminating the portion of material that defined, vertically upward, the portion T3 of the locking cam 265, that is to say the blade of plastic previously bounded at the top by the upper face 56 of the insulating support 52.

Thus, the total height or thickness of the connector is reduced and may be optimized according to the reduced height of the MSD card, which is around 1.6 mm.

It is the facing portion of the cover 54 that lies horizontally above the locking cam 265, T3 and that closes, at the top, the corresponding portion T3.

According to a variant now shown in the figures, it is also possible to make an equivalent saving in the total thickness by reducing the height of the insulating support 52 "underneath" that is to say especially under the portion T6 and over the entire length of the insulating support, the portion T6 then being closed, for example, by a tab of the cover 54 or by the upper face of the printed-circuit board on which the connector rests.

Figure 76:
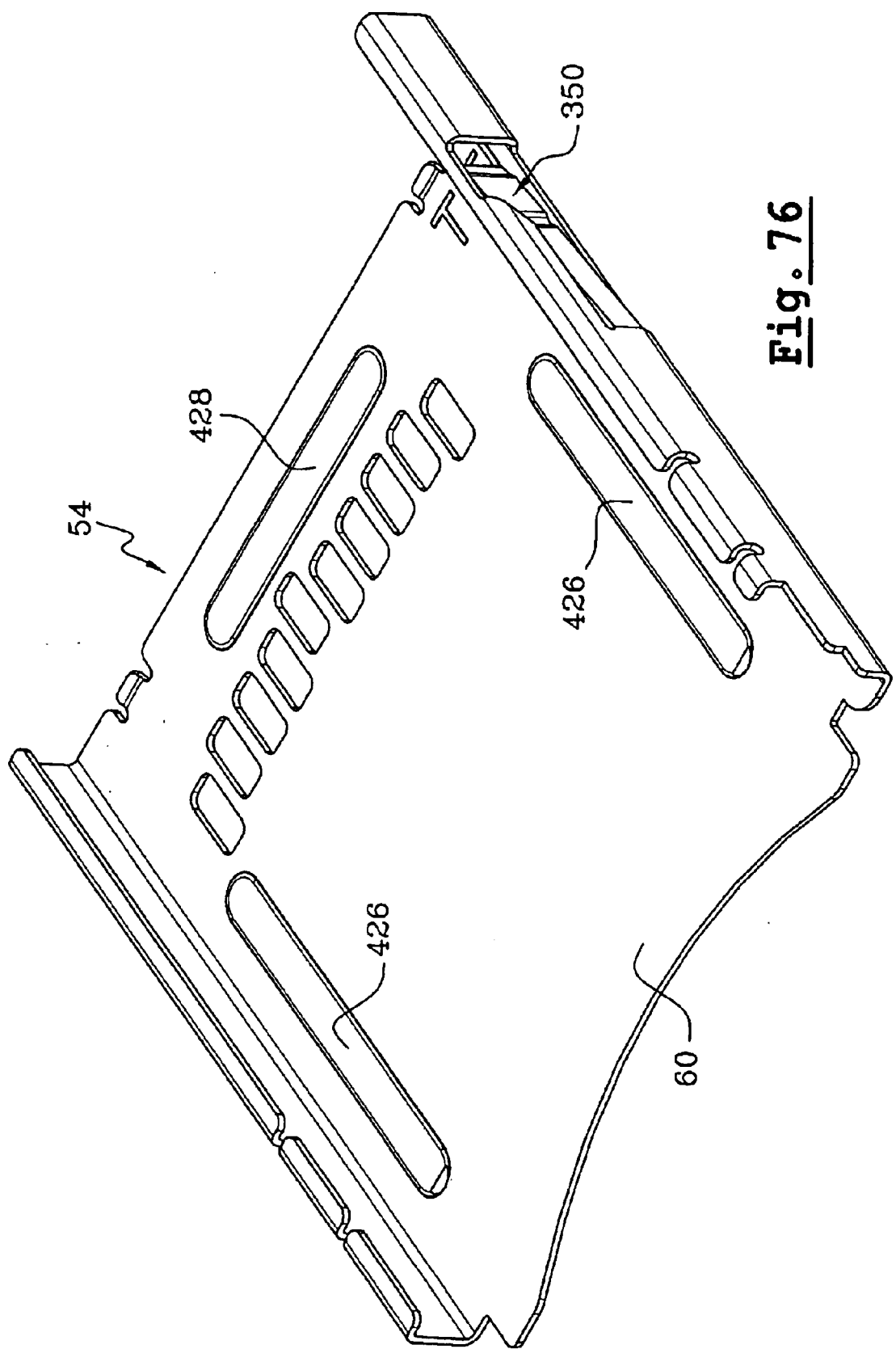
Figure 77:
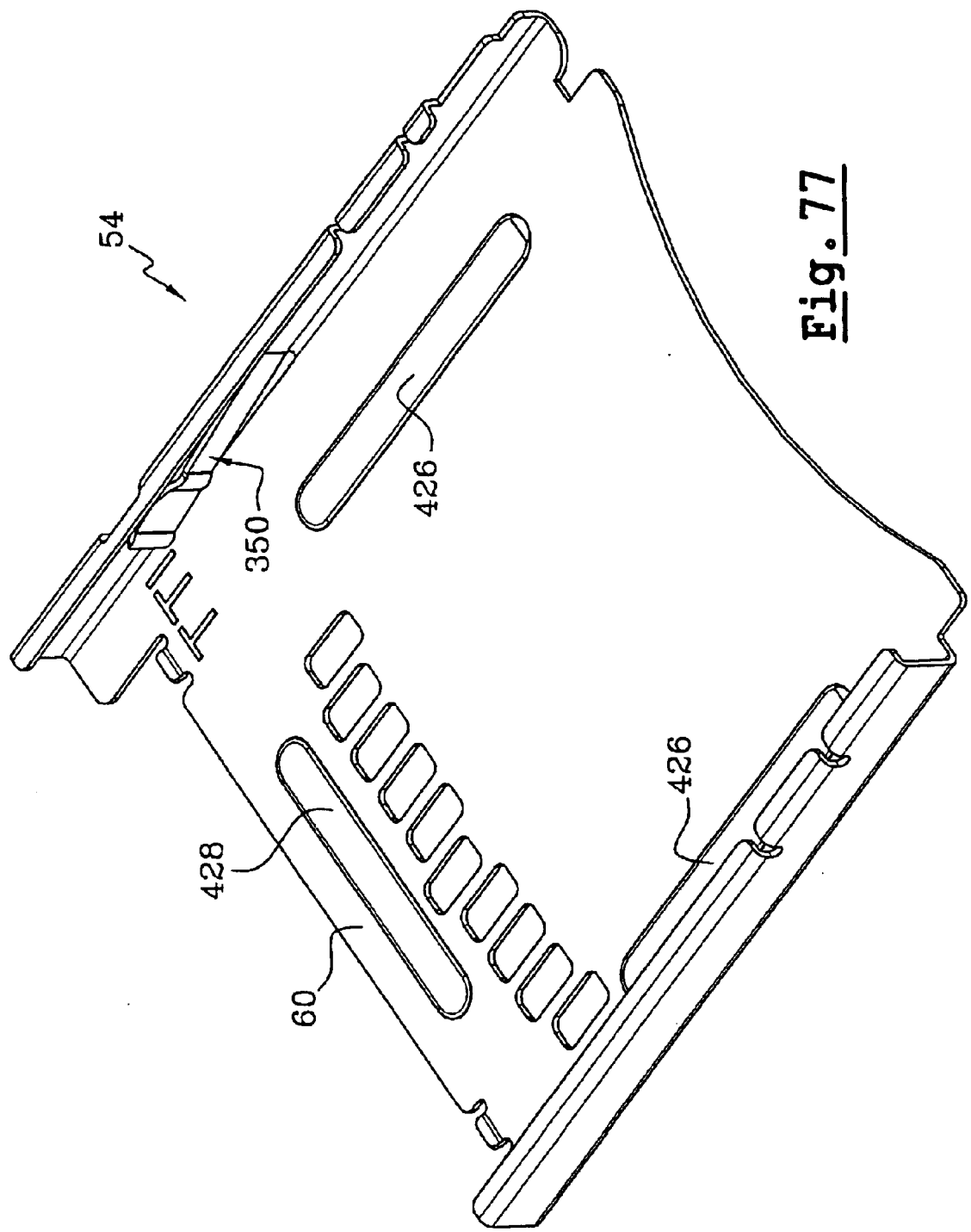

As may be seen in FIGS. 76 and 77, the upper plate 60 of the cover 64 has two longitudinal bosses 426 placed laterally and one front transverse boss 428, which project vertically downward and are designed to cooperate with portions of the upper face of the MSD card, said portions being designed by the card manufacturer to press the card vertically downward.

Figure 62:
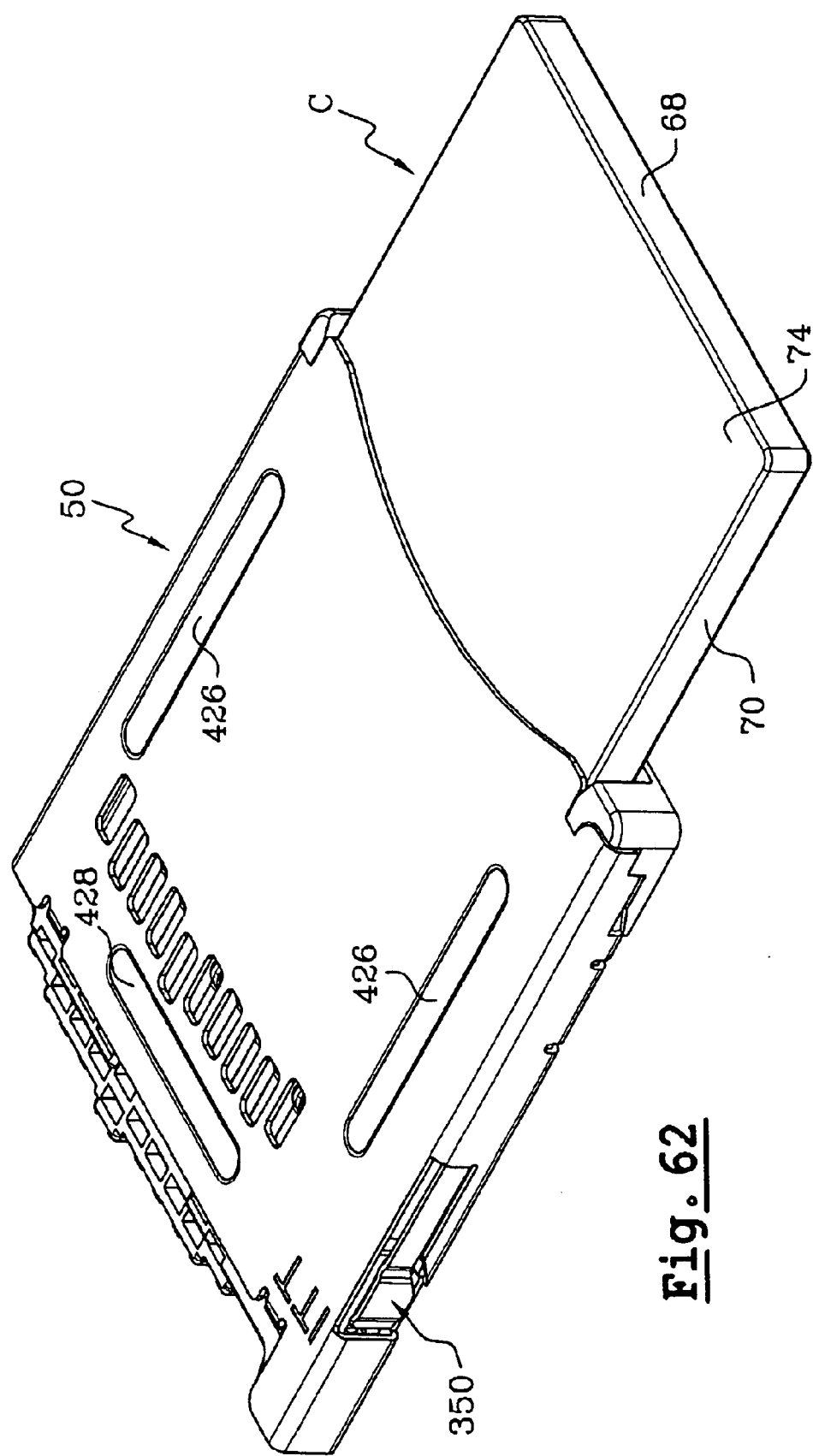
Figure 63:
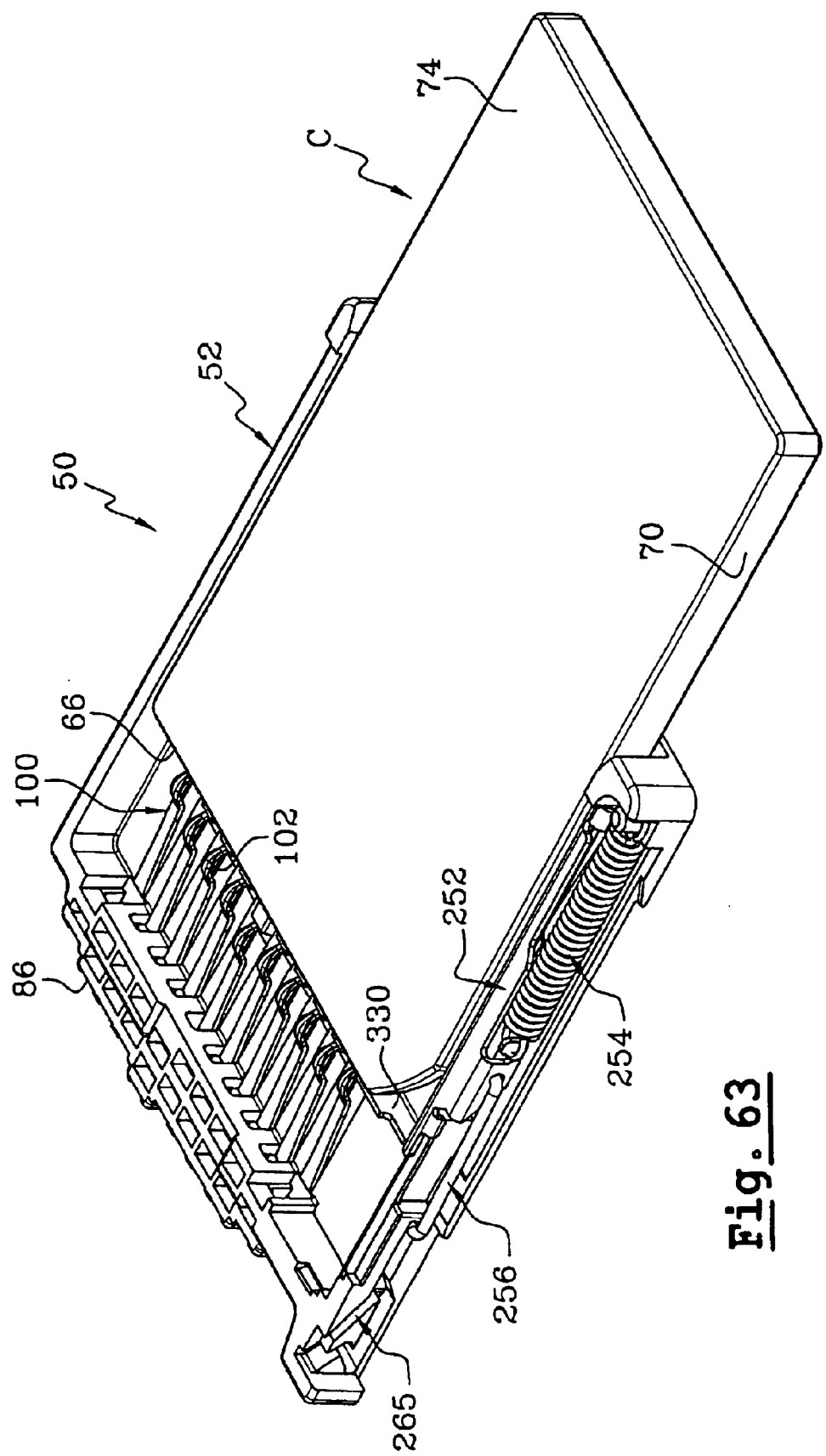
Figure 88:
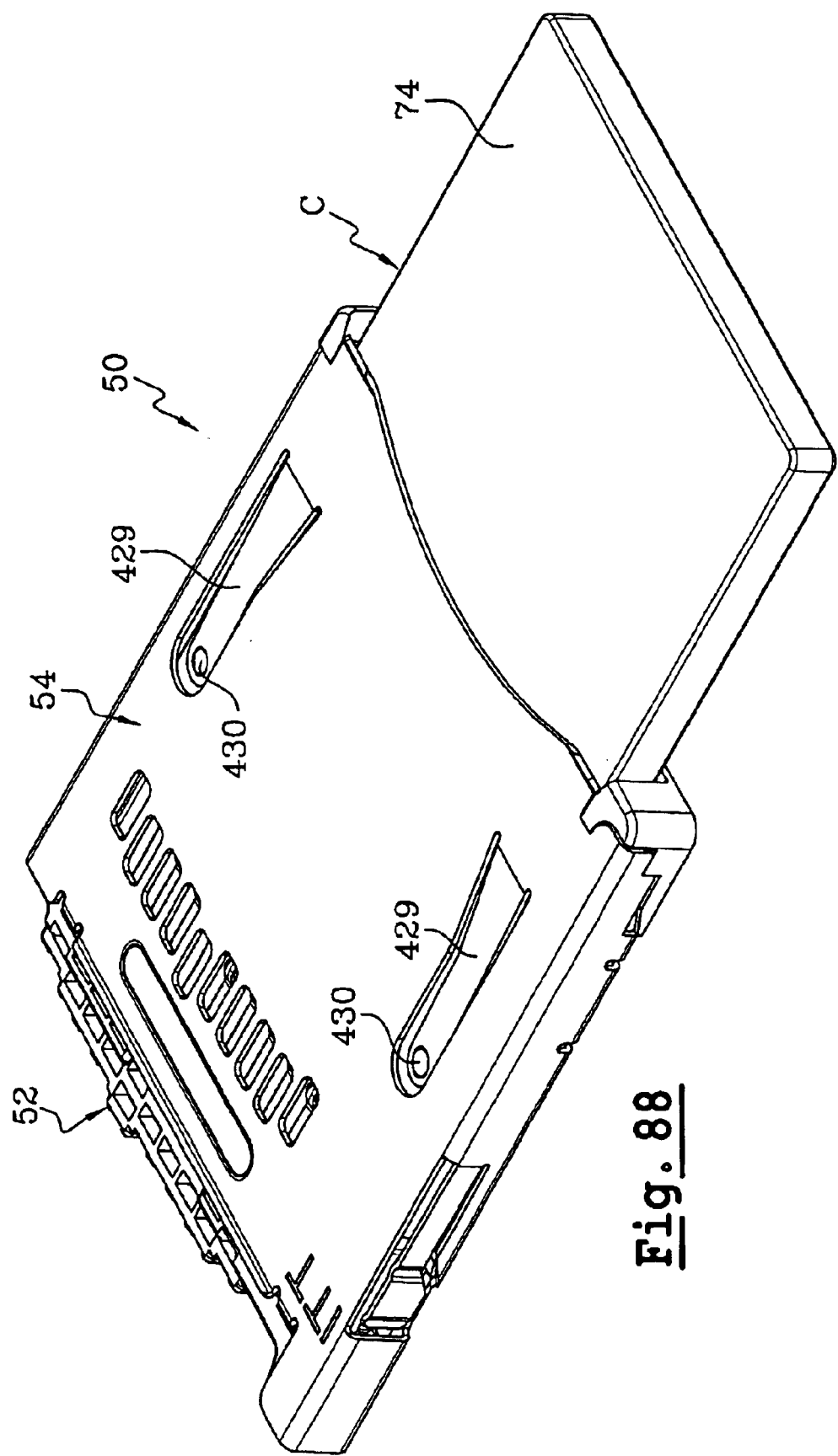
FIGS. 88–90 are views similar to those of FIGS. 62, 76 and 77, respectively, that illustrate another embodiment of the cover of the connector.
Figure 89:
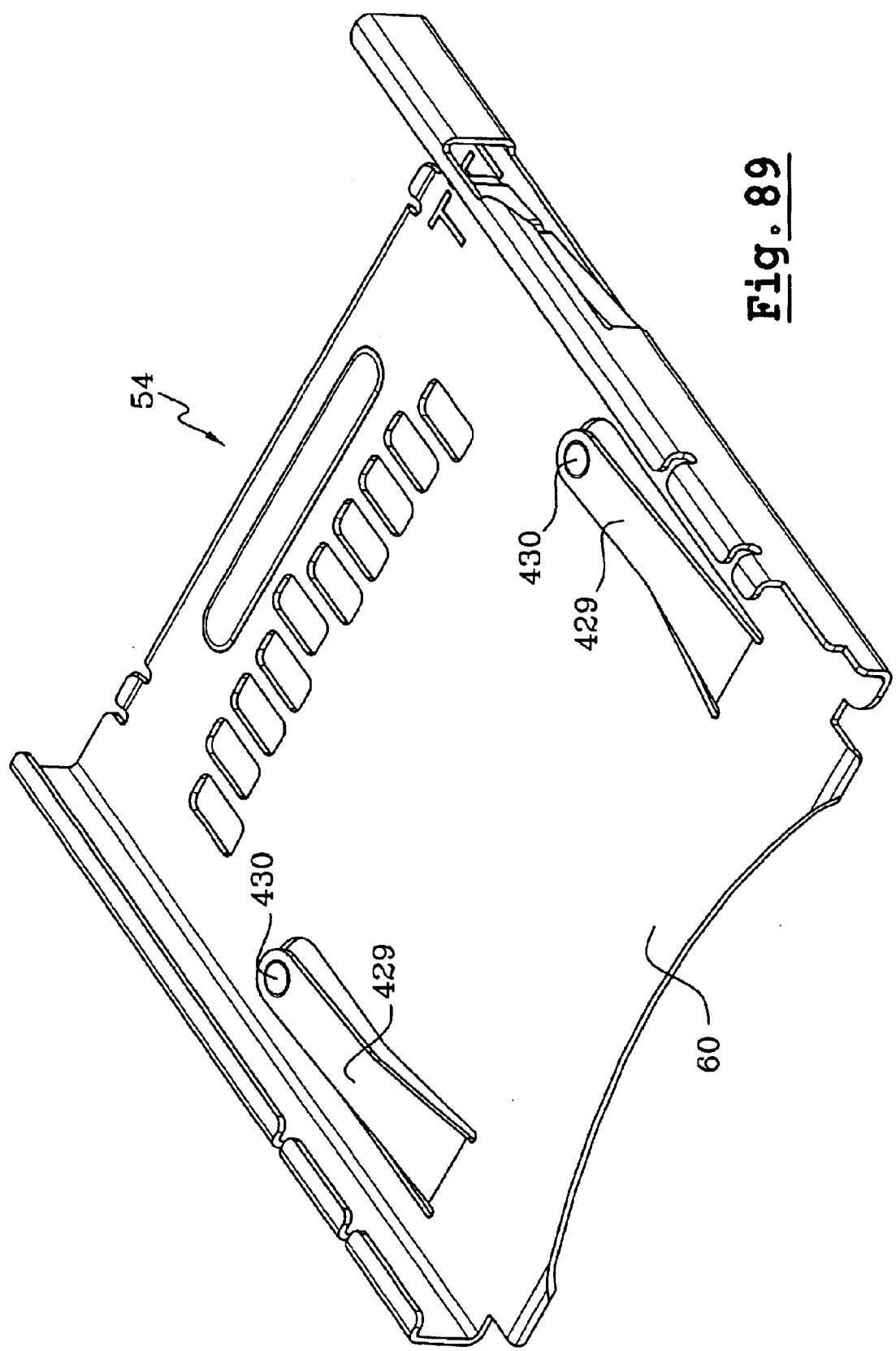
Figure 90:
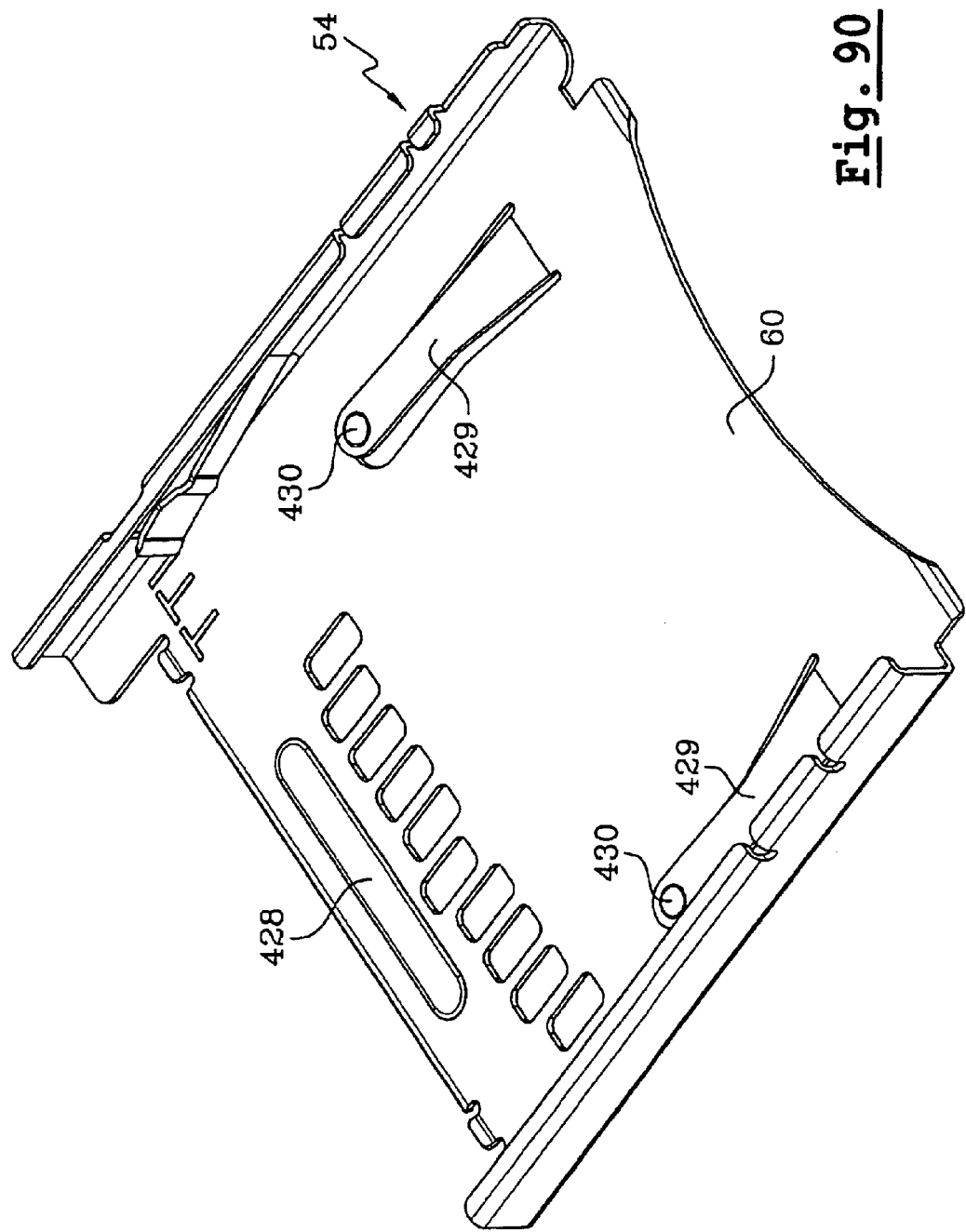
Figure 91:
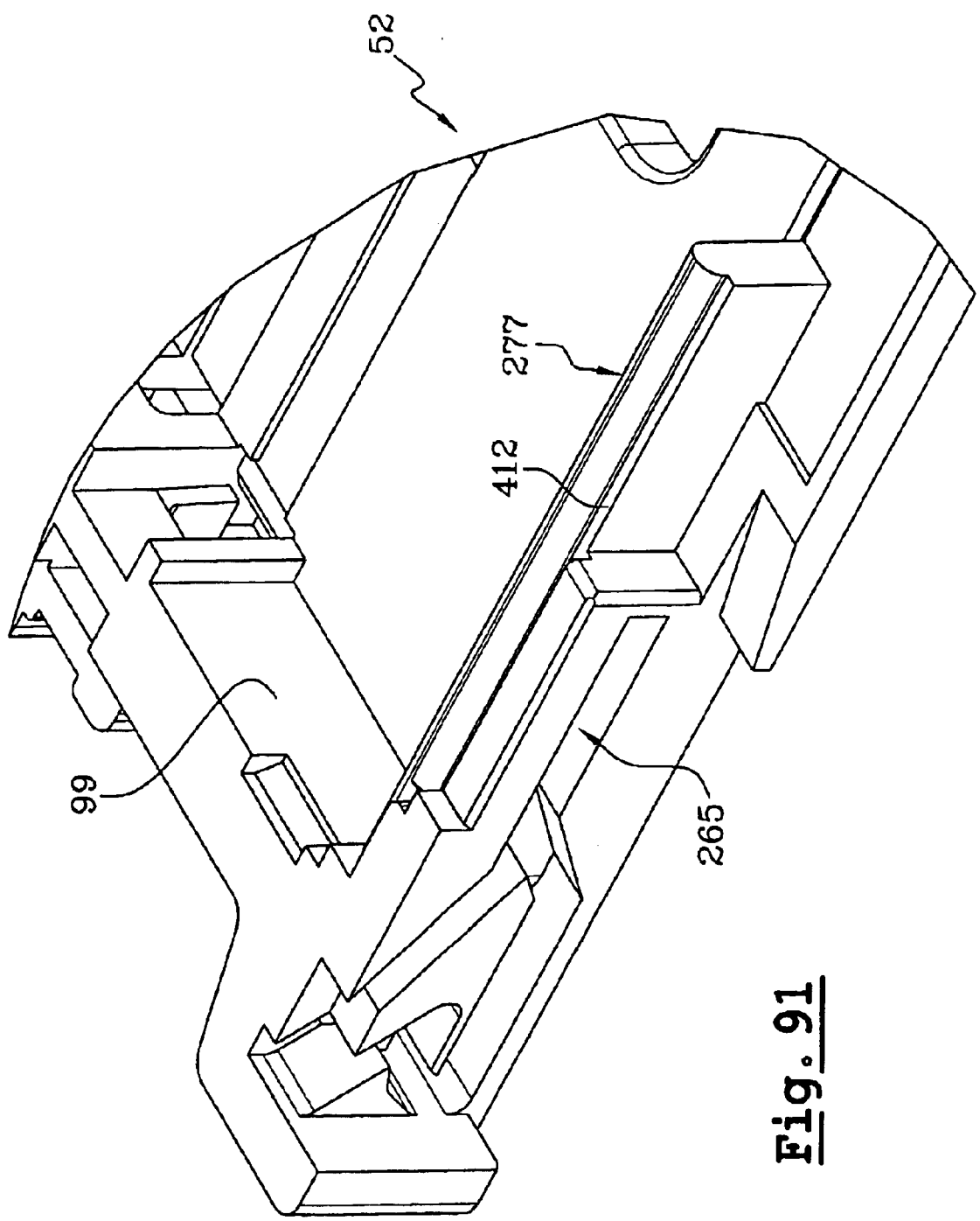
FIGS. 91–94 are views similar to those of FIGS. 71, 73, 65 and 72, respectively, that illustrate a carriage locking cam that provides an unlocking overtravel.
Figure 92:
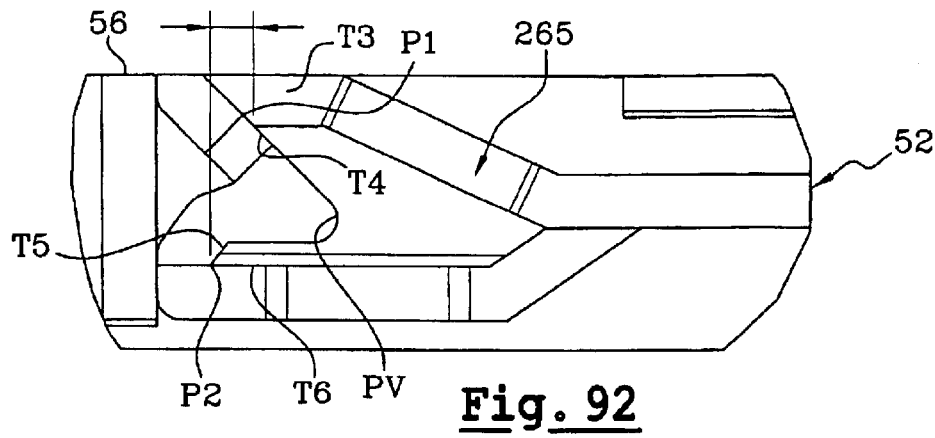
Figure 93:
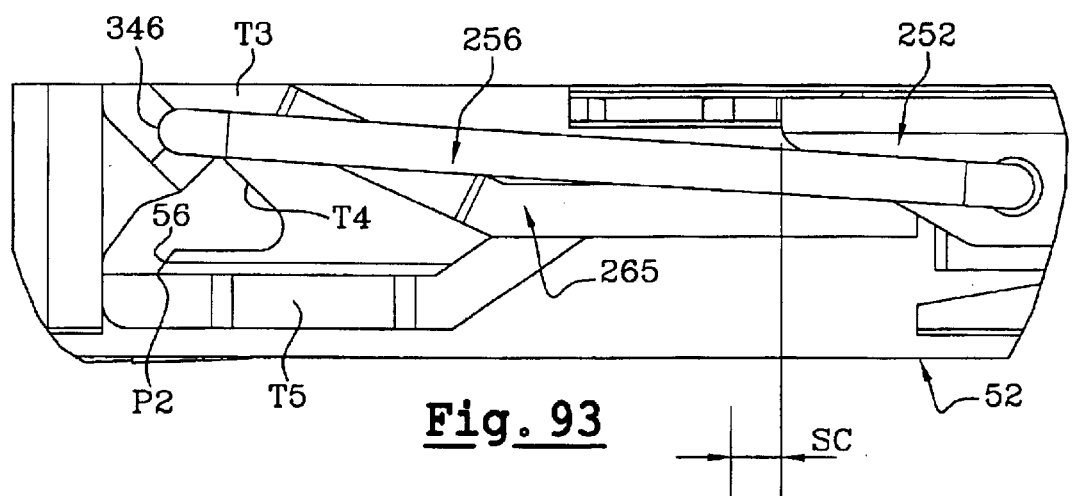
Figure 94:
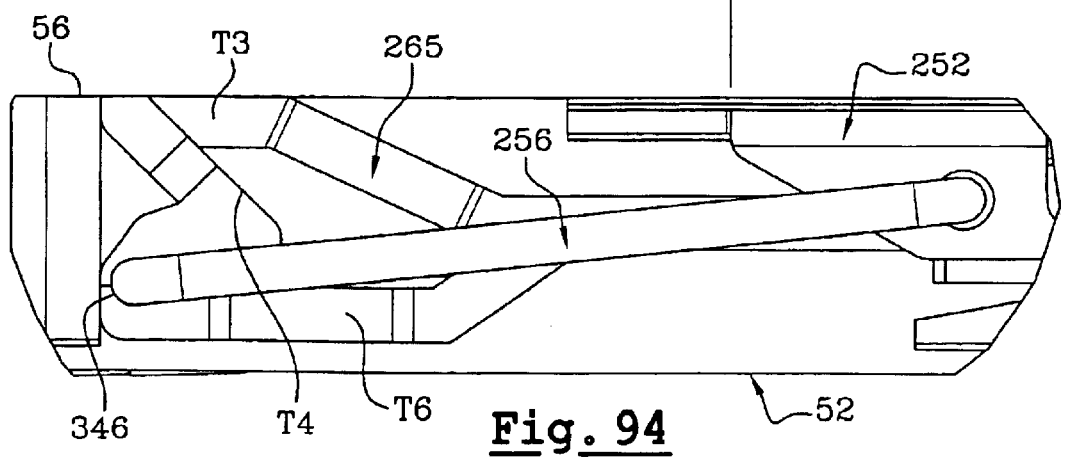

As a variant, and as is shown in the FIGS. 88, 89 and 90 which are figures analogous to FIGS. 62, 76 and 77, the two longitudinal bosses 426 may be replaced by two resilient tabs 429 that project vertically downward and which are two blades for braking the card, the free ends 430 of which cooperate with a facing portion of the upper face 74 of the card C, in the same regions as in the longitudinal bosses 426.

In addition, these FIGS. 88 to 90 show that the cover 54 has, in its rear transverse edge, chamfers that facilitate insertion of the card, similar to those shown especially in FIGS. 15 and 16.

Within the context of the second embodiment, the connector 50 is of the type in which the electrical connection outputs of the contact blades 102 extend longitudinally to the front, that is to say generally as in FIGS. 54 to 57, but they could, of course, also extend longitudinally to the rear as in FIGS. 1 to 52.

As may be seen in FIGS. 91 to 94, it is possible to provoke an unlocking overtravel SMART CARD which is, for example, 0.5 mm longer than the locking travel of the card, so that extraction of the card requires the user to use a special tool, whereas insertion of the card with locking is accomplished by the user simply by pushing on the rear transverse edge 68 of the card with the end of his finger.

As may be seen in these figures, the point P2 of intersection of the portions T5 and T6 is, for this purpose, offset longitudinally forward relative to the point P1 of intersection of the portions T3 and T4 of the unlocking overtravel SMART CARD.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A smart card connector that includes a housing forming a rearwardly-opening slot for receiving a smart card by forward longitudinal sliding of the smart card along a card path that extends along the slot, the housing including a molded insulative support and plurality of contacts mounted on the support, and the connector includes a carriage and a spring that urges said carriage rearward wherein:
   said support forms at least one longitudinally-extending rib; and
   said carriage comprises a piece of sheet metal that is bent to form a pair of flanges that straddle said rib and a U-base that connects said flanges, said piece of sheet metal having a front end forming a driving branch that lies in said card path.

2. The smart card connector described in claim 1 wherein:
   one of said flanges forms a blade with a free end that forms a spur that is moveable laterally into and out of said card path, and said support forms a surface that is positioned to deflect said blade to move its spur out of said card path when said carriage moves rearward.

3. The smart card connector described in claim 1 wherein:
   said carriage has a driving branch that extends into said card path, so the card pushes the carriage forward as the card is inserted and the carriage later can push the card rearward.

4. The smart card connector described in claim 3 wherein said card has a polarizing cut corner extending about 45° to the forward direction and wherein:
   said driving branch is bent to extend about 45° to the forward direction, to provide a thin driving branch with a face that facewise engages the polarizing cut corner.

5. The smart card connector described in claim 3 wherein:
   said driving branch is a continuation of said U-base, whereby to add strength.

6. A smart card connector for receiving a smart card that has contact pads, opposite front and rear edges and laterally opposite side edges, the connector including a housing forming a card-receiving slot that opens rearwardly for receiving the card in movement along a card path that extends along the slot when the card is inserted forwardly into the slot, the housing including an insulative support and a plurality of contacts mounted on the support for engaging the contact pads of the fully forwardly inserted smart card, the connector including a carriage that is slideable between forward and rearward positions on the housing and that is biased rearwardly, wherein:
   said carriage has a main carriage part and has a blade with a fixed end merging with said main carriage part, said blade having a free end forming a spur for interacting with a first of the card side edges;
   said housing forms a blade-engaging wall that engages said blade in at least one of said carriage positions, so said blade does not deflect to move said spur laterally into the card path when said carriage lies in a rearward position but said blade does deflect to move said spur into said card path when said carriage lies in a forward position.

7. The smart card connector described in claim 6 wherein:
   said blade is biased toward a position wherein said spur extends into the card path and said blade-engaging wall engages said blade in said carriage rearward position.

8. The smart card connector described in claim 6 wherein:
   said blade-engaging wall pushes said blade free end towards said card path in said carriage forward position.

9. The smart card connector described in claim 6 including said card, and wherein:
   said housing includes a groove and said blade has an actuating finger that lies in said groove, said groove having a ramp wall that allows said actuating finger to move toward said card path as said carriage moves forward, a rear portion of said ramp forming said blade-engaging wall.

10. The smart card connector described in claim 6 wherein:
    said carriage comprises a piece of sheet metal that has been bent into a largely U-shape that forms inner and outer largely vertical flanges and a U-base that connects upper ends of said flanges;
    said housing forms at least a first primarily vertical ribs, said carriage straddling said rib with said inner and outer flanges lying respectively inward and outward of said rib and said U-base lying on top of said rib.

11. The smart card connector described in claim 6 wherein:
    said housing forms a second rib that lies forward of said first rib, with a gap between a front end of said first rib and a rear end of said second rib;
    one of said flanges of said carriage forms said blade with said spur, said spur lying between said ribs in both forward and rearward position of the carriage.

12. A smart card connector for receiving a smart card that has contact pads, opposite front and rear edges and laterally opposite side edges, the connector including a housing forming a card-receiving slot that opens rearwardly for receiving the card in movement along a card path when the card is inserted forwardly into the slot, the housing including an insulative support and a plurality of contacts mounted on the support for engaging the contact pads of the fully forwardly inserted card, the connector including a carriage that is slideable in forward and rearward directions on the housing and that is biased rearwardly, wherein:

said housing forms at least one upstanding rib lying beyond a side of said card path and having inner and outer rib sides;

said carriage has inner and outer largely vertical flanges lying respectively at inner and outer sides of said rib, and said carriage has a base that connects to said flanges and that lies on top of said rib;

one of said flanges of said carriage forms a blade with a free end forming a spur for movement into and out of said card path;

said housing forms a blade-engaging wall that abuts said blade to prevent said blade from deflecting to move said spur laterally into the card path when said carriage lies in a rearward position and to allow said blade to deflect and move said spur into said card path when said carriage lies in a forward position.

13. A smart card connector for receiving a smart card that has contact pads, opposite front and rear edges, laterally opposite side edges, and a polarizing front corner that extends about 45° to a first of said side edges, the connector including a housing forming a card-receiving slot that opens rearwardly for receiving the card in movement along a card path when the card is inserted forwardly into the slot, the housing including an insulative support and a plurality of contacts mounted on the support for engaging the contact pads of the fully forwardly inserted card, the connector including a carriage that is slideable in forward and rearward directions on the housing and that is biased rearwardly, wherein:

said housing forms at least one upstanding rib lying beyond a side of said card path and having inner and outer rib sides;

said carriage has inner and outer largely vertical flanges lying respectively at inner and outer sides of said rib, and said carriage has a base that connects to said flanges and that lies on top of said rib;

said carriage is formed of a piece of sheet metal, and has a front that forms a driving branch that extends about 45° to a front direction and lies in the path of the card polarizing front corner, so forward movement of the card causes the card polarizing front corner to push the driving branch and move the carriage forward.

14. A smart card connector for receiving a smart card that has contact pads, opposite front and rear edges and laterally opposite side edges, the connector including a housing forming a card-receiving slot that opens rearwardly for receiving the card in movement along a card path when the card is inserted forwardly into the slot, the housing including an insulative support and a plurality of contacts mounted on the support for engaging the contact pads of the fully forwardly inserted card, the connector including a carriage that is slideable in forward and rearward directions on the housing and that is biased rearwardly, wherein:

said housing forms at least one upstanding rib lying beyond a side of said card path and having inner and outer rib sides;

said carriage has inner and outer largely vertical flanges lying respectively at inner and outer sides of said rib, and said carriage has a base that connects to said flanges and that lies on top of said rib;

said housing includes a sheet metal cover that forms a top wall of said slot;

said connector includes a double click mechanism that has a cam recess forming cam walls in said support, and a cam follower that has a first end engaged with said carriage and a second end that extends inwardly into said cam recess and that is engaged with said cam walls;

said cover has a largely vertical side that forms a leaf with a free end that is based inwardly against said cam follower to press said cam follower second end into said recess.

* * * * *